United States Patent [19]
Pechanek et al.

[11] Patent Number: 6,167,502
[45] Date of Patent: Dec. 26, 2000

[54] METHOD AND APPARATUS FOR MANIFOLD ARRAY PROCESSING

[75] Inventors: Gerald G. Pechanek, Cary; Nikos P. Pitsianis, Chapel Hill; Edwin F. Barry, Cary; Thomas L. Drabenstott, Chapel Hill, all of N.C.

[73] Assignee: Billions of Operations Per Second, Inc., Chapel Hill, N.C.

[21] Appl. No.: 08/949,122

[22] Filed: Oct. 10, 1997

[51] Int. Cl.[7] .................................................. G06F 15/00
[52] U.S. Cl. .................................. 712/15; 712/13; 712/12
[58] Field of Search .......................... 395/800.13, 800.11, 395/800.15; 364/736.01; 712/13, 11, 15, 12

[56] References Cited

U.S. PATENT DOCUMENTS

| | | | |
|---|---|---|---|
| 5,065,339 | 11/1991 | Vassiliadis et al. | 395/24 |
| 5,146,420 | 9/1992 | Vassiliadis et al. | 364/757 |
| 5,146,543 | 9/1992 | Vassiliadis et al. | 395/27 |
| 5,148,515 | 9/1992 | Vassiliadis et al. | 395/27 |
| 5,475,856 | 12/1995 | Kogge | 395/800 |
| 5,542,026 | 7/1996 | Pechanek et al. | 395/27 |
| 5,546,336 | 8/1996 | Pechanek et al. | 364/725 |
| 5,566,342 | 10/1996 | Denneau et al. | 395/800 |
| 5,577,262 | 11/1996 | Pechanek et al. | 395/890 |
| 5,612,908 | 3/1997 | Pechanek et al. | 364/736 |
| 5,682,491 | 10/1997 | Pechanek et al. | 395/385 |

FOREIGN PATENT DOCUMENTS

| | | | |
|---|---|---|---|
| 726529 A2 | 8/1996 | European Pat. Off. | G06F 15/80 |
| 726532 A2 | 8/1996 | European Pat. Off. | G06F 15/80 |

OTHER PUBLICATIONS

Pechanek et al. "Multiple–Fold Clustered Processor Mesh Array", Proceedings Fifth NASA Symposium on VLSI Design, pp. 8.4.1–11, Nov. 4–5–1993, University of New Mexico, Albuquerque, New Mexico.

Pechanek et al. "A Massively Parallel Diagonal Fold Array Processor", 1993 International Conference on Application Specific Array Processors, pp. 140–143, Oct. 25–27, 1993, Venice, Italy.

L. Uhr, Multi–Computer Architectures for Artificial Intelligence, New York, N.Y., John Wiley & Sons, Ch. 8, p. 97, 1987.

R. Cypher and J.L.C. Sanz, "SIMD Architectures and Alogorithms for Image Processing and Computer Vision", IEEE Transactions on Acoustics, Speech and Signal Processing, vol. 37, No. 12, pp. 2158–2174, Dec. 1989.

K.E. Batcher, "Design of a Massively Parallel Processor", IEEE Transactions on Computers, vol. C–29, No. 9, pp. 836–840, Sep. 1980.

Robert Cypher and Jorge L.C. Sanz, "The SIMD Model of Parallel Computation" 1994 Springer–Verlag, New York, pp. 61–68.

F. Thomas Leighton, "Introduction To Parallel Algorithms and Architectures: Arrays, Trees, Hypercubes," 1992 Morgan Kaufman Publishers, Inc., San Mateo, CA, pp. 389–404.

J. Granata, M. Conner, R. Tolimieri, "The Tensor Product: A Mathematical Programming Language for FFTs and Other Fast DSP Operations", IEEE Sp magazine, pp. 40–48, Jan. 1992.

J.R. Johnson, R.W. Johnson, D. Rodriguez, and R. Tolimieri, "A Methodology for Designing, Modifying, and Implementing Fourier Transform Algorithms on Various Architectures", Circuits Systems Signal Process, vol. 9, No. 4.

*Primary Examiner*—Larry D. Donaghue
*Attorney, Agent, or Firm*—Law Offices of Peter H. Priest, PLLC

[57] ABSTRACT

A manifold array topology includes processing elements, nodes, memories or the like arranged in clusters. Clusters are connected by cluster switch arrangements which advantageously allow changes of organization without physical rearrangement of processing elements. A significant reduction in the typical number of interconnections for preexisting arrays is also achieved. Fast, efficient and cost effective processing and communication result with the added benefit of ready scalability.

34 Claims, 45 Drawing Sheets

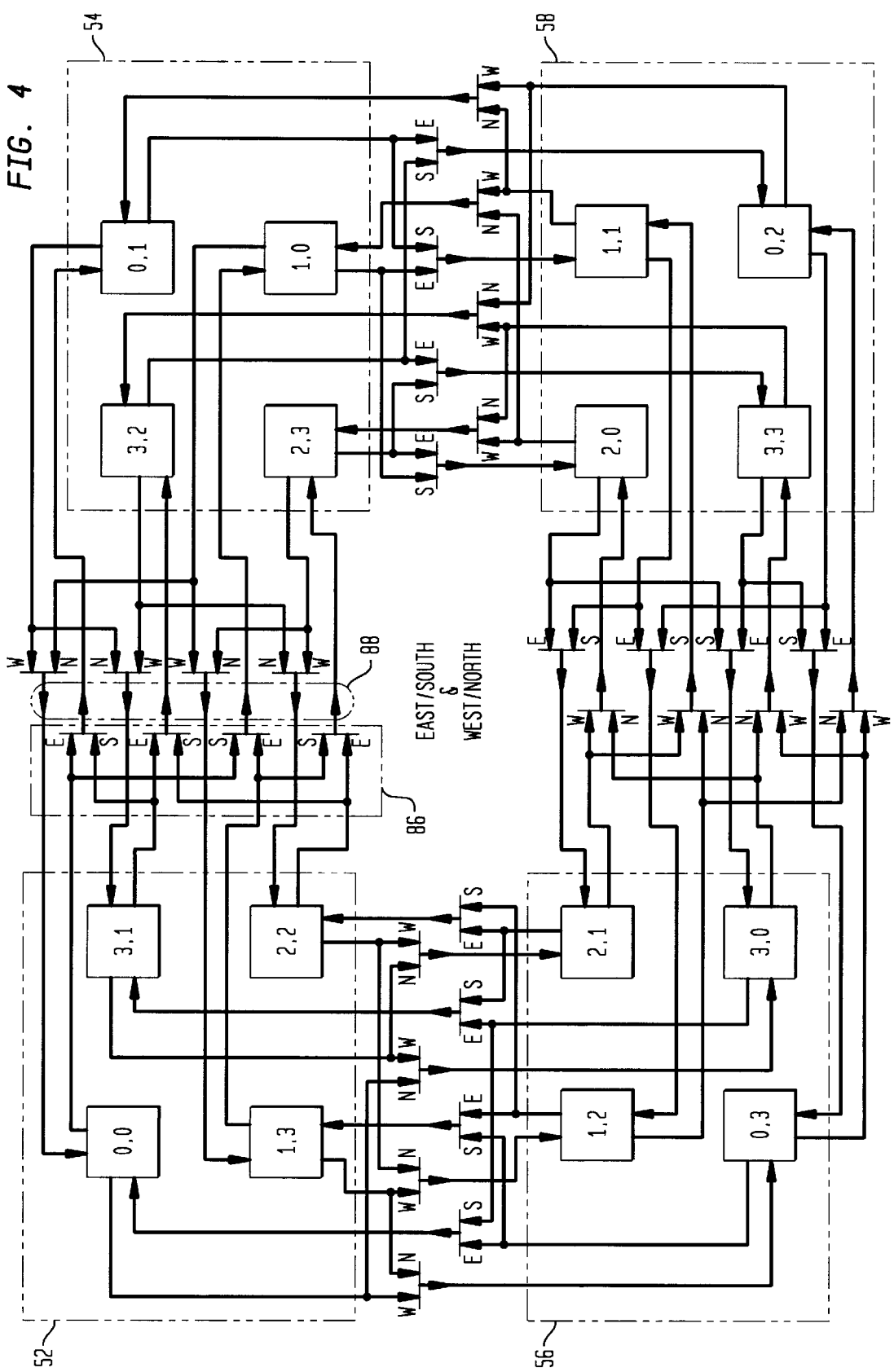

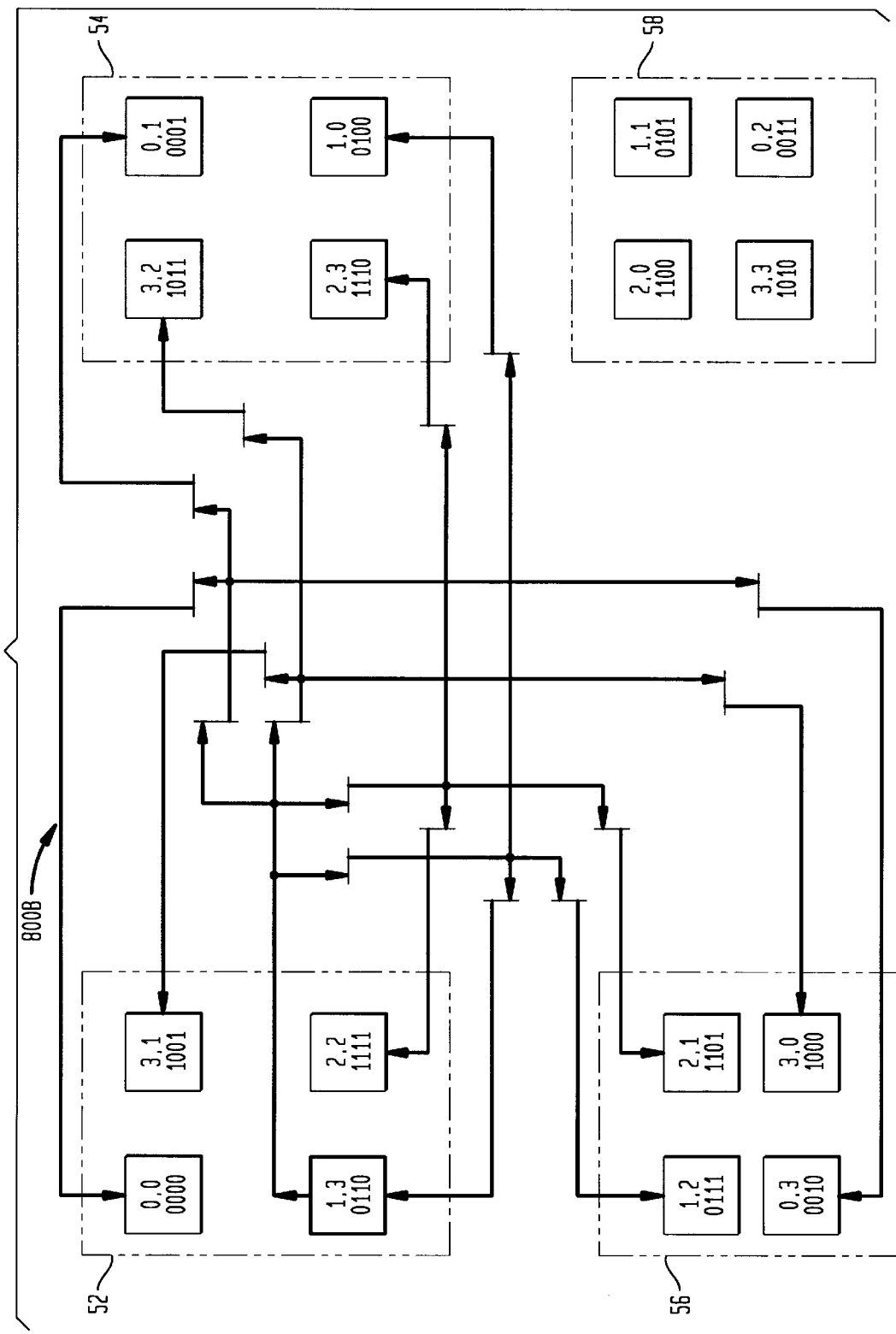

FIG. 21A

|   | 1 | 2 | 3 | 4 |
|---|---|---|---|---|
| | PE-0,0<br>0000 | PE-0,1<br>0001 | PE-0,2<br>0011 | PE-0,3<br>0010 |
| | PE-1,0<br>0100 | PE-1,1<br>0101 | PE-1,2<br>0111 | PE-1,3<br>0110 |
| | PE-2,0<br>1100 | PE-2,1<br>1101 | PE-2,2<br>1111 | PE-2,3<br>1110 |
| | PE-3,0<br>1000 | PE-3,1<br>1001 | PE-3,2<br>1011 | PE-3,3<br>1010 |

FIG. 21B

|   | 1 | 2 | 3 | 4 |
|---|---|---|---|---|
| | PE-0,0<br>0000 | PE-1,1<br>0101 | PE-2,2<br>1111 | PE-3,3<br>1010 |
| | PE-1,0<br>0100 | PE-2,1<br>1101 | PE-3,2<br>1011 | PE-0,3<br>0010 |
| | PE-2,0<br>1100 | PE-3,1<br>1001 | PE-0,2<br>0011 | PE-1,3<br>0110 |
| | PE-3,0<br>1000 | PE-0,1<br>0001 | PE-1,2<br>0111 | PE-2,3<br>1110 |

FIG. 22

METHOD AND APPARATUS FOR MANIFOLD ARRAY PROCESSING

BACKGROUND OF THE INVENTION

1. Field of the Invention

The present invention relates generally to improvements in data processing systems and methods and, more particularly, to improved parallel data processing architectures.

2. Description of the Related Art

Many computing tasks can be developed that operate in parallel on data. The efficiency of the parallel processor depends upon the parallel processor's architecture, the coded algorithms, and the placement of data in the parallel elements. For example, image processing, pattern recognition, and computer graphics are all applications which operate on data that is naturally arranged in two- or three-dimensional grids. The data may represent a wide variety of signals, such as audio, video, SONAR or RADAR signals, by way of example. Because operations such as discrete cosine transforms (DCT), inverse discrete cosine transforms (IDCT), convolutions, and the like which are commonly performed on such data may be performed upon different grid segments simultaneously, multiprocessor array systems have been developed which, by allowing more than one processor to work on the task at one time, may significantly accelerate such operations. Parallel processing is the subject of a large number of patents including U.S. Pat. Nos. 5,065,339; 5,146,543; 5,146,420; 5,148,515; 5,577,262; 5,546,336; and 5,542,026 which are hereby incorporated by reference.

One conventional approach to parallel processing architectures is the nearest neighbor mesh connected computer, which is discussed in, R. Cypher and J. L. C. Sanz, "SIMD Architectures and Algorithms for Image Processing and Computer Vision," IEEE Transactions on Acoustics, Speech and Signal Processing, Vol. 37, No. 12, pp. 2158–2174, December 1989, K. E. Batcher, "Design of a Massively Parallel Processor," IEEE Transactions on Computers, Vol. C-29 No. 9, pp. 836–840, September 1980, and L. Uhr, *Multi-Computer Architectures for Artificial Intelligence*, New York, N.Y., John Wiley & Sons, Ch. 8, p. 97, 1987 all of which are incorporated by reference herein.

In the nearest neighbor torus connected computer of FIG. 1A multiple processing elements (PEs) are connected to their north, south, east and west neighbor PEs through torus connection paths MP and all PEs are operated in a synchronous single instruction multiple data (SIMD) fashion. Since a torus connected computer may be obtained by adding wraparound connections to a mesh-connected computer, a mesh-connected computer may be thought of as a subset of torus connected computers. As illustrated in FIG. 1B, each path MP may include T transmit wires and R receive wires or as illustrated in FIG. 1C, each path MP may include B bidirectional wires. Although unidirectional and bidirectional communications are both contemplated by the invention, the total number of bus wires excluding control signals, in a path will generally be referred to K wires hereinafter where K=B in a bidirectional bus design and K=T+R in a unidirectional bus design. It is assumed that a PE can transmit data to any of its neighboring PEs, but only one at a time. For example, each PE can transmit data to its east neighbor in one communication cycle. It is also assumed that a broadcast mechanism is present such that data and instructions can be dispatched from a controller simultaneously to all PEs in one broadcast dispatch period.

Although bit-serial inter-PE communications are typically employed to minimize wiring complexity, the wiring complexity of a torus-connected array nevertheless presents implementation problems. The conventional torus-connected array of FIG. 1A includes sixteen processing elements connected in a four by four array 10 of PEs. Each processing element $PE_{i,j}$ is labeled with its row and column number i and j, respectively. Each PE communicates to its nearest North (N), South (S), East (E) and West (W) neighbor with point to point connections. For example, the connection between $PE_{0,0}$ and $PE_{3,0}$ shown in FIG. 1A is a wrap around connection between $PE_{0,0}$'s N interface and $PE_{3,0}$'s S interface, representing one of the wrap around interfaces that forms the array into a torus configuration. In such a configuration, each row contains a set of N interconnections and, with N rows, there are $N^2$ horizontal connections. Similarly, with N columns having N vertical interconnections each, there are $N^2$ vertical interconnections. For the example of FIG. 1A, N=4. The total number of wires, such as the metallization lines in an integrated circuit implementation in a N×N torus-connected computer, including wraparound connections, is therefore $2kN^2$, where k is the number of wires in each interconnection. The number k may be equal to one, in a bit serial interconnection. For example with k=1 for the 4×4 array 10 as shown in FIG. 1A, $2kN^2=32$.

For a number of applications where N is relatively small, it is preferable that the entire PE array is incorporated in a single integrated circuit. The invention does not, however, preclude implementations where each PE can be a separate microprocessor chip, for example. Since the total number of wires in a torus connected computer can be significant, the interconnections may consume a great deal of valuable integrated circuit "real estate", or the area of the chip taken up. Additionally, the PE interconnection paths quite frequently cross over one another complicating the IC layout process and possibly introducing noise to the communications lines through crosstalk. Furthermore, the length of wraparound links, which connect PEs at the North and South and at the East and West extremes of the array, increase with increasing array size. This increased length increases each communication line's capacitance, thereby reducing the line's maximum bit rate and introducing additional noise to the line.

Another disadvantage of the torus array arises in the context of transpose operations. Since a processing element and its transpose are separated by at least one intervening processing element in the communications path, latency is introduced in operations which employ transposes. For example, should the $PE_{2,1}$ require data from its transpose, the $PE_{1,2}$, the data must travel through the intervening $PE_{1,1}$ or $P_{2,2}$. Naturally, this introduces a delay into the operation, even if $PE_{1,1}$ and $PE_{2,2}$ are not otherwise occupied. However, in the general case where the PEs are implemented as microprocessor elements, there is a very good probability that $PE_{1,1}$ and $PE_{2,2}$ will be performing other operations and, in order to transfer data or commands from $PE_{1,2}$ to $PE_{2,1}$, they will have to set aside these operations or commands, in an orderly fashion. Therefore, it may take several operations to even begin transferring data from $PE_{1,2}$ to $PE_{1,1}$ and the operations $PE_{1,1}$ was forced to set aside to transfer the transpose data will also be delayed. Such delays snowball with every intervening PE and significant latency is introduced for the most distant of the transpose pairs. For example the $PE_{3,1}/PE_{1,3}$ transpose pair of FIG. 1A, has a minimum of three intervening PEs, requiring a latency of four communication steps and could additionally incur the latency of all the tasks which must be set aside in all those PEs in order to transfer data between $PE_{3,1}$ and $PE_{1,3}$, in the general case.

Recognizing such limitations of torus connected arrays, new approaches to arrays have been disclosed in, "A Massively Parallel Diagonal Fold Array Processor", G. G. Pechanek et al., 1993 International Conference on Application Specific Array Processors, pp. 140–143, Oct. 25–27, 1993, Venice, Italy, and "Multiple Fold Clustered Processor Torus Array", G. G. Pechanek, et. al., Proceedings Fifth NASA Symposium on VLSI Design, pp. 8.4.1–11, Nov. 4–5, 1993, University of New Mexico, Albuquerque, N.Mex. which are incorporated by reference herein in their entirety. The operative technique of these torus array organizations is the folding of arrays of PEs using the diagonal PEs of the conventional nearest neighbor torus as the foldover edge. As illustrated in the array 20 of FIG. 2A, these techniques may be employed to substantially reduce inter-PE wiring, to reduce the number and length of wraparound connections, and to position PEs in close proximity to their transpose PEs. This processor array architecture is disclosed, by way of example, in U.S. Pat. No. 5,577,262, U.S. Pat. No. 5,612,908 and EP 0,726,532 and EP 0,726,529 which are incorporated herein by reference in their entirety. While such arrays provide substantial benefits over the conventional torus architecture, due to the irregularity of PE combinations, for example in a single fold diagonal fold mesh, some PEs are clustered in groups of two while others are single. In a three fold diagonal fold mesh, there are clusters of four PEs and eight PEs. Due to the overall triangular shape of the arrays, the diagonal fold type of array presents substantial obstacles to efficient, inexpensive integrated circuit implementation. Additionally, in a diagonal fold mesh and other conventional mesh architectures, the interconnection topology is inherently part of the PE definition. This approach fixes the PE's position in the topology, consequently limiting the topology of the PEs and their connectivity to the fixed configuration that is implemented.

Many parallel data processing systems employ a hypercube interconnection topology. A hypercube computer includes $P=2^d$ PEs that are interconnected in a manner which provides a high degree of connectivity. The connections can be modeled geometrically or arithmetically. In the geometric model, the PEs correspond to the corners of a d-dimensional hypercube and the links correspond to the edges of the hypercube. A hypercube with $P=2^d$ PEs can be thought of as two hypercubes with $2^{d-1}$ PEs each, with connections between the corresponding corners of the smaller hypercubes.

In the arithmetic model, each PE is assigned a unique binary index from 0 through d−1. Any two PEs are connected only if the binary representations of their indices differ in exactly 1 bit position. The geometric and arithmetic models can be related to one another by associating each of the d dimensions with a unique bit position. The property of having indices that differ in one bit position is then equivalent to occupying corresponding corners of two (d−1)-dimensional hypercubes. For example, a PE may be assigned a label indicative of its position within the topology. This label $\{D_0, D_1, \ldots D_{r-1}\}$ is a binary representation where each digit indicates an r-dimensional connection path available for communications on the r-D hypercube. Each node in the hypercube is at most one digit D different from its directly connected nodes. For example, the longest path in the hypercube is between a PE $\{D_0, D_1, \ldots D_{r-1}\}$ and its complement $\{\neg D_0, \neg D_1, \ldots \neg D_{r-1}\}$, for example, PE 101101, and PE 010010. Hypercube topologies are discussed in Robert Cypher and Jorge L. C. Sanz, "The SIMD Model of Parallel Computation" 1994 Springer-Verlag, N.Y., pp. 61–68 and F. Thomas Leighton, "Introduction To Parallel Algorithms and Architectures: Arrays, Trees, Hypercubes," 1992 Morgan Kaufman Publishers, Inc., San Mateo, Calif., pp. 389–404, which are hereby incorporated by reference. One drawback to the hypercube topology is that the number of connections to each processor grows logarithmically with the size of the network. Additionally, inter-PE communications within a hypercube may be burdened by substantial latency, especially if the PEs are complements of one another.

Multi-dimensional hypercubes may be mapped onto a torus, a diagonal-fold torus, or other PE arrangements. Such mappings will be discussed briefly below. Although the figures related to this discussion, and all the other figures within this application, unless otherwise noted, illustrate each PE interconnection as a single line, the line represents an interconnection link that may be a bi-directional tri-state link or two unidirectional links. The bidirectional tri-state links support signal source generation at multiple points on a link, under a control scheme that prevents data collisions on the link. The unidirectional links use a point to point single source, single receiver pair for any interfacing signals. In addition, bit-serial and multi-bit parallel implementations are also contemplated.

A hypercube may be mapped onto a torus in which the 2-dimensional torus is made up of Processor Elements (PEs), and as, illustrated in FIGS. 1A and 1D, each PE has associated with it a torus node (row and column), as indicated by the top PE label, and a hypercube PE number that is indicated by the bottom label within each PE. The hypercube PE number or node address is given as an r-digit representation for an r-dimensional (rD) hypercube in which each digit represents a connectivity dimension. Each PE within a hypercube is connected to only those PEs whose node addresses vary from its own by exactly one digit. This interconnection scheme allows a 4D hypercube to be mapped onto a 4×4 torus as shown in FIGS. 1A and 1D. FIG. 1A encodes the $PE_{i,j}$ node with a Gray code encoding $PE_{G(i),G(j)}$, which is a sequence in which only a single binary digit changes between sequential numbers. For example, the decimal sequence 0, 1, 2, 3, would be written 00, 01, 10, 11 in a binary sequence, while the Gray code sequence would be 00, 01, 11, 10. FIG. 1D shows an alternative hypercube mapping onto a nearest neighbor torus.

One of the earliest implementations of a hypercube machine was the Cosmic Cube which was a 6D-hypercube from Caltech, C. Seitz, "The Cosmic Cube," Communications of the ACM, Vol. 28, No. 1, pp. 22–33, 1985. The Cosmic Cube was implemented with Intel 8086 processors running in a Multiple Instruction Multiple Data (MIMD) mode and using message passing to communicate between hypercube connected processors. Another hypercube implementation, the NCUBE, consists, in one large configuration, of a 10-D hypercube using custom processor chips that form nodes of the hypercube. The NCUBE is a MIMD type of machine but also supports a Single Program Multiple Data (SPMD) mode of operation where each node processor has a copy of the same program and can therefore independently process different conditional code streams. The Connection Machine (CM) built by Thinking Machines Corporation, was another hypercube implementation. The initial, CM-1, machine was a 12D-hypercube with each node including a 4×4 grid of bit-serial processing cells.

One disadvantage of conventional hypercube implementations such as these, is that each processing element must have at least one bidirectional data port for each hypercube dimension As discussed in further detail below, one aspect of the present invention is that our PEs are decoupled from the network topology needing only one input port and one output port.

Furthermore, since each additional hypercube dimension increases the number of ports in each PE, the design of each PE soon becomes unwieldy, with an inordinate percentage of the PE devoted to data ports. Additionally, communications between complement PEs become burdened by greater and greater latency as the "diameter", that is, the number of communication steps between complement PEs, of a hypercube expands. In other words, providing a connection between a node address and its complement, the longest paths between hypercube PE nodes, would be difficult and costly to obtain and would certainly not be scalable.

Thus, it is highly desirable to provide a high degree of connectivity between processing elements within parallel arrays of processors, while minimizing the wiring required to interconnect the processing elements and minimizing the communications latency encountered by inter-PE communications. A need exists for further improvements in multi-processor array architecture and processor interconnection, and the present invention addresses these and other such needs as more fully discussed below.

SUMMARY OF THE INVENTION

The present invention is directed to an array of processing elements which improves the connectivity among the processing elements while it substantially reduces the array's interconnection wiring requirements when compared to the wiring requirements of conventional torus or hypercube processing element arrays. In a preferred embodiment, one array, in accordance with the present invention, achieves a substantial reduction in the latency of transpose operations and latency of communications between a PE node and it hypercube complement node. Additionally, the inventive array de-couples the length of wraparound wiring from the array's overall dimensions, thereby reducing the length of the longest interconnection wires. Also, for array communications patterns that cause no conflict between the communicating PEs, only one transmit port and one receive port are required per PE, independent of the number of neighborhood connections a particular topology may require of its PE nodes. A preferred integrated circuit implementation of the array includes a combination of similar processing element clusters combined to present a rectangular or square outline. The similarity of processing elements, the similarity of processing element clusters, and the regularity of the array's overall outline make the array particularly suitable for cost-effective integrated circuit manufacturing.

To form an array in accordance with the present invention, processing elements may first be combined into clusters which capitalize on the communications requirements of single instruction multiple data ("SIMD") operations. The processing elements are then completely connected within the cluster. Processing elements may then be grouped so that the elements of one cluster communicate within a cluster and with members of only two other clusters. Furthermore, each cluster's constituent processing elements communicate in only two mutually exclusive directions with the processing elements of each of the other clusters. By definition, in a SIMD torus with unidirectional capability, the North/South directions are mutually exclusive with the East/West directions. Processing element clusters are, as the name implies, groups of processors formed preferably in close physical proximity to one another. In an integrated circuit implementation, for example, the processing elements of a cluster preferably would be laid out as close to one another as possible, and preferably closer to one another than to any other processing element in the array. For example, an array corresponding to a conventional four by four torus array of processing elements may include four clusters of four elements each, with each cluster communicating only to the North and East with one other cluster and to the South and West with another cluster, or to the South and East with one other cluster and to the North and West with another cluster. By clustering PEs in this manner, communications paths between PE clusters may be shared, through multiplexing, thus substantially reducing the interconnection wiring required for the array.

In a preferred embodiment, the PEs comprising a cluster are chosen so that processing elements, their transposes and the hypercube complement PEs are located in the same cluster and communicate with one another through intra-cluster communication paths, thereby eliminating the latency associated with transpose operations carried out on conventional torus arrays and communication between hypercube complement PEs carried out on a conventional hypercube array. Additionally, since the conventional wrap-around path is treated the same as any PE-to-PE path, the longest communications path may be as short as the inter-cluster spacing, regardless of the array's overall dimension.

Each PE contains a virtual PE address storage unit and a configuration controller. The virtual PE number and configuration control information are combined to determine the settings of cluster switches and to thereby reconfigure the PE array's topology. This reconfiguration may be in response to a dispatched instruction from a controller, for example. PEs within an array are clustered so that a PE and its transpose are combined within a cluster and a PE and its hypercube complement are contained within the same cluster. Additionally, the dynamic reconfiguration, in combination with cluster switches which permit complete inter-PE connectivity within each cluster, provides the ability to reconfigure the array into a wide variety of topologies.

In another aspect, the PEs in a cluster may advantageously have the same interface to the cluster switch which completely connects the PEs within the cluster and allows each virtual PE, within the cluster, the same access to two external orthogonal clusters. Now, there are really two networks in place with a cluster switch in accordance with the teachings of the present invention. One that completely connects the PEs in the clusters to each other, and one that connects the PEs to other cluster PEs thereby providing the connection paths necessary for torus and hypercube connectivity. The connection paths internal to the cluster switch provide the transpose and hypercomplement connectivity. With a different virtual PE arrangement, the transpose could be effected across clusters. For such a 4PE cluster switch and its interconnections to the other 4PE clusters there may be only four output buses that are produced for any cluster. Each of these four buses, in any cluster, have two orthogonal cluster connection points. In manifold array processing in accordance with the present invention, enhanced connectivity hypercube may be provided in which each cluster of 4 nodes has only 4 output buses, each with a fanout of 3, one internal to the switch and one for each of the orthogonal clusters. From the receive side there are three signals being received per virtual node, one internal to the switch and one from each of the orthogonal clusters.

These and other features, aspects and advantages of the invention will be apparent to those skilled in the art from the following detailed description, taken together with the accompanying drawings.

BRIEF DESCRIPTION OF THE DRAWINGS

FIG. 4 is a block diagram illustrating the clustering of PEs within a manifold array, and the inter-cluster communications of PEs;

FIGS. 8B and 8C are block diagrams which illustrates the interconnection paths between PE clusters in greater detail, using cluster switches that do not include buffers;

FIG. 21A is a Table indicating the node elements of a 4D hypercube embedded onto a torus;

FIG. 21B is an improved manifold array table indicating placement of embedded hypercube nodes;

FIG. 22 is a 4×4×4 representation after 1D down rotation of columns;

DETAILED DESCRIPTION

Figure 1A:
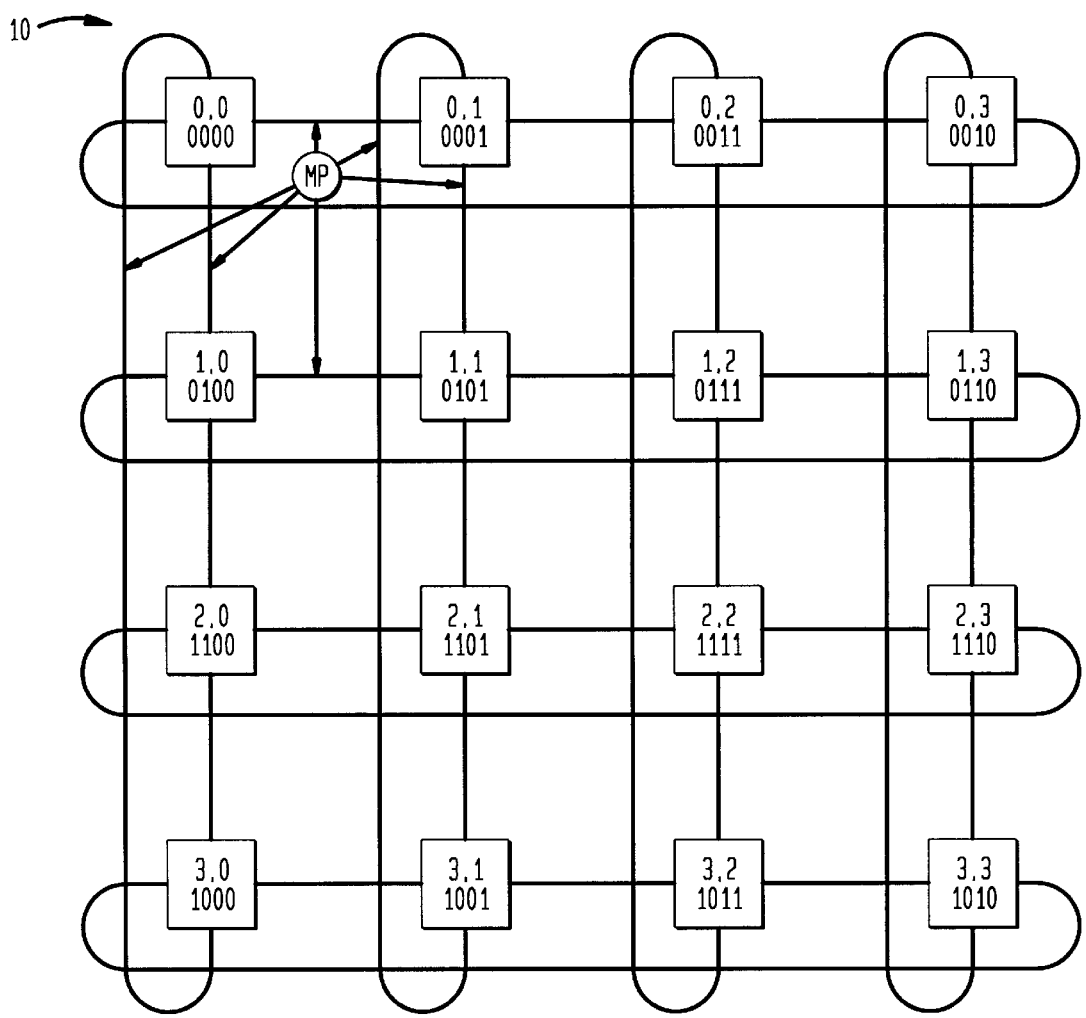
FIG. 1A is a block diagram of a prior art 4×4 nearest neighbor connected torus processing element (PE) array.
Figure 1B:
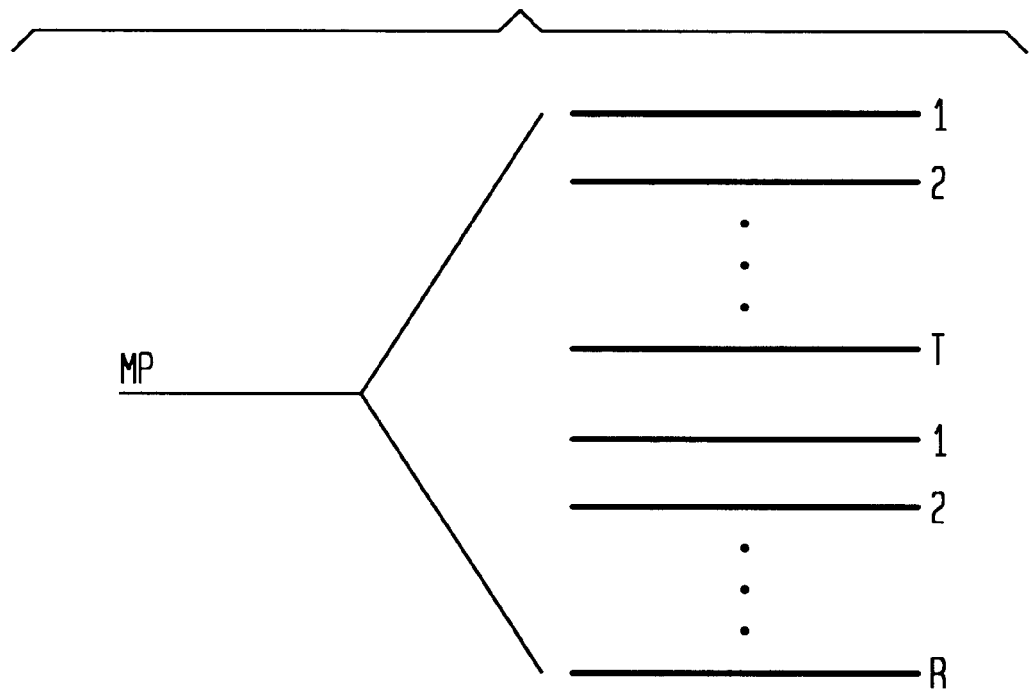
FIG. 1B illustrates how the prior art torus connection paths of FIG. 1A may include T transmit and R receive wires.
Figure 1C:
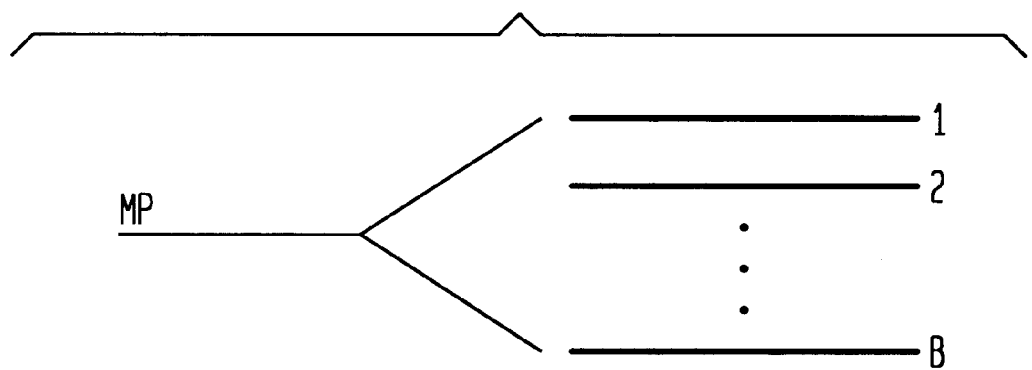
FIG. 1C illustrates how prior art torus connection paths of FIG. 1A may include B bidirectional wires.
Figure 1D:
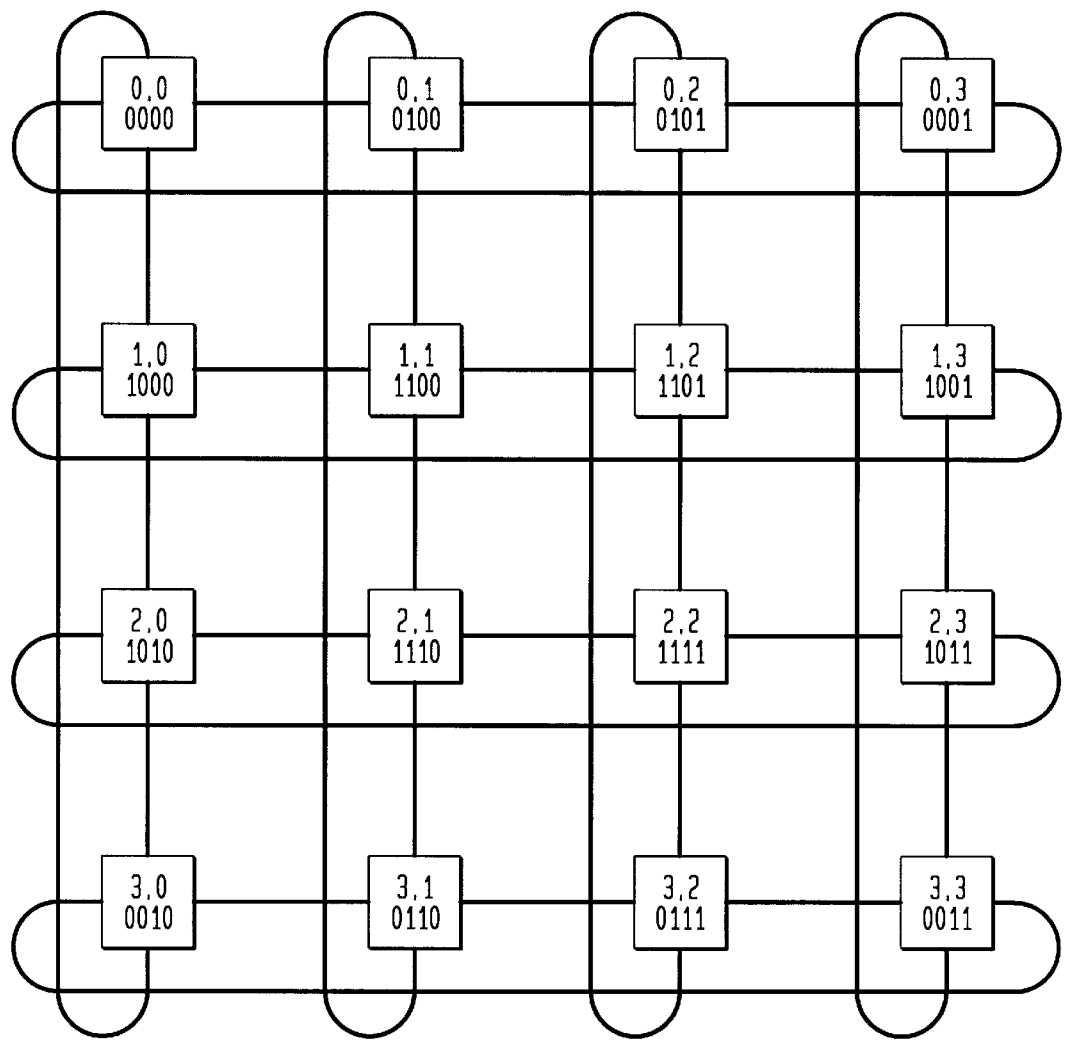
FIG. 1D is a block diagram of a second prior art 4×4 nearest neighbor connected torus PE array.

In one embodiment, a manifold array processor in accordance with the present invention combines PEs in clusters, or groups, such that the elements of one cluster communicate directly with members of only two other clusters and each cluster's constituent processing elements communicate directly in only two mutually exclusive directions with the processing elements of each of the other clusters. By clustering PEs in this manner, communications paths between PE clusters may be shared, thus substantially reducing the interconnection wiring required for an array. Additionally, each PE may have a single transmit port and a single receive port or, in the case of a bidirectional, sequential or time-sliced communications implementation, a single transmit/ receive port. As a result, the individual PE are de-coupled from the array architecture. That is, unlike a conventional N-dimensional hypercube-connected array where each PE has N communication ports. In implementations which utilize a single transmit and a single receive port, all PEs in the array may simultaneously transmit and receive. In a conventional 6D hypercube, this would require six transmit and six receive ports, a total of twelve data ports, for each PE. With the present invention, only one transmit- and one receive-port, a total of two data ports are required, regardless of the hypercube's dimension. As noted above, the transmit and receive data ports may be combined into one transmit/receive data port if bidirectional, sequential or time-sliced data communications are employed. Each PE contains a virtual PE storage unit and a configuration control unit. The virtual PE number and configuration control information are combined to determine the settings of cluster switches, to control the direction of communications, and to reconfigure the PE array's topology. This reconfiguration may be in response to a dispatched instruction from a controller, for example. PEs within an array are clustered so that a PE and its transpose are combined within a cluster and a PE and its hypercube complement are contained with the same cluster.

In one presently preferred embodiment, the PEs comprising a cluster are chosen so that processing elements and their transposes are located in the same cluster and communicate with one another through intra-cluster communication paths. For convenience of description, processing elements are referred to as they would appear in a conventional torus array, for example, processing element $PE_{0,0}$ is the processing element that would appear in the "Northwest" corner of a conventional torus array, or, in other words, in row 0 and column 0. Consequently, although the layout of the new cluster array is substantially different from that of a conventional array processor, the same data would be supplied to corresponding processing elements of the conventional torus and new cluster arrays. For example, the 0,0 element of the new cluster array would receive the same data to operate on as the 0,0 element of a conventional torus-connected array. Additionally, the directions referred to in this description will be in reference to the directions of a torus-connected array. For example, when communications between processing elements are said to take place from North to South, those directions refer to the direction of communication within a conventional torus-connected array.

Figure 3A:
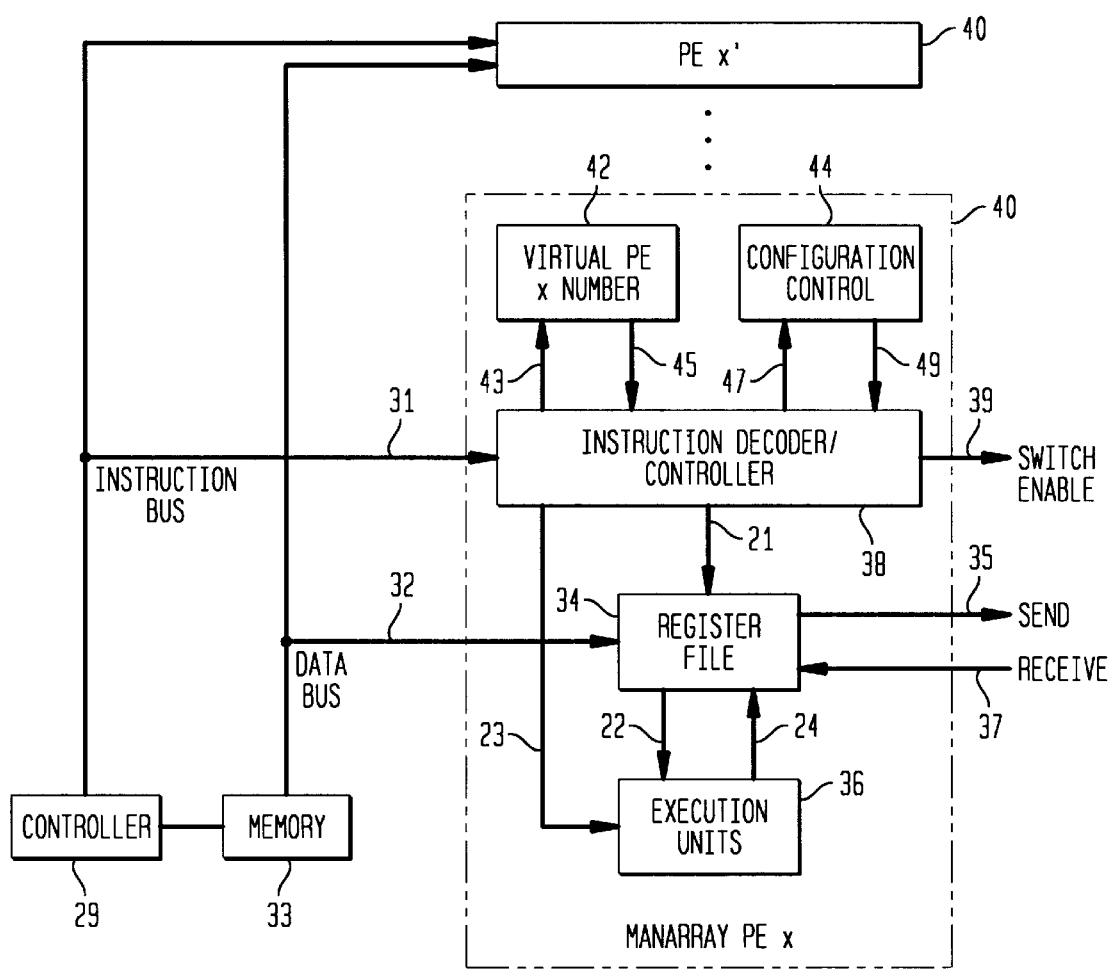
FIGS. 3A–3C are block diagrams of processing elements which may suitably be employed within PE arrays in accordance with the present invention.

The PEs may be single microprocessor chips of the Single Instruction-stream Single Data-stream (SISD) type. Though not limited to the following description, a basic PE will be described to demonstrate the concepts involved. FIG. 3A shows the basic structure of a PE 40 illustrating one suitable embodiment which may be utilized for each PE for the new PE array of the present invention. For simplicity of illustration, interface logic and buffers are not shown. An instruction bus 31 is connected to receive dispatched instructions from a SIMD controller 29, a data bus 32 is connected to receive data from memory 33 or another data source external to the PE 40. A register file storage medium 34 provides source operand data to execution units 36. An instruction decoder/controller 38 is connected to receive instructions through the instruction bus 31 and to provide control signals via a bus 21 to registers within the register file 34. The registers of the file 34 provide their contents via path 22 as operands to the execution units 36. The execution units 36 receive control signals 23 from the instruction decoder/controller 38 and provide results via path 24 to the register file 34. The instruction decoder/controller 38 also provides cluster switch enable signals on an output line 39 labeled Switch Enable. The functions of cluster switches will be discussed in greater detail below in conjunction with the discussion of FIGS. 5 and 6. Inter-PE communication of data or commands are received at receive input 37 labeled Receive and are transmitted from a transmit output 35 labeled Send.

A virtual PE storage unit 42 is connected to the instruction decoder/controller 38 through respective store 43 and retrieve 45 lines. The virtual PE number may be programmed by the controller 29 via instructions received at the decoder/controller 38, which transmits the new virtual PE number to the storage unit 42. The virtual PE number may be used by the controller 29 to dynamically control the position of each PE within a topology, within the limits imposed by the connection network. A configuration controller 44 is connected through respective store 47 and retrieve 49 lines to the instruction decoder/controller 38. The configuration controller 44 provides configuration information, such as the current configuration and provides the control information to cluster switches. These switches control the connection of PEs to other PEs within the array. The decoder/controller 38 combines the current configuration from the configuration controller 44, the virtual PE address from the virtual PE storage unit 42, and communication operation information, such as "communicate between transpose PEs" conveyed by instructions from the controller 29 and communicates this information to the cluster switches. The decoder/controller 38 includes switch control logic which employs this information to determine the proper settings for cluster switches, which will be discussed in greater detail in relation to FIG. 6 and transmits this information through the switch enable interface 39. The switch control logic, a cluster switch instruction decoder/controller, and a configuration controller could be incorporated in the cluster switches, outside the bounds of the PE. It is possible to separate these functions since the new PE node is defined as independent of the topology connections. In the presently preferred embodiment, the total logic and overall functionality are improved by not separating the control functions, even though the control functions are independent.

Figure 3B:
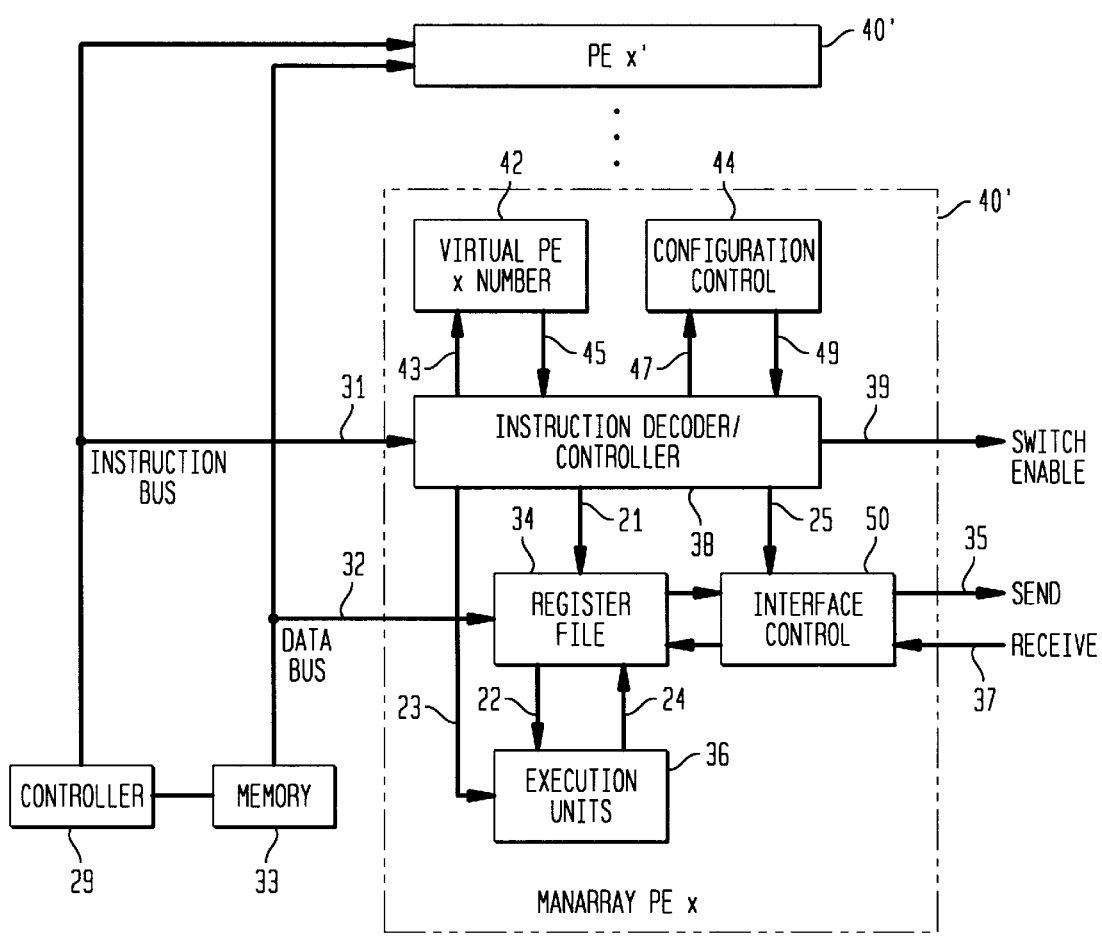
Figure 3C:
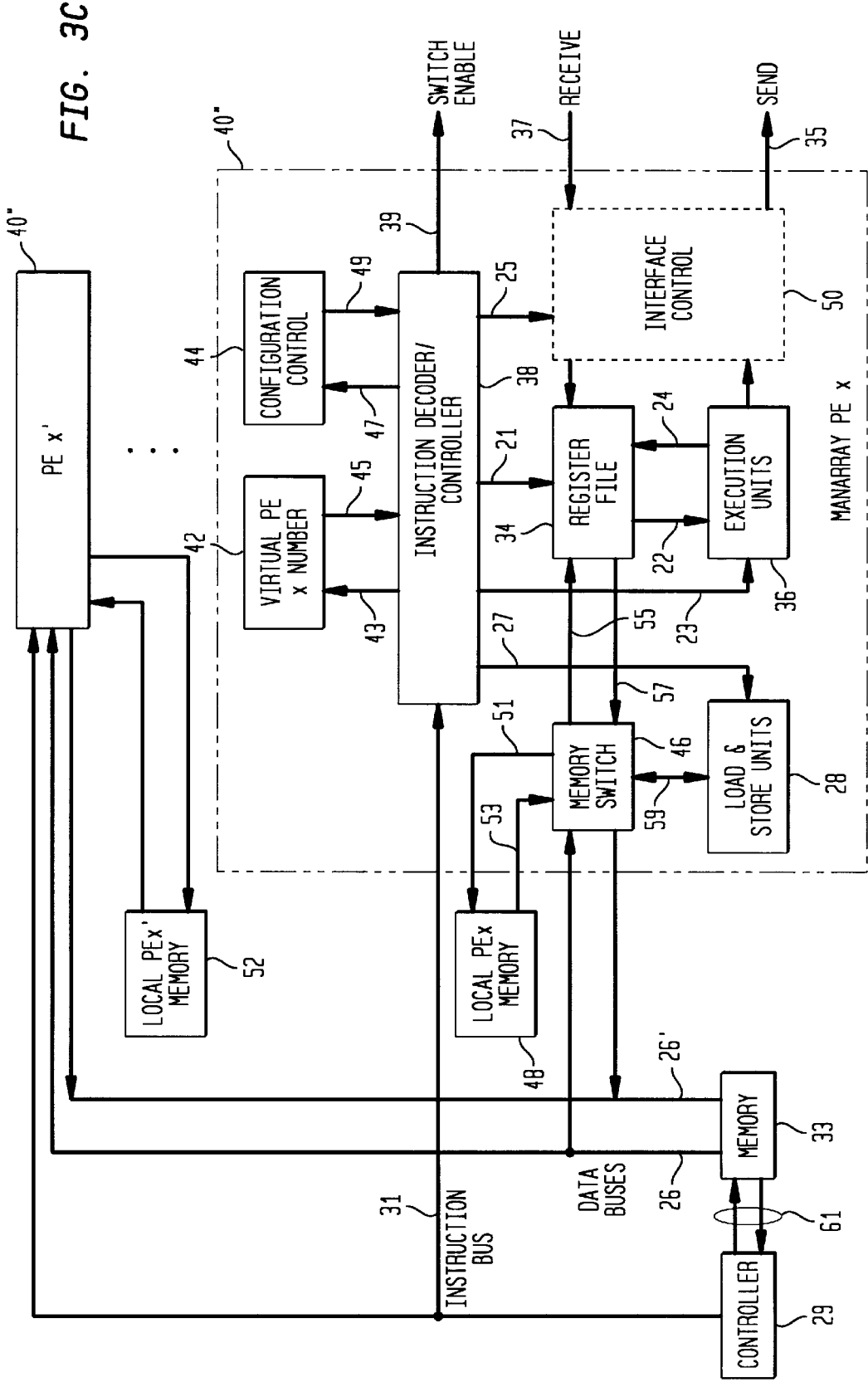
Figure 3D:
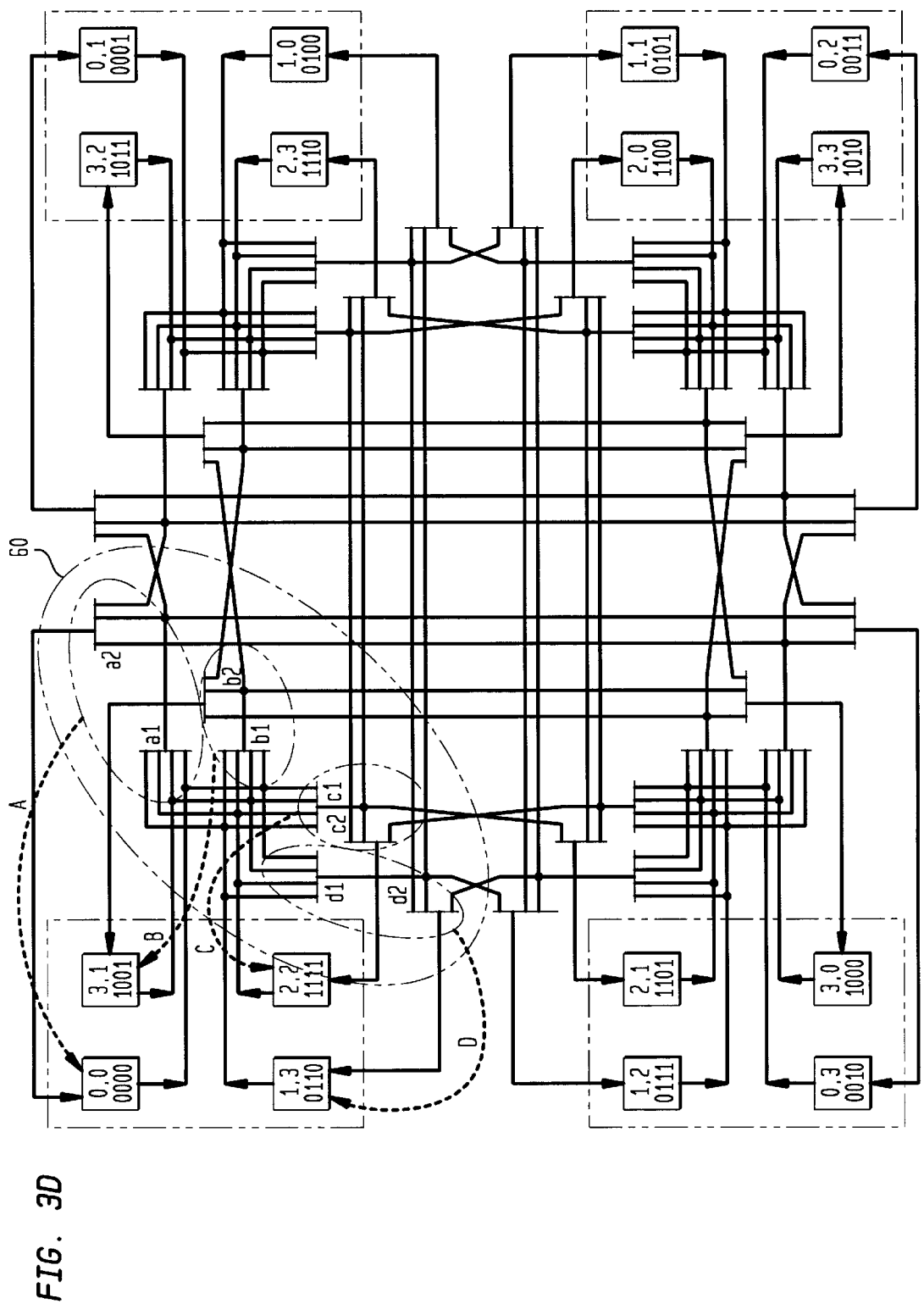
FIG. 3D illustrates further aspects of cluster switch control according to the present invention.

In FIG. 3D, for example, a suitable cluster switch 60 is shown to illustrate further details of cluster switch control. The cluster switch 60 is shown partitioned into four groups A, B, C, and D, each consisting of a 4-input multiplexer and a 3-input multiplexer. Each of these groups is associated with a particular PE in the PE-cluster and this association has been indicated with the dotted line arrows. For example, $PE_{0,0}$ is associated with the "A" group multiplexers a1 and a2. The multiplexers in these groups are controlled by their associated PE. By controlling these multiplexes as shown, the normal SIMD mode of operation is preserved.

In SIMD mode of operation, all PEs receive the controller dispatched instructions and act upon them in synchronism. All instructions, including those which uniquely specify an operation that is dependent upon the PE's ID, are dispatched to all PEs. The instructions are received by all the PEs and then decoded and executed by all or subsets of the PEs dependent upon the opcode, possibly with an opcode extension field in the instruction, and PE enable/disable flags selectable under program control by instructions dispatched from the controller 29. The opcode and its extension field specify the set of PEs, including a set of 1, that would execute the received instruction. The PE enable/disable flags determine the level of activity a PE can respond with. For example, the following flags might suitably be employed:

Level 0: totally disabled PE;
  all received instructions treated as NOPs.
Level 1: Partially enabled PE; a PE receives control information:
  allows the loading of control information such as the virtual PE ID, saturate/unsaturate mode, and the like,
  allows the storing of control information such as reading status registers, all arithmetic and communications instructions are treated as NOPs Level 2: Partially enabled PE; a PE receives control information:
allows the loading of control information such as the virtual PE ID, saturate/unsaturate mode, and the like,
allows the storing of control information such as reading status registers,
all arithmetic instructions are treated as NOPs
all communications instructions are executed.

Level 3: Fully enabled PE;
all received instructions are executed.

For a given size manifold array, the allowed configurations may be predetermined, with a choice, for example, of a 4D, 5D or 6D hypercube. In such an embodiment, the possible node identities could be "hardwired", that is, actually fixed in nonvolatile fashion as a part of an integrated circuit implementation. Then, the virtual PE numbers for a given configuration are implied by a single instruction from the controller 29 sent to all the PEs 40 within the array. The instruction would preferably be interpreted by the decoder/controller 38 within each PE to assign the appropriate virtual PE number to respective PEs. Each decoder/controller 38 could, effectively, perform a table lookup operation, with respective locations within each PE storage area 42 containing the virtual PE number for the PE and the configuration.

The PE 40' of FIG. 3B, in which similar elements share the designation numbers of the PE 40 of FIG. 3A, includes an interface control unit 50 connected to the instruction decoder/controller 38 and to the register file 34. The control unit 50 provides data formatting operations, such as parallel to serial conversion, data encryption, and data format conversions, based upon control signals obtained from the decoder/controller 38 via signal lines 25. In the alternative embodiment of FIG. 3C, showing PE 40", the send path 37 is generated by one or more execution units 36 and the receive path 35 is connected, either directly, or through the interface control unit 50 to the register file 34. The interface control unit 50 formats data based upon control signals received from the instruction decoder/controller 38 via signal line or lines 25. The data formatting performed by the interface control unit may include, for example, parallel to serial conversion, serial to parallel conversion, data encryption, and data format conversions.

The alternative PE 40" also includes the addition of local memory blocks 48 and 52 to each PE 40". Data bus 32 from FIGS. 3A and 3B is shown in more detail in FIG. 3C to include both a load path bus 26 and a store path bus 26'. Both of these buses can be implemented with tri-state techniques or as multiple unidirectional buses and may have varying bus widths, for example, 16-bits, 32-bits, 64-bits. A variety of control signals such as address and bus protocol signals may suitably be employed. In addition, each of the buses 26 and 26' can be implemented as two buses one under direct control of the controller 29 a DMA unit. The controller load bus could be used, for example, for the loading of internal controller register contents into the PEs and the read bus could be used for the reading of internal PE register contents such as status bits. The controller 29 has access to these buses over the interface lines 61 which connect controller 29 to memory. The DMA load bus would be used for the loading of blocks of memory from the memory 33 into the PEs local memory 48 and the DMA read bus would be used for the storing of blocks of data from the local memory 48 to the memory 33. The DMA function is preferably part of the controller 29. The memory switch 46 is used to connect the PE local memory 48 through the buses 51 and 53 and the buses 55 and 57 to the PE register file 34. The memory switch 46 also connects the memory 33 through buses 26 and 26' and buses 55 and 57 to the PE register file 34. The memory switch control signals are received from the load and store units 28 over control interface 59. The load and store units 28 receive load and store instruction information from the instruction decoder/controller 38 over interface 27. Based upon the received instruction information, the load and store units 28 generate the switch controls for the memory switch 46. All instructions dispatched to the array of PEs from the controller 29 are interpreted in the same manner within each PE in the array. The dispatched PE instructions are not tagged to individual PEs or groups of PEs.

A 4×4 array of PEs is illustrated in FIG. 4. Four clusters 52, 54, 56 and 58 of four PEs each are combined in the array of FIG. 4. Cluster switches 86 and communication paths 88 connect the clusters in a manner explained in greater detail in copending patent application Ser. No. 08/885,310 filed Jun. 30, 1997, which is hereby incorporated by reference in its entirety. Although, in this view, each processing element is shown as having two input and two output ports, in the preferred embodiment, another layer of multiplexing within the cluster switches brings the number of communications ports for each PE down to one for input and one for output. In a standard torus with four neighborhood transmit connections per PE and with unidirectional communications, that is, only one transmit direction enabled per PE, there are four multiplexed transmit paths required in each PE. This is due to the interconnection topology defined as part of the PE. The net result is that there are $4N^2$ multiple transmit paths in the standard torus. In the manifold array, with equivalent connectivity and unlimited communication, only $2N^2$ multiplexed transmit paths are required. This reduction of transmit paths translates into a significant savings in integrated circuit real estate, as the area consumed by the multiplexers and $2N^2$ transmit paths is significantly less than that consumed by $4N^2$ transmit paths. The communication paths are labeled N, S, E, W, corresponding to the communication directions within a torus-connected array.

Figure 5:
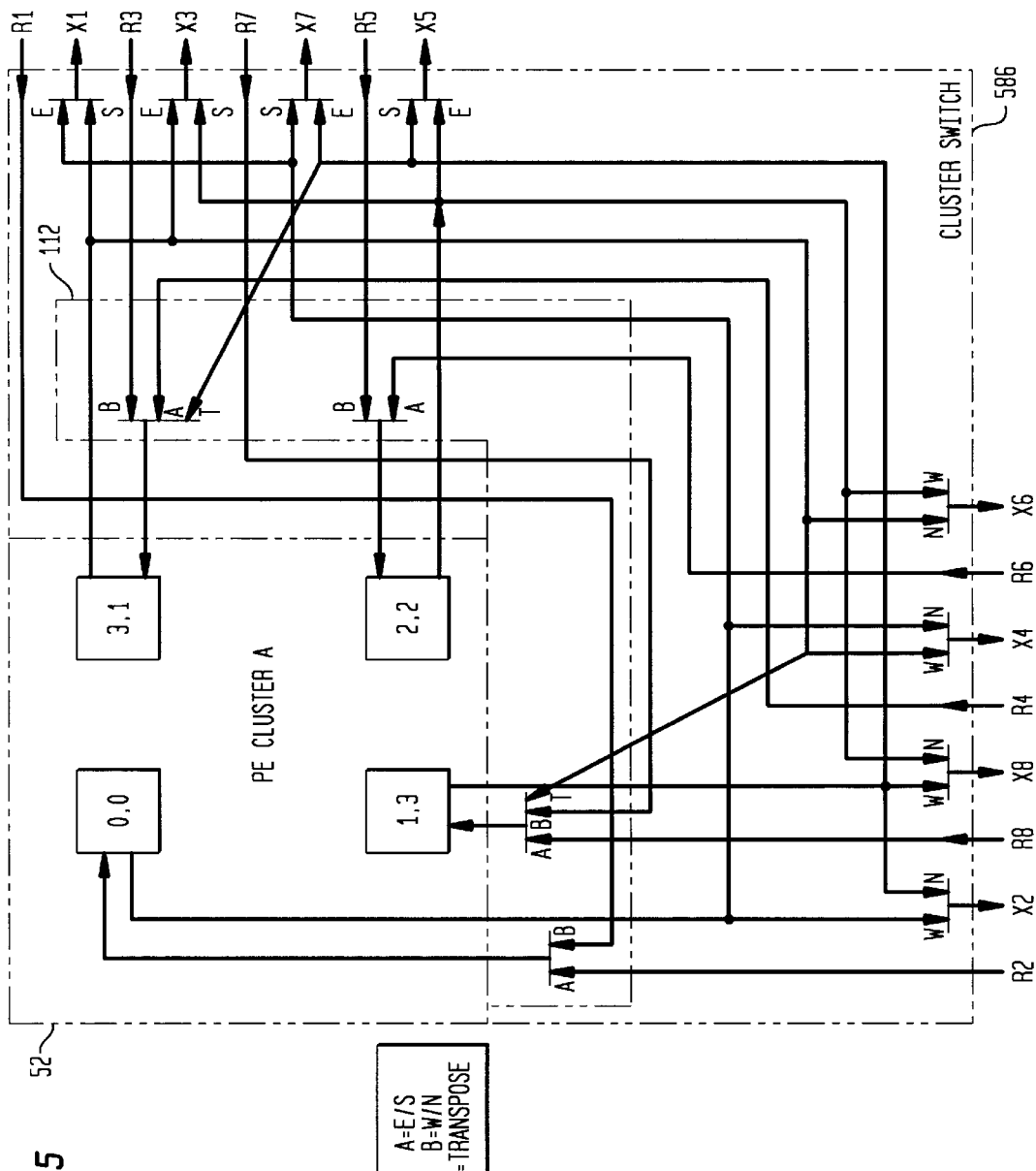
FIG. 5 is a block diagram of an individual PE cluster from FIG. 4, showing further details of a cluster switch.

One embodiment of a complete cluster switch 86 is illustrated in the block diagram of FIG. 5. The North, South, East, and West outputs are as previously illustrated. Another layer of multiplexing 112 has been added to the cluster switch 86. This layer of multiplexing selects between East/South reception, labeled A, and North/West reception, labeled B, thereby reducing the communications port requirements of each PE to one receive port and one send port. Additionally, multiplexed connections between transpose $PE_{1,3}$ and $PE_{3,1}$ are effected through the intra-cluster transpose connections labeled T. When the T multiplexer enable signal for a particular multiplexer is asserted, communications from a transpose PE are received at the PE associated with the multiplexer.

In the preferred embodiment, all clusters include transpose paths such as this between a PE and its transpose PE. These figures illustrate the overall connection scheme and are not intended to illustrate how a multi-layer integrated circuit implementation may accomplish the entirety of the routine array interconnections that would typically be made as a routine matter of design choice. As with any integrated circuit layout, the IC designer would analyze various tradeoffs in the process of laying out an actual IC implementation of an array in accordance with the present invention. For example, the cluster switch may be distributed within the PE cluster 1, to reduce the wiring lengths of the numerous interfaces.

Figure 6:
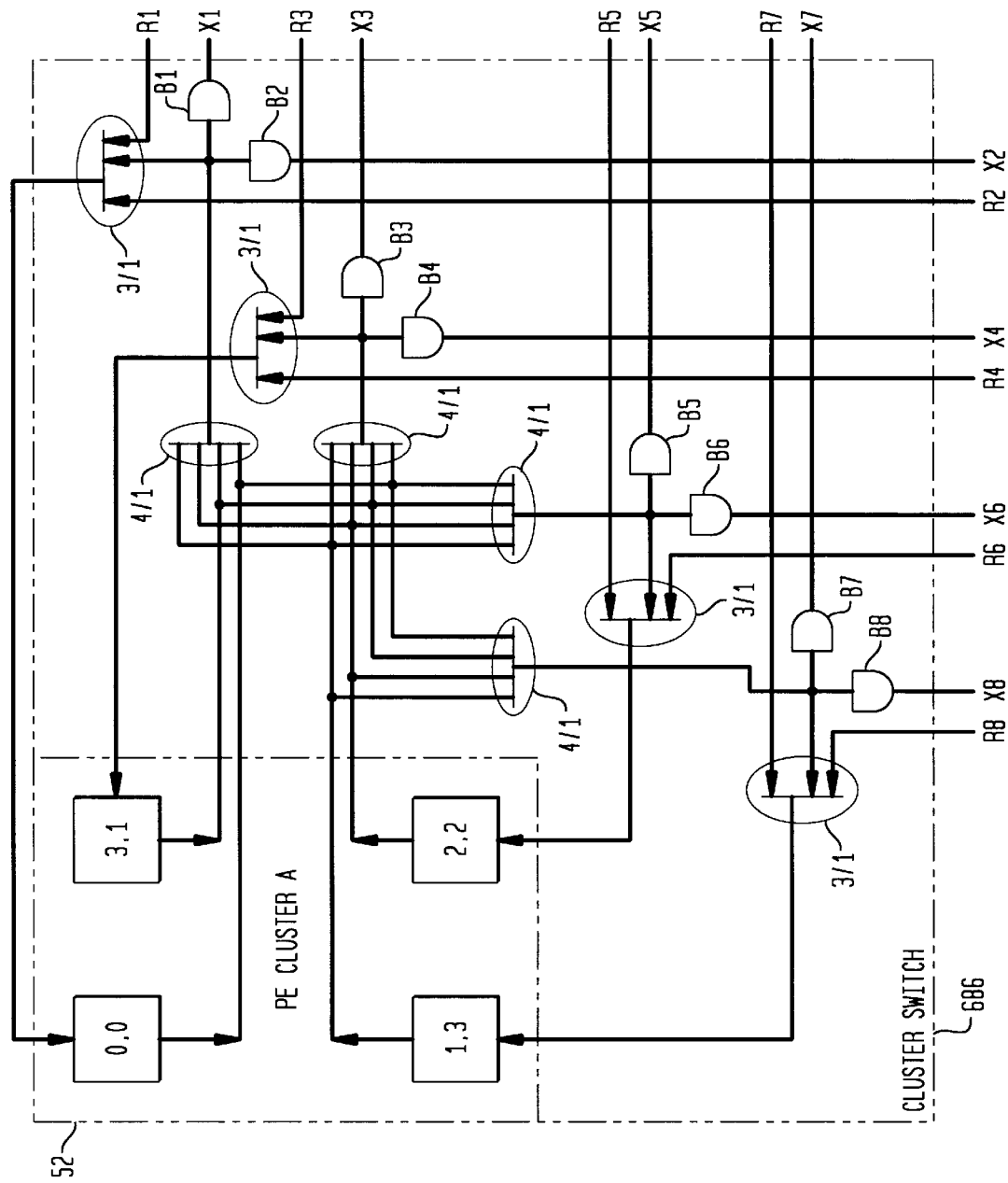
FIG. 6 is a block diagram of an improved PE cluster in the present invention, along with an improved cluster switch.

The change in multiplexing required to extend the connectivity in the 4 PE clusters to support multidimensional arrays and simplify the implementation is illustrated in the cluster switch 686 of FIG. 6. In order to simplify the description, unidirectional links are assumed unless otherwise stated. The multiplexers in FIG. 6 have an enable signal associated with each data path input. These enable signals can be generated by separate signal lines from a SIMD controller, indirectly from decoded dispatched instructions received within individual PEs, or from within the switch clusters. A separate controlling mechanism can be provided in the switch clusters that receives dispatched instructions from the SIMD controller, decodes the instructions, and, by a separate decoder/controller mechanism, generates the multiplexed enable signals. In the presently preferred embodiment, the cluster switch multiplexed enable signals are generated within the PEs. Four four-to-one transmit multiplexers and four three-to one receive multiplexers, each respectively labeled 4/1 and 3/1, are employed within this preferred embodiment.

The FIG. 6 extensions to the cluster switch 586 shown in FIG. 5 include the replacement of the eight 2-input transmit multiplexers {x1, x3, x5, x7, x2, x4, x6, x8} with four 4-input multiplexers 4/1. The four 2 and three 3-input receive multiplexers of FIG. 5 with enable signals labeled {A, B} and {A, B, T} are replaced with the four 3-input receive multiplexers 3/1, and the gating/buffering of the transmit lines is added by including gates/buffers B1–B8. The four 4-input transmit multiplexers provide complete connectivity among the four PEs within the cluster 52. The cluster switch 686 of FIG. 6 represents a superset of the connectivity supplied by the cluster switch 586 of FIG. 5. There are many ways to lay out the internal wiring in the cluster switches and the FIG. 6 representation shows the connecting points and not how a multi-layer silicon implementation would accomplish the connections.

Figure 7:
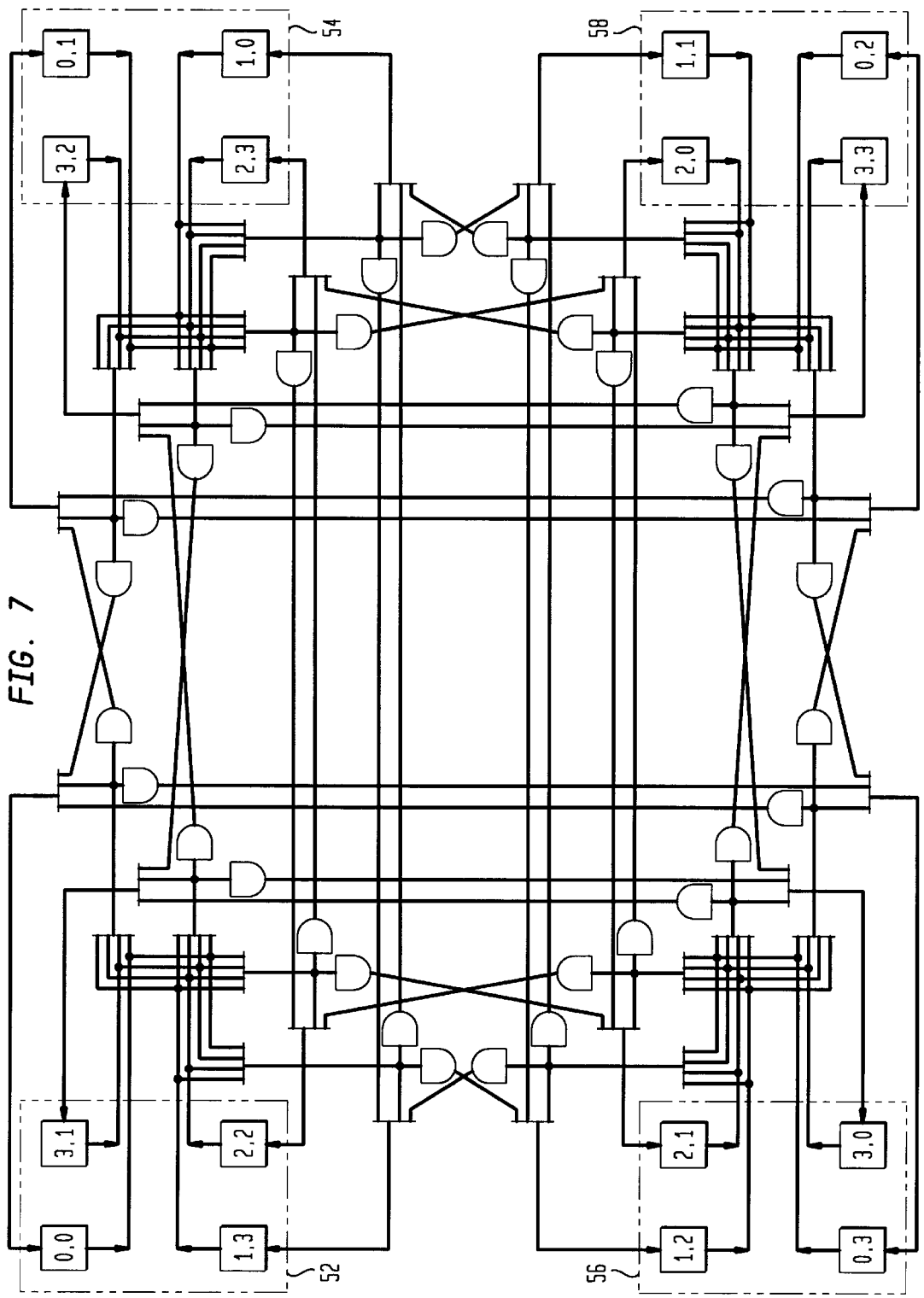
FIG. 7 is a block diagram which illustrates the interconnection paths between PE clusters in greater detail.
Figure 9A:
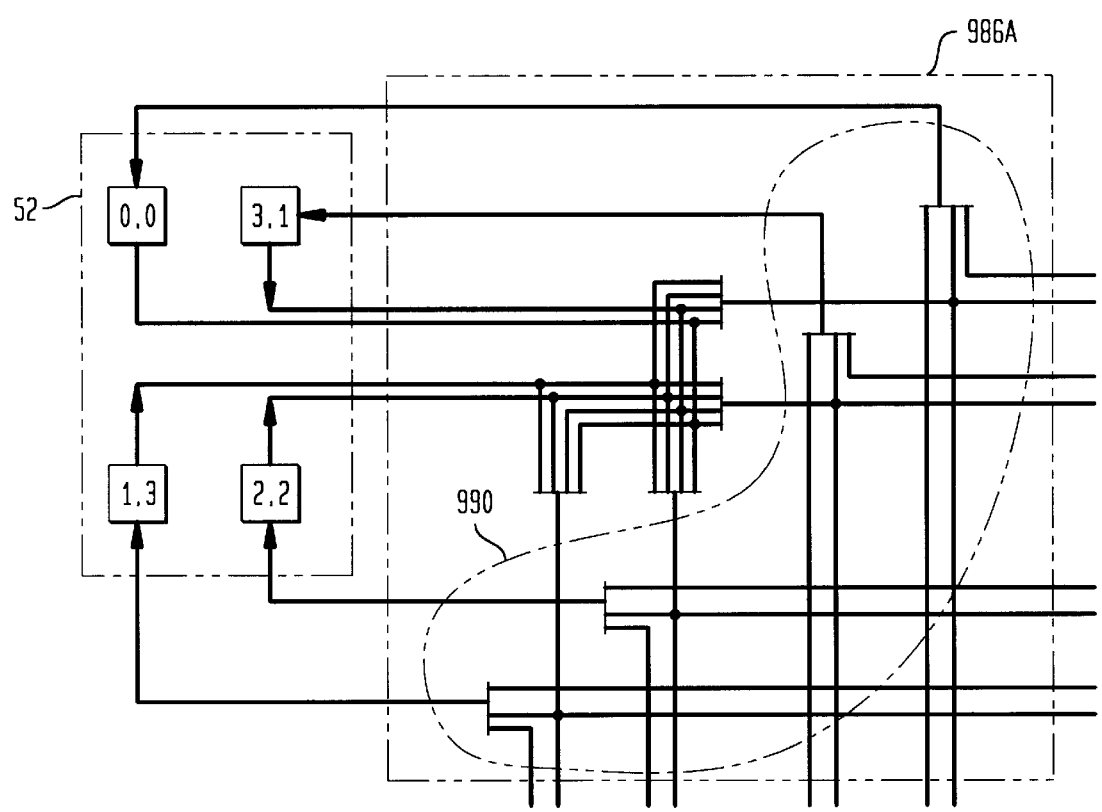
FIG. 9A is a block diagram of a 2×2 cluster showing the interconnection paths to the other orthogonal 2×2 clusters making up a large array.

PE clusters 52, 54, 56, and 58 are organized in a 4×4 manifold array in the block diagram of FIG. 7. The gating/buffering of the transmit lines are required for the general case where the PE clusters and their cluster switches are not located on the same piece of silicon and may be separated by a physical distance requiring board wiring or the cabling of the signals between the clusters. In addition, for power and layout reasons, it might be important to gate/buffer the transmit signals in order to reduce noise and power. However, in the preferred embodiment the manifold array organization is incorporated on a single chip, or integrated circuit, and the cluster switches of the four clusters of PEs are located physically close together so that the gating/buffering circuitry can be removed. The cluster organization of FIG. 6 is illustrated with this buffering removed, in cluster 986A of FIG. 9A.

Figure 8A:
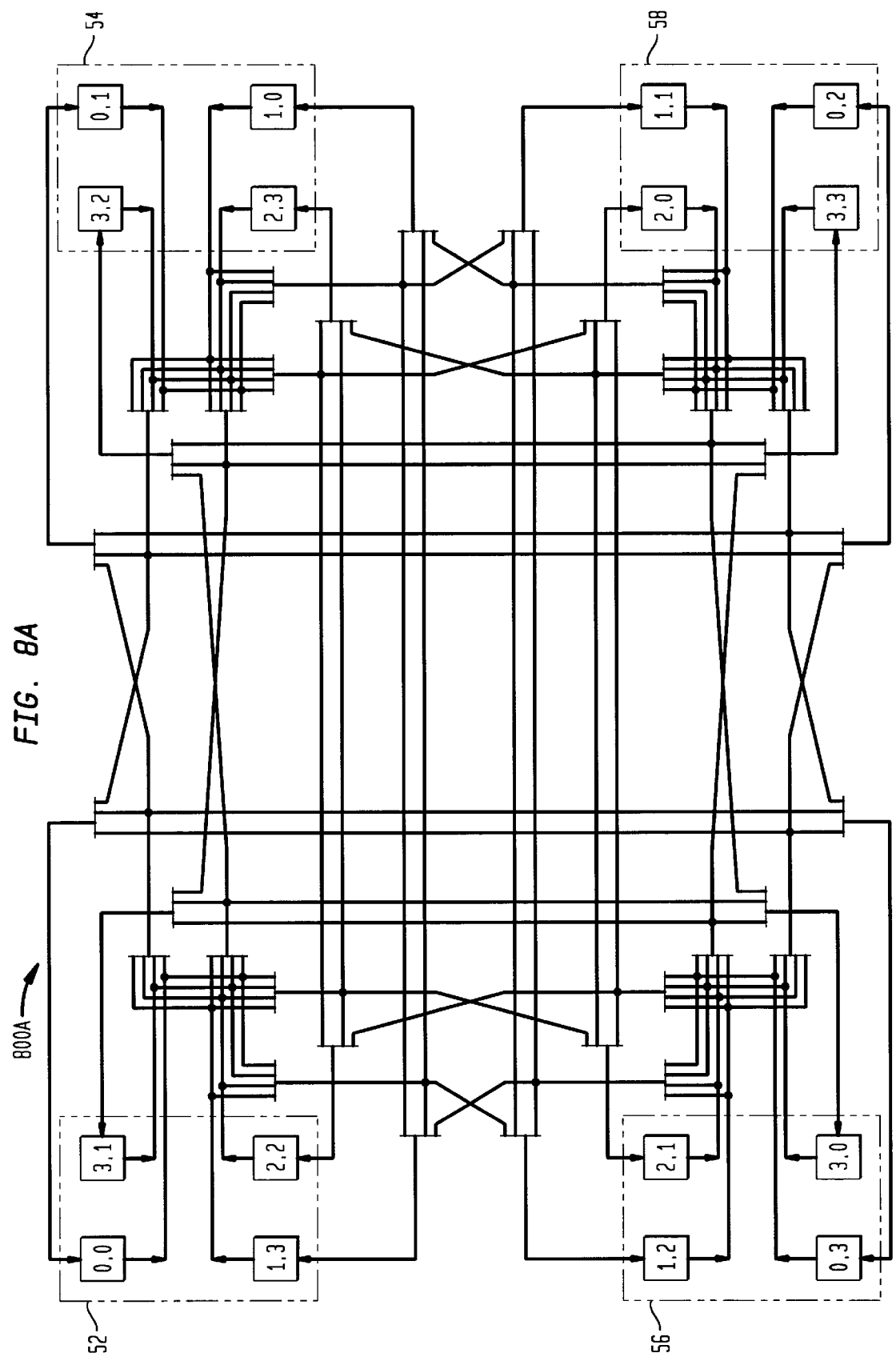
FIG. 8A is a block diagram which illustrates a cluster switch implementation that does not include buffers.
Figure 8C:
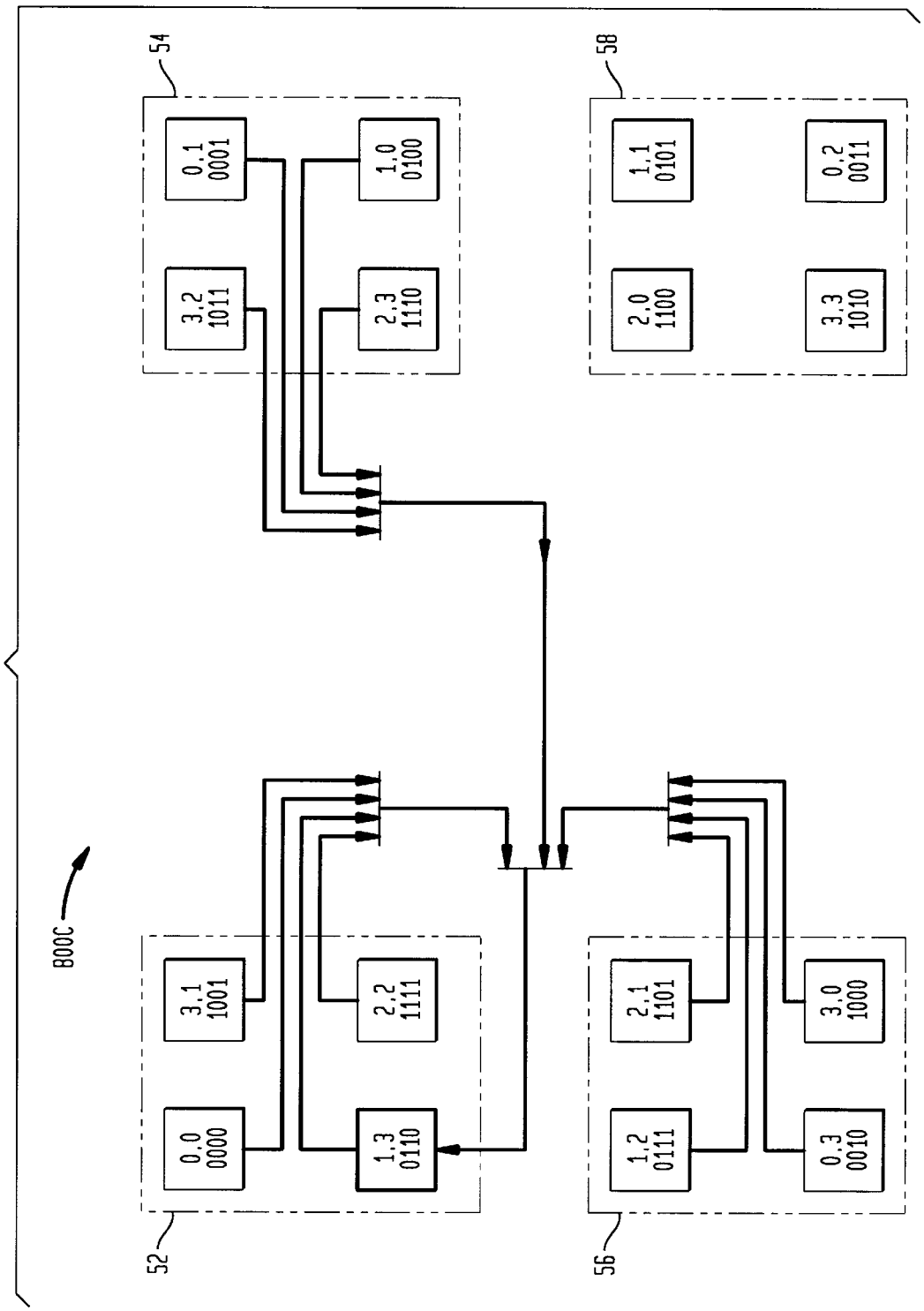

Similarly, the buffering of the 4×4 manifold array of FIG. 7 is removed for the preferred, single chip implementation of manifold array 800A shown in FIG. 8A. When the 4×4 manifold array 800A is connected as shown in FIG. 8A each PE in a cluster can connect to two other clusters that are orthogonal to each other. FIG. 8B shows the output send connectivity for one PE, $PE_{1,3}$ in a 4×4 manifold array 800B. Each PE in the 4×4 manifold array 800B can reach itself plus the other PEs in its cluster and can connect to two other clusters. FIG. 8C shows a 4×4 PE node input (receive) connectivity for an array 800C. In the preferred embodiment of a 4×4 manifold array in accordance with the present invention, the maximum communications distance between any two nodes is 2.

Figure 9B:
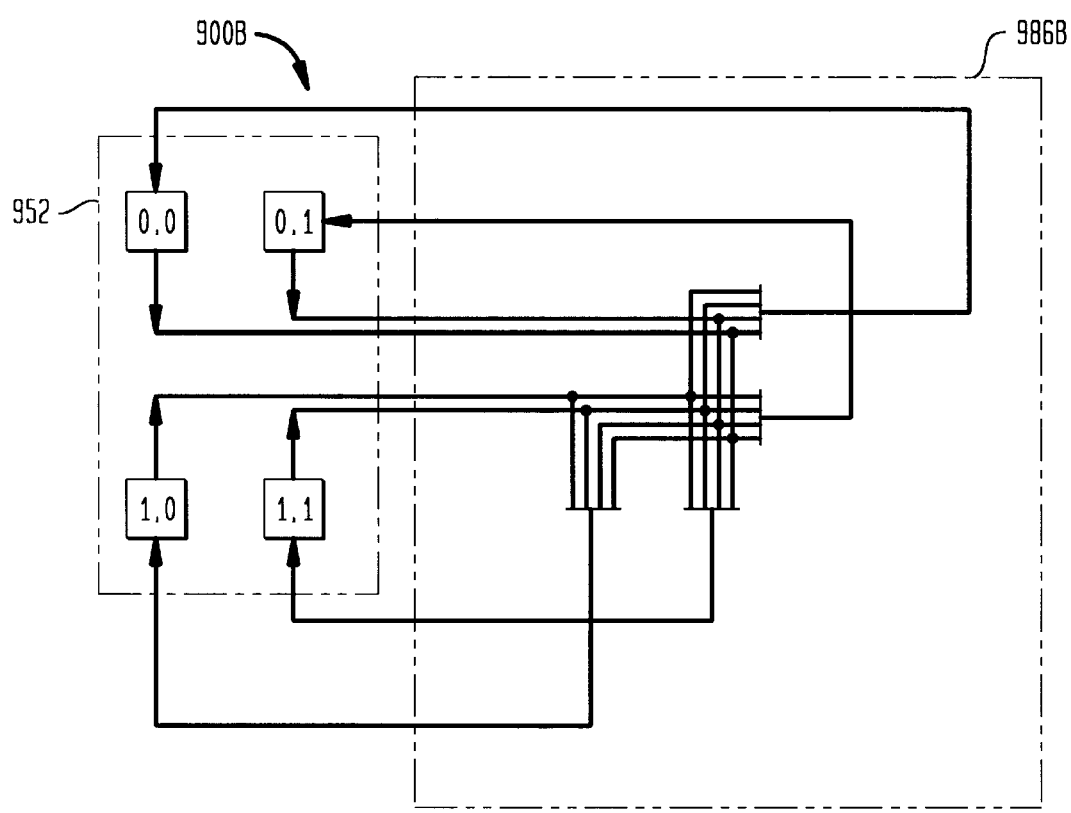
FIG. 9B is a block diagram of a 2×2 manifold array.
Figure 10:
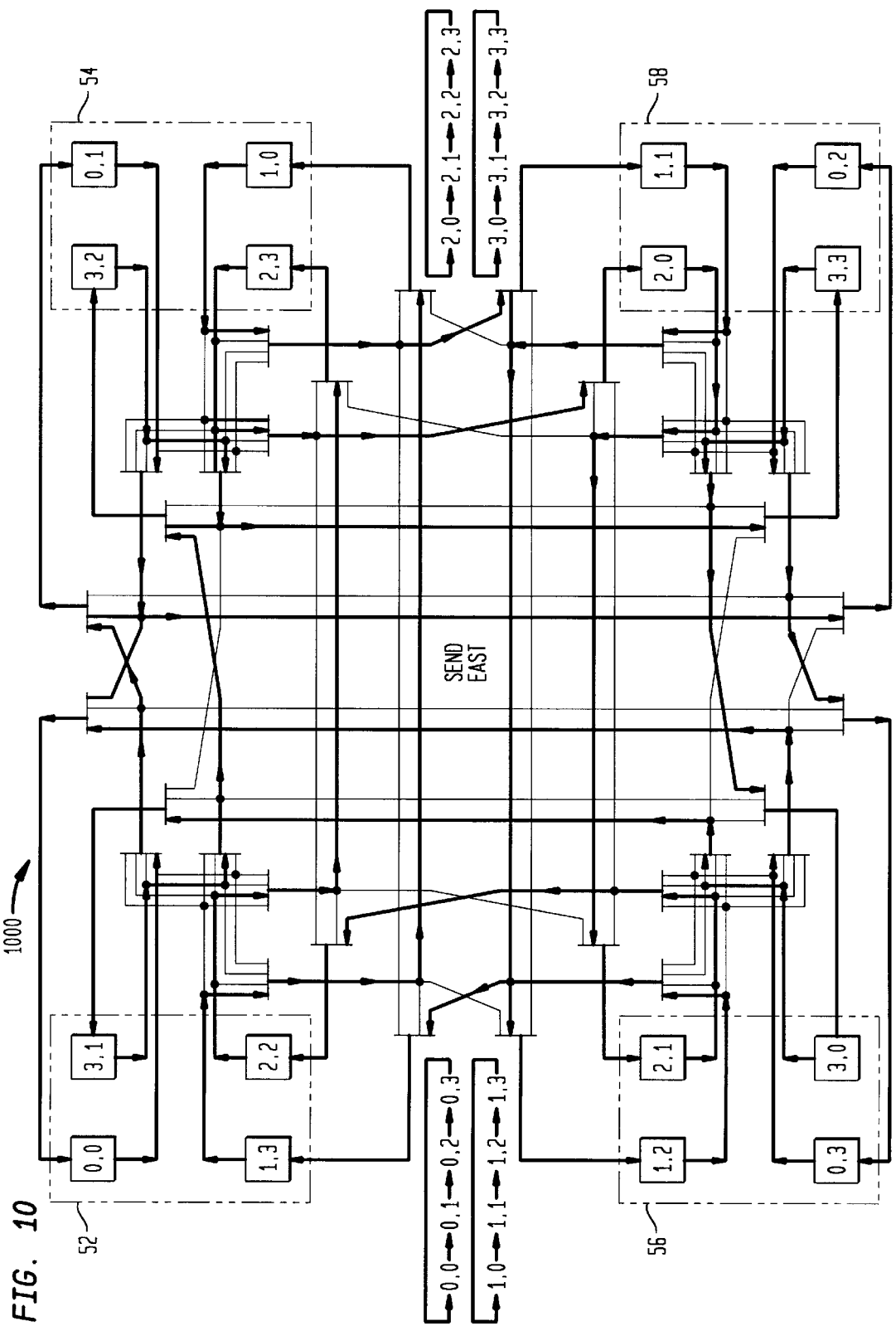
FIG. 10 is a block diagram which illustrates the East communication paths for a 4×4 torus.
Figure 11:
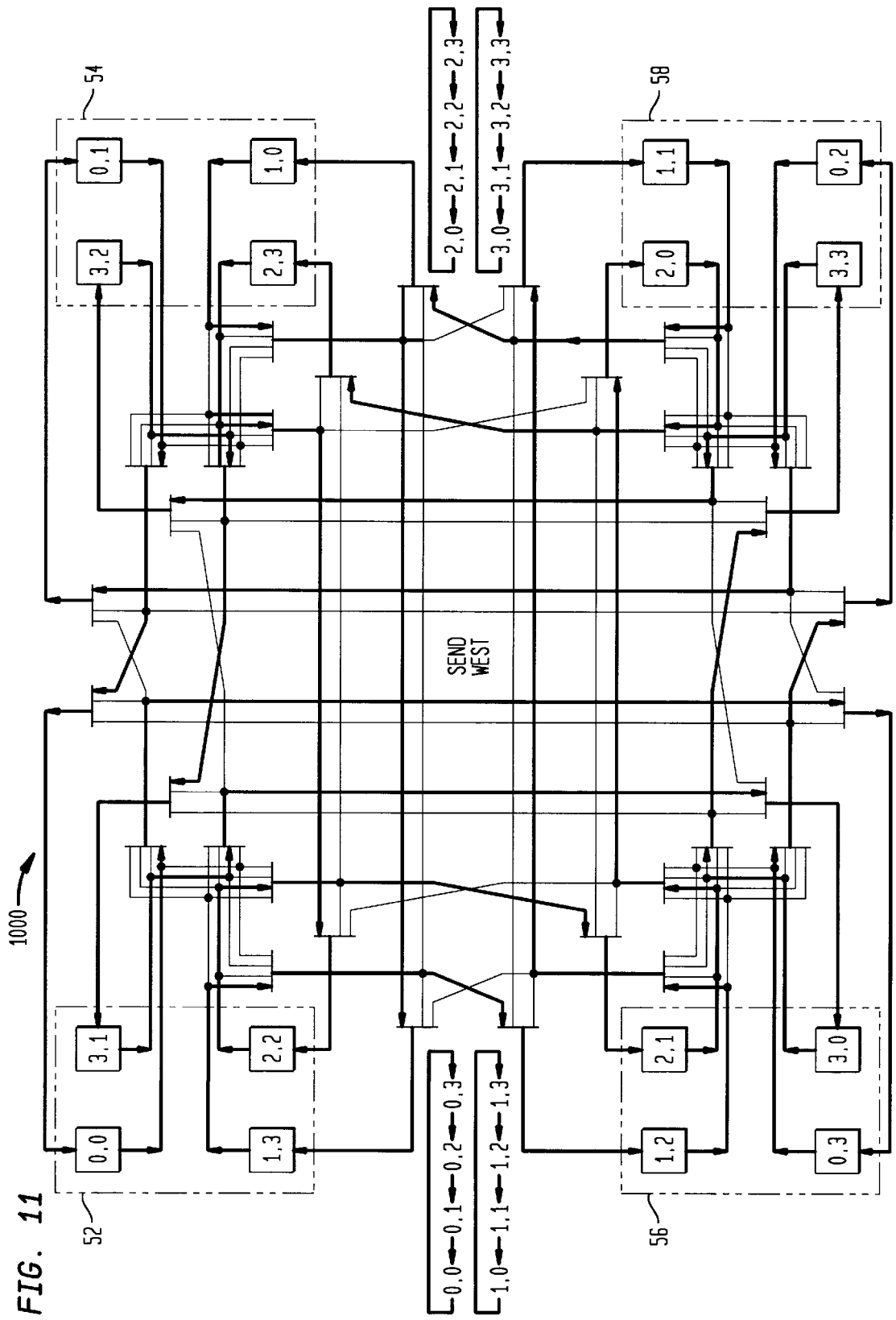
FIG. 11 is a block diagram which illustrates the West communication paths for a 4×4 torus.
Figure 12:
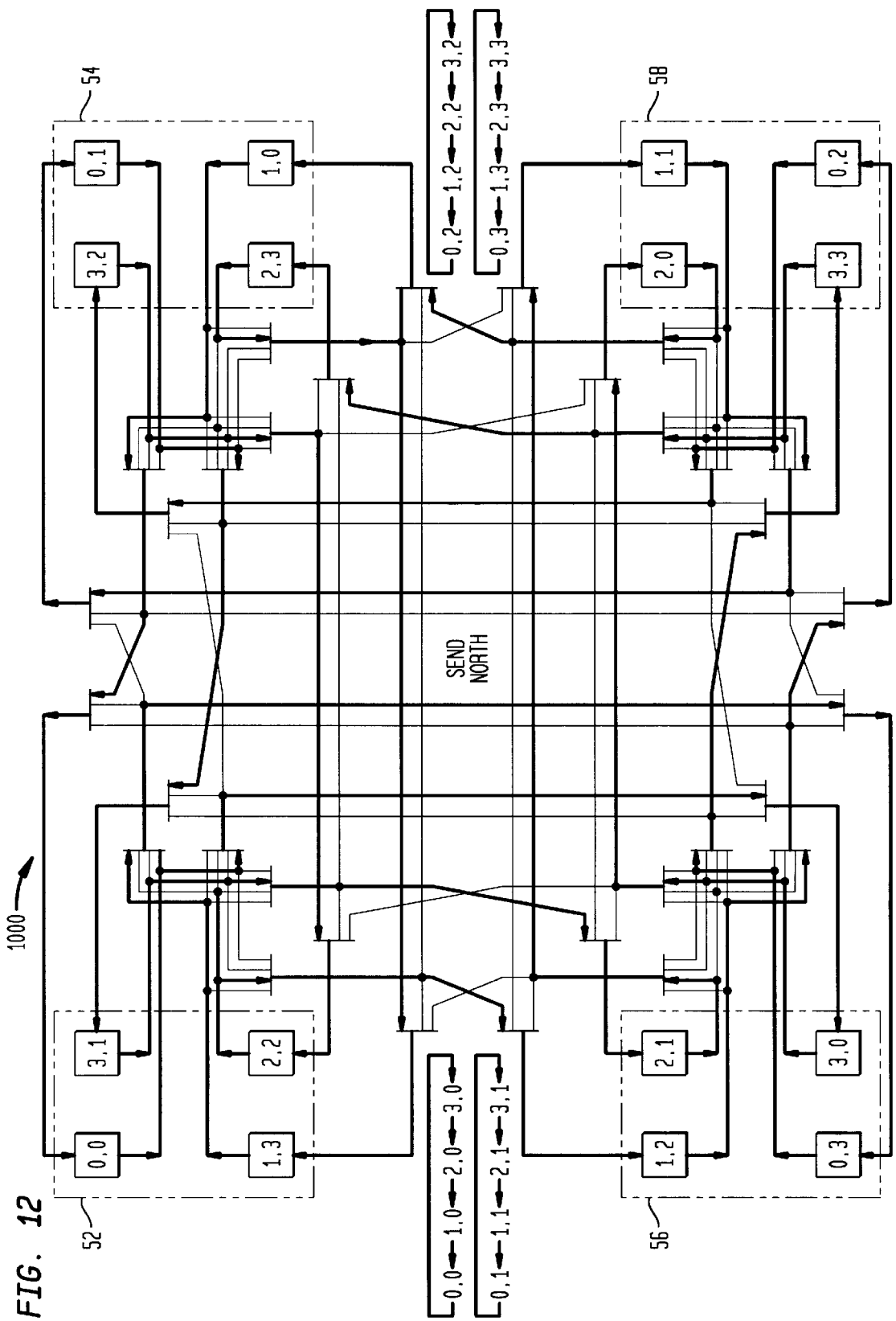
FIG. 12 is a block diagram which illustrates the North communication paths for a 4×4 torus.
Figure 13:
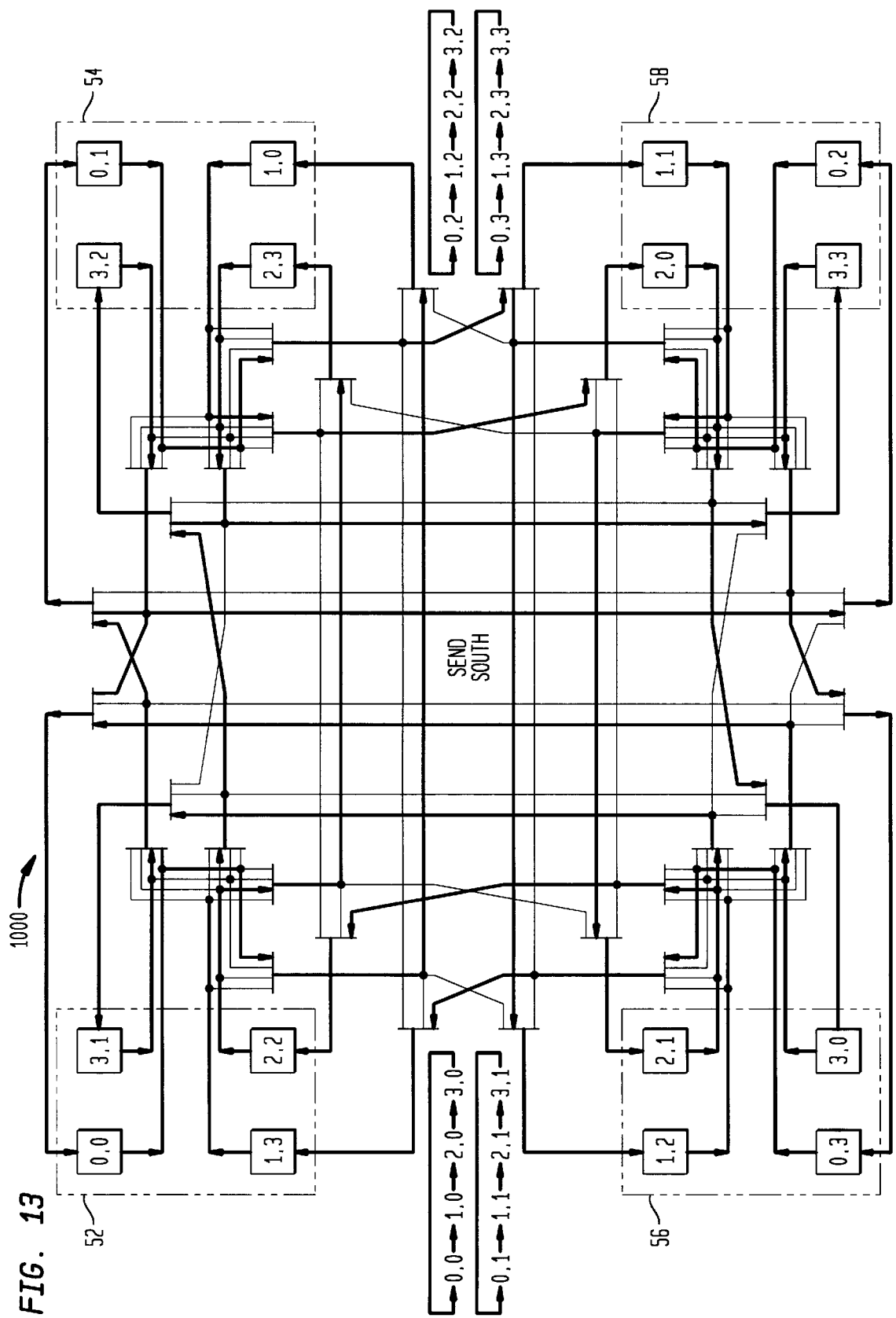
FIG. 13 is a block diagram which illustrates the South communication paths for a 4×4 torus.

A 2×2 manifold array 900B including a cluster switch 986B which connects the PEs in a cluster 952 is illustrated in the block diagram of FIG. 9B. Any PE in this figure can communicate with any other PE in the cluster 952. For example, $PE_{00}$ can send data to itself, $PE_{01}$, $PE_{10}$, or $PE_{11}$, . $PE_{01}$ can communicate with $PE_{00}$, itself, $PE_{10}$, or $PE_{11}$, and similarly for the other 2 PEs in the cluster. For transpose operations, $PE_{00}$ and $PE_{11}$ do not do anything or at most communicate to themselves while $PE_{01}$ communicates with $PE_{10}$. For the hypercube situation, $PE_{00}$ communicates with $PE_{1,1}$ and $PE_{0,1}$ communicates with $PE_{10}$. Going from a 2×2 manifold array 900B of FIG. 9B to a 4×4 manifold array involves adding an additional set of multiplexers to connect four 2×2s as shown for the cluster 52 in in FIG. 9A. The cluster switch 986A of FIG. 9A includes the additional set of multiplexers 990. Thus, it will be recognized that the present invention provides a highly flexible and scalable approach to the interconnection of processors, nodes or the like.

The block diagram of FIGS. 10–13 illustrate the respective paths for nearest neighbor, East, West, North, and South communications, respectively, for a manifold array 1000. Each path is indicated by arrows. Only one input path in each multiplexer is enabled at a given time. To cause a transfer of data to occur on the selected paths, a communication instruction is dispatched from the controller 29 to all PEs. The PEs receive the dispatched PE instruction, decode it, and retrieve the selected data from their respective register files 34 and send it to their respective cluster switches 86. The switch enable signals as illustrated in, FIG. 3A are created based upon selected communications information from the received instruction combined with the already programmed virtual PE number and configuration control 44 output.

Figure 14:
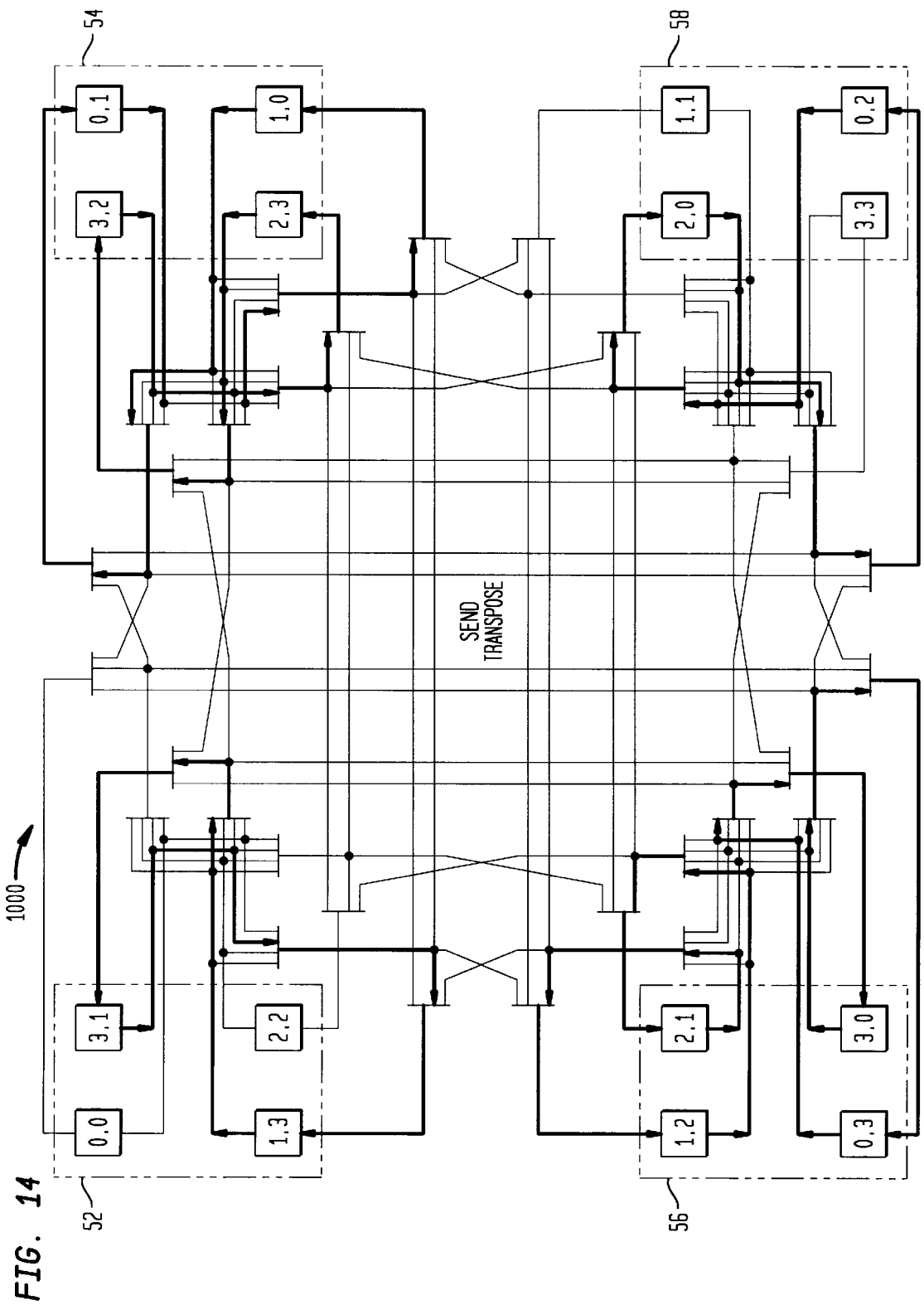
FIG. 14 is a block diagram which illustrates the transpose communication paths for a 4×4 manifold array.
Figure 15:
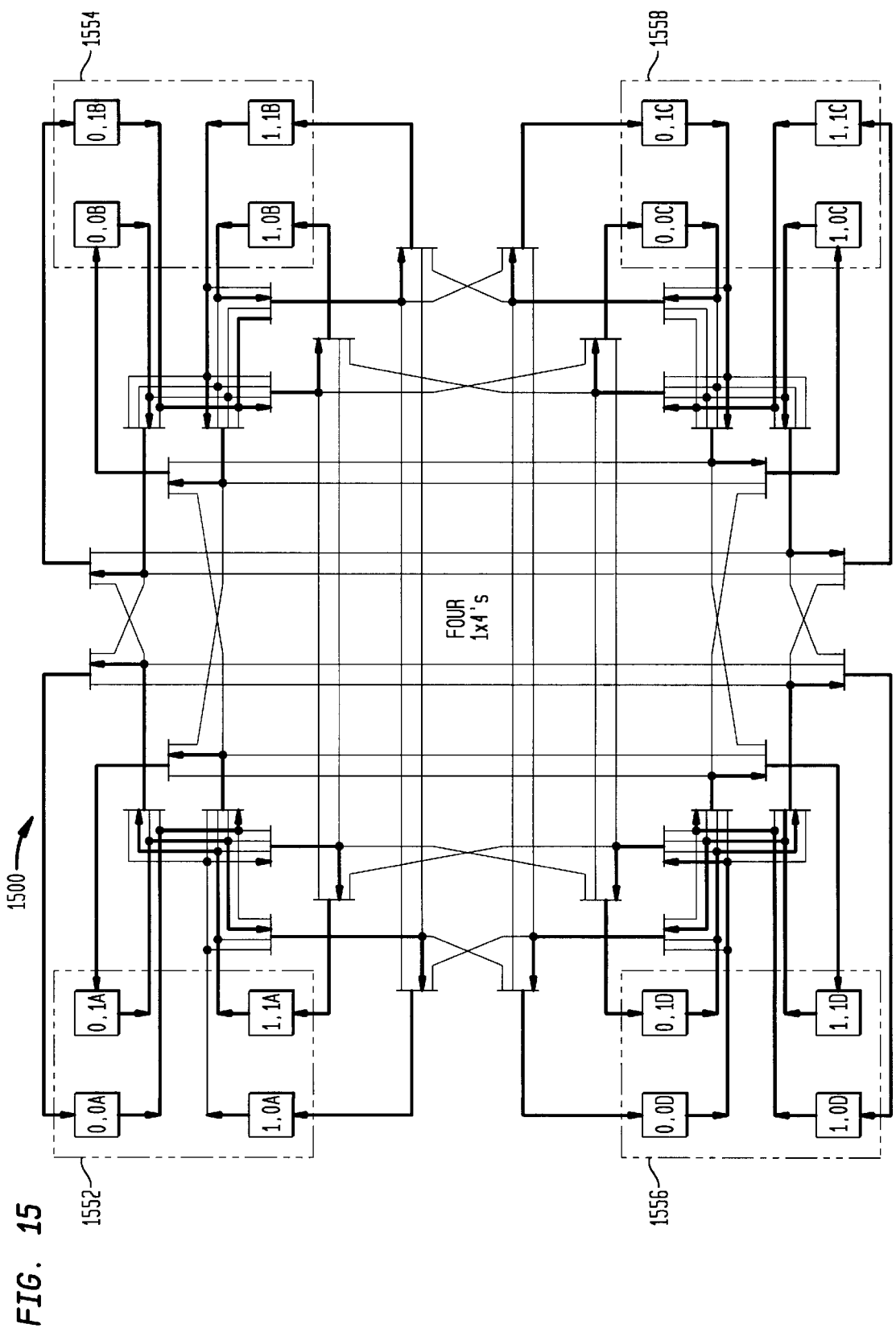
FIG. 15 is a block diagram which illustrates four independent 1×4 linear rings on a 4×4 manifold array.

In the block diagram of FIG. 14, the communication paths for a transpose operation on the same 4×4 manifold array 1000 are shown. Again, active data paths are indicated by directional arrows along the paths and only one input to each multiplexer is active at one time. The switch enable signals are formed in the same manner as described in relation to FIGS. 10–13. FIG. 15 illustrates the communication paths for four independent 1–4 linear rings 1552, 1554, 1556 and 1558 on a 4×4 manifold array 1500. The 1×4 linear rings are formed from 2×2s using row major order. That is to say the row major order is the linear path from $PE_{00}$ (A,B,C or D) to $PE_{0,1}$ (A,B,C or D) to $PE_{10}$ (A,B,C or D) to $PE_{1,1}$ (A,B,C or D) to $PE_{00}$ (A,B,C or D). Each of the sets A–D of PEs 00, 01, 10, 11 constitute a 1×4 linear ring of PEs.

Figure 16:
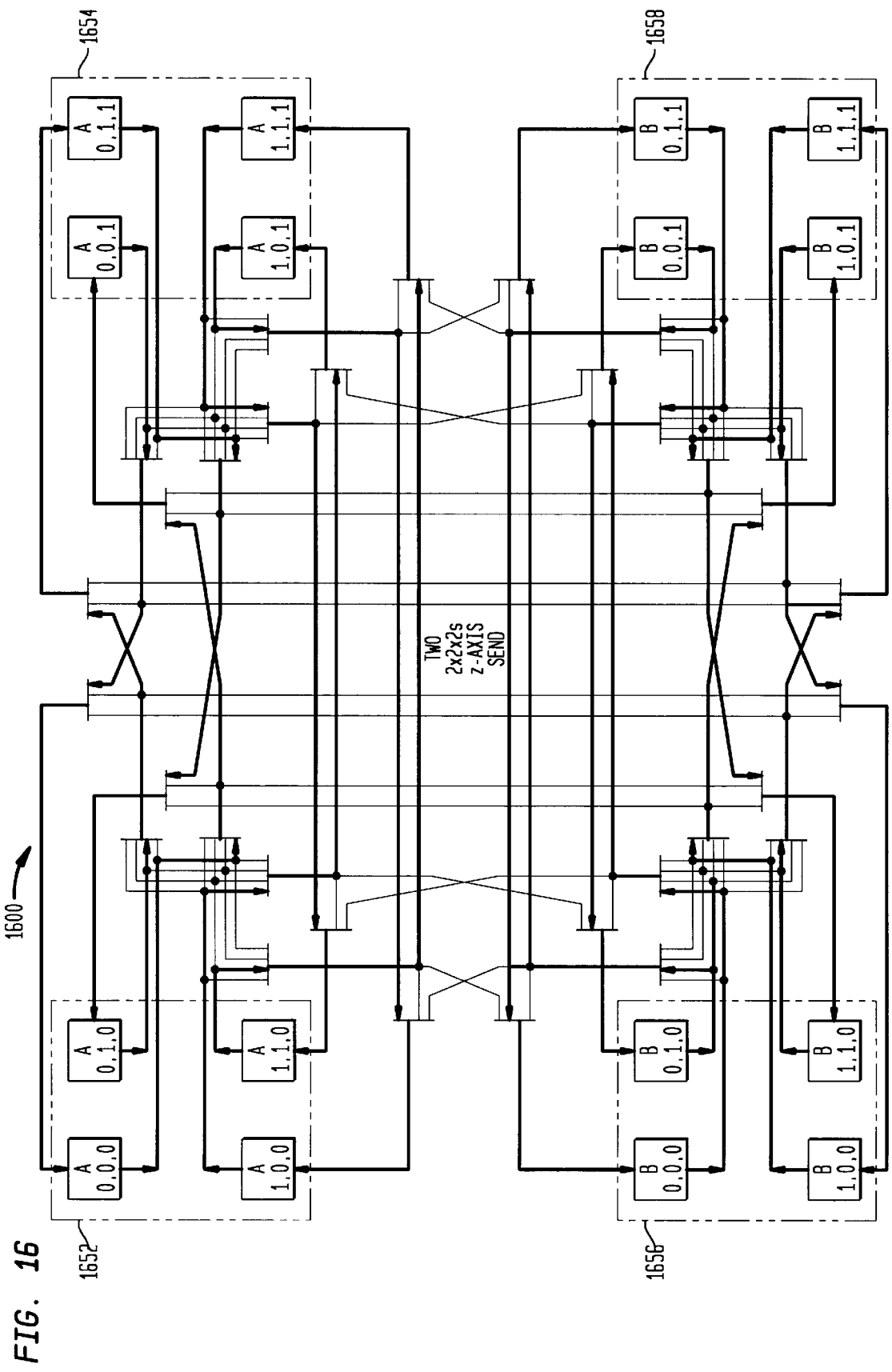
FIG. 16 is a block diagram which illustrates the communications paths for a z-axis send operation in an array configuration.

The block diagram of FIG. 16 illustrates further aspects of the flexibility provided by manifold arrays in accordance with the present invention. FIG. 16 illustrates the communication paths for a 4×4 manifold array 1600 configured as two arrays. The top 2×2×2 array consists of the "A" PEs. The bottom or "B" PEs make up the second 2×2×2 array. FIG. 16 utilizes the reference notation (row)×(column)× (plane) with planes communicating through the z axis. Such communication among PEs would typically require three or six axes of communication ports depending upon whether bidirectional or unidirectional ports are used. By contrast, the preferred manifold array implementation only requires one input port and one output port per PE. It is noted that the array 1600 may employ clusters of PEs 1652, 1654, 1656 having the same physical placement of PEs as was employed for the nearest neighbor communications of array 1000 shown FIGS. 11–14, with the switch settings of the cluster switches modified, to create the interconnection scheme of FIG. 16. One of the many benefits of the manifold array organization of the present invention is that new powerful capabilities arise from the configuration and connection approach.

Figure 2A:
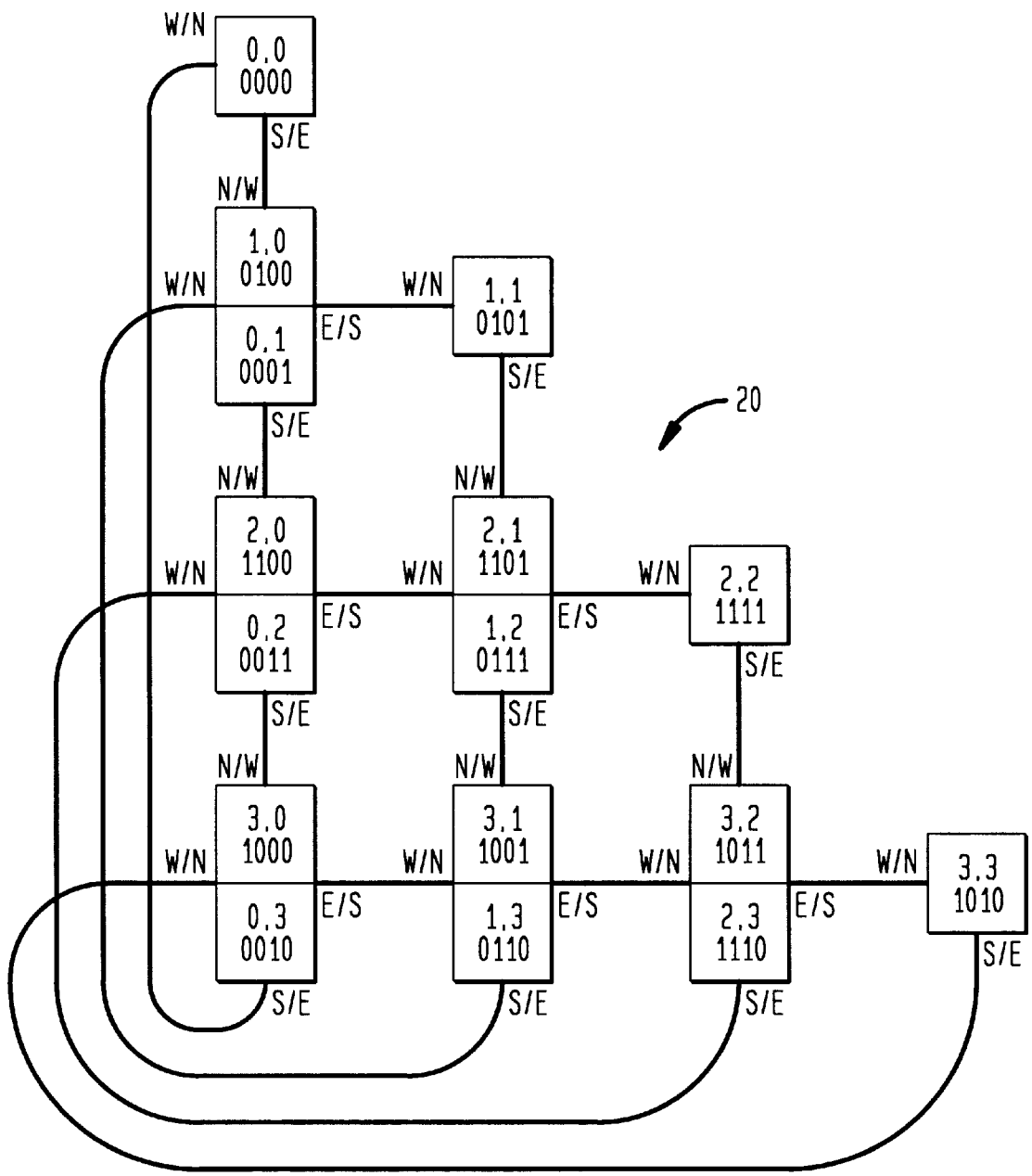
FIGS. 2A and 2B are block diagrams of prior art folded PE arrays.
Figure 2B:
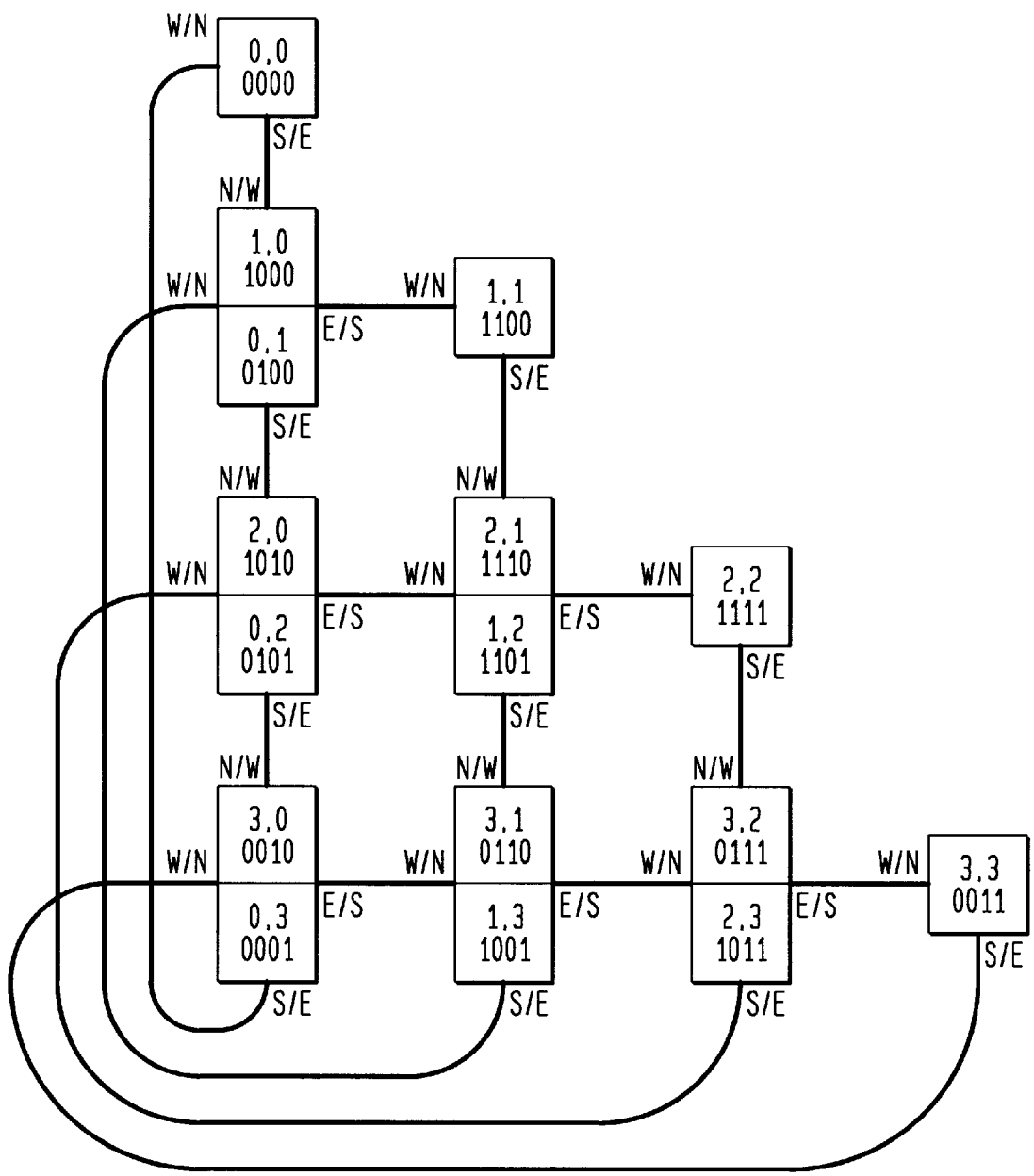
Figure 17:
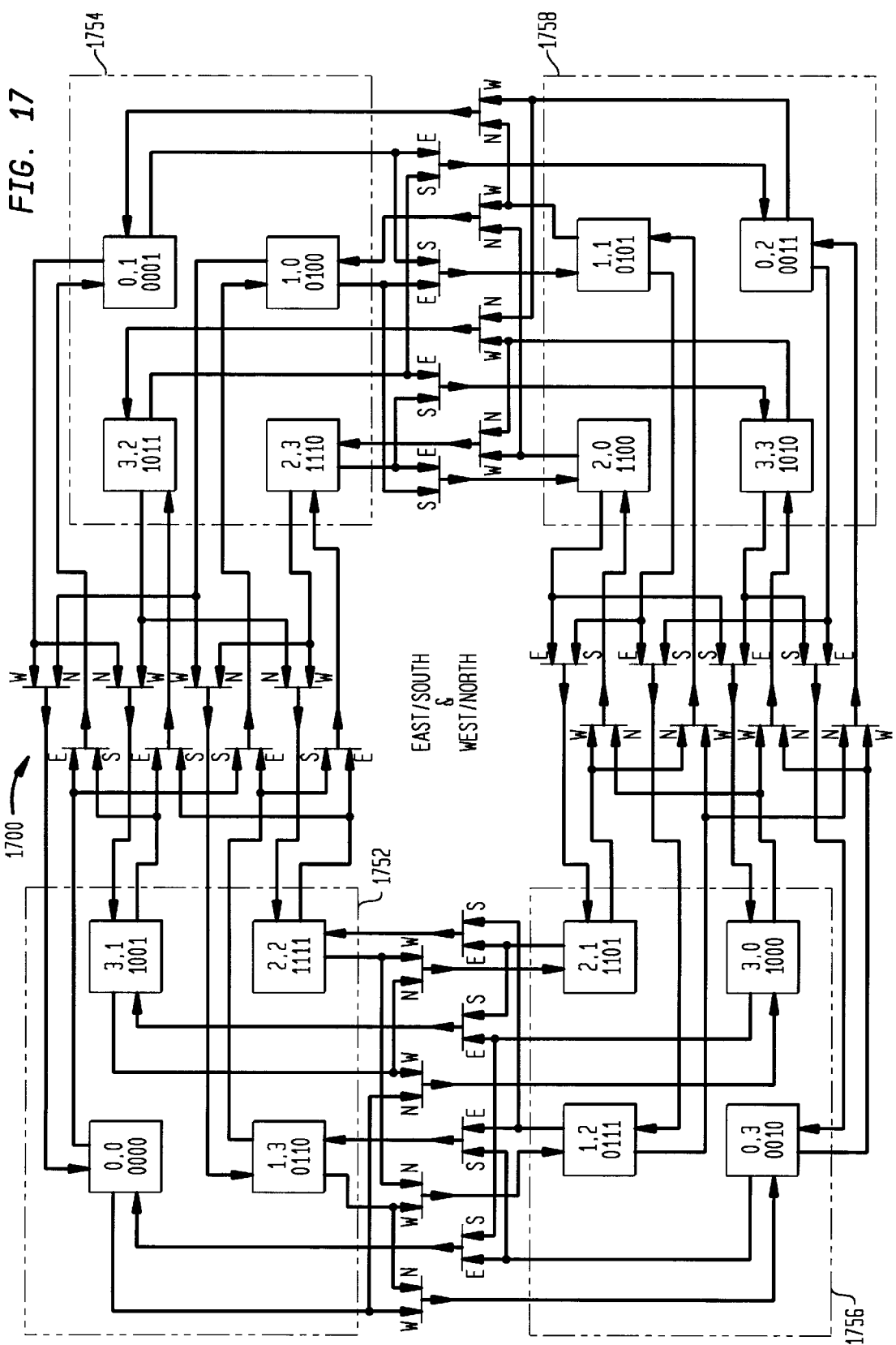
FIG. 17 is a block diagram which illustrates the hypercube node labeling of a 4×4 manifold array.

As a further example of this powerful capability, FIG. 17 illustrates a 4D hypercube implementation of a manifold array 1700 having clusters 1752, 1754, 1756 and 1758 interconnected by cluster switches as shown. In FIG. 17, the top PE number, for example, 0,0 or 3,1 represents the PE's position in the torus, as in FIGS. 1 and 2, while the bottom PE number, for example, 0000 or 1001, represents its position or address in a hypercube. In communicating between standard hypercube PEs, there should be only a single bit change in the hypercube PE number. For example, in FIG. 1 the PE 0111 (PE 12) communicates to the PEs 0011, 0110, 1111, and 0101 wherein each separate path represents a single bit change in the hypercube numbers. In FIG. 17, not only are the PEs and their transpose PEs located in the same cluster, but advantageously the PEs and their hypercube complement PEs are also located therein. The array of FIG. 7 does not contain the paths between the hypercube and its complement.

Figure 18:
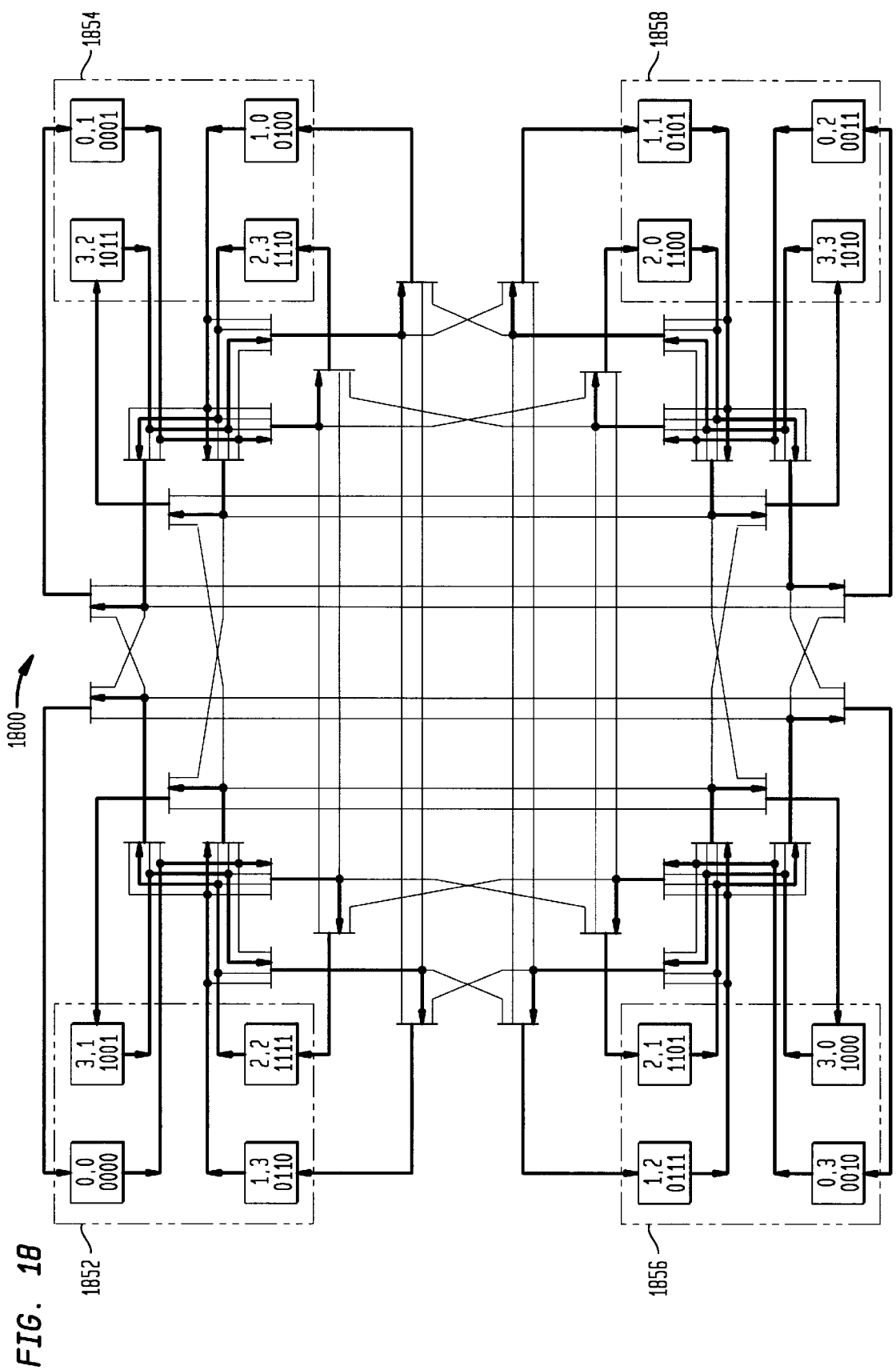
FIG. 18 is a block diagram illustrating of a 4×4 manifold array hypercube complement communication.

FIG. 18 illustrates a manifold array 1800 in accordance with the present invention in which, the PEs in each of the clusters 1852, 1854, 1856 and 1858 of four PEs are completely connected. For an N×N manifold array with N clusters of N PEs, the cluster groupings can be formed by selecting an i and a j, and then using the formula: $PE(i+a) \bmod N, (j+N-a) \bmod N$ for any i,j and for all "a" $+\epsilon\{0,1,\ldots, N-1\}$. For a 4D hypercube such as the manifold array 1800, the cluster nodes may be suitably Gray-coded as follows: $PE_{G((i+a) \bmod N), G((j+N-a) \bmod N)}$ where $G(x)$ is the Gray code of x. Extensions to the general case are discussed in a mathematical representation of the manifold array that shortly follows.

For N=4, one suitable manifold array 1800 with hypercube nodes is shown in FIG. 18. The 4×4 manifold array 1800 includes connection paths that connect hypercube complements. In other words, communications paths are enabled between a hypercube PE and its complement hypercube PE. For example, PE 0111 ($PE_{1,2}$) can communicate with PE 1000 ($PE_{3,0}$) as well as the other members of its cluster. In considering the implications of communications between a hypercube PE and its complement hypercube PE, the hypercube communications path for the longest path, in this case 4 steps, is reduced to 1 step. This reduction in path length has great implications for creating very efficient hypercube type algorithms on a manifold array organization of processing elements in accordance with the present invention. Additionally, 4×4 manifold array clusters of 4 PEs provide a low cost solution for the communications link between the PE and its hypercube complement when compared to prior art implementations which, in the case of the prior art folded array, required clusters of 8 PEs for a similar 4D hypercube connectivity.

Figure 19:
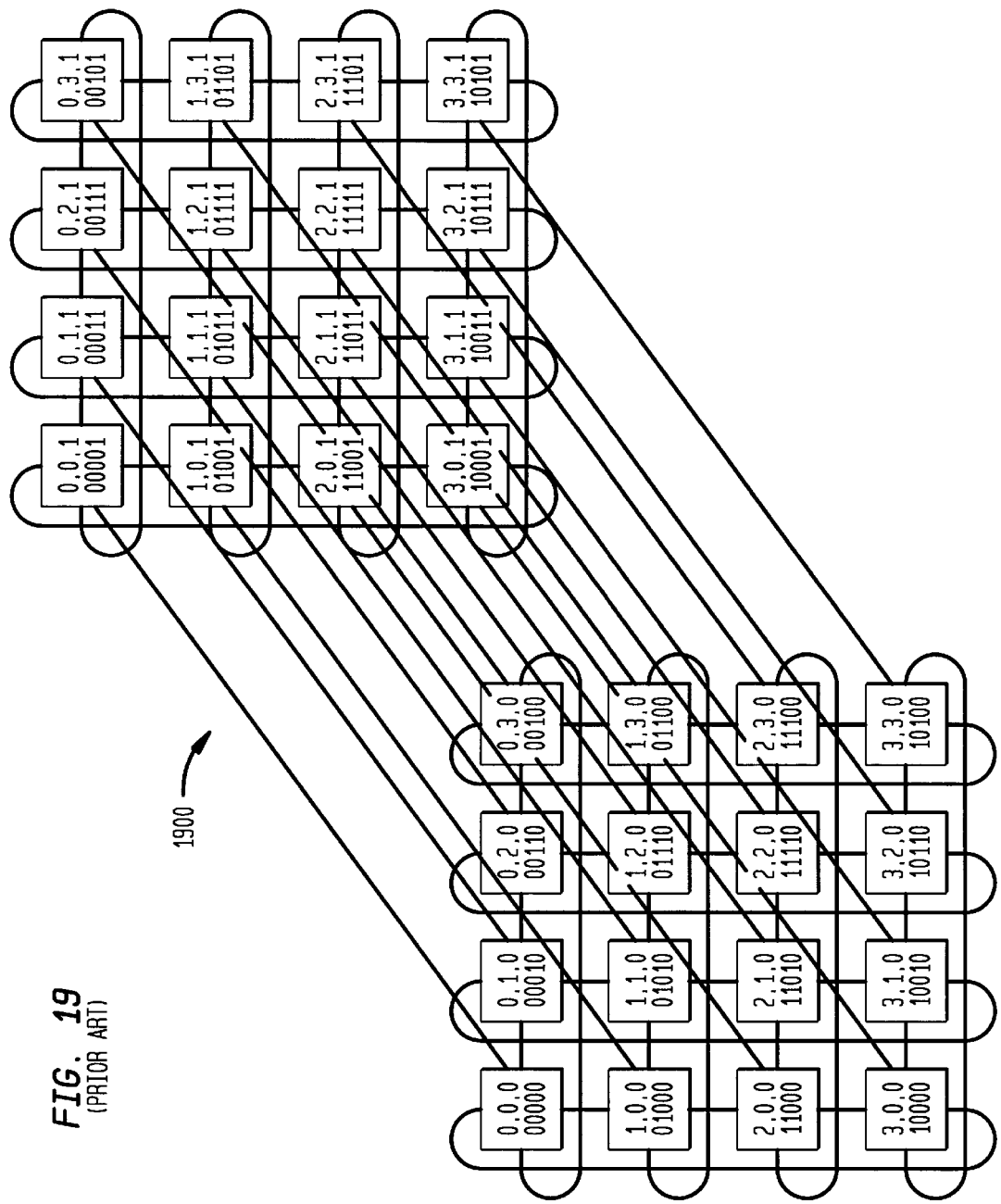
FIG. 19 is a block diagram illustrating of a 5D hypercube.
Figure 20:
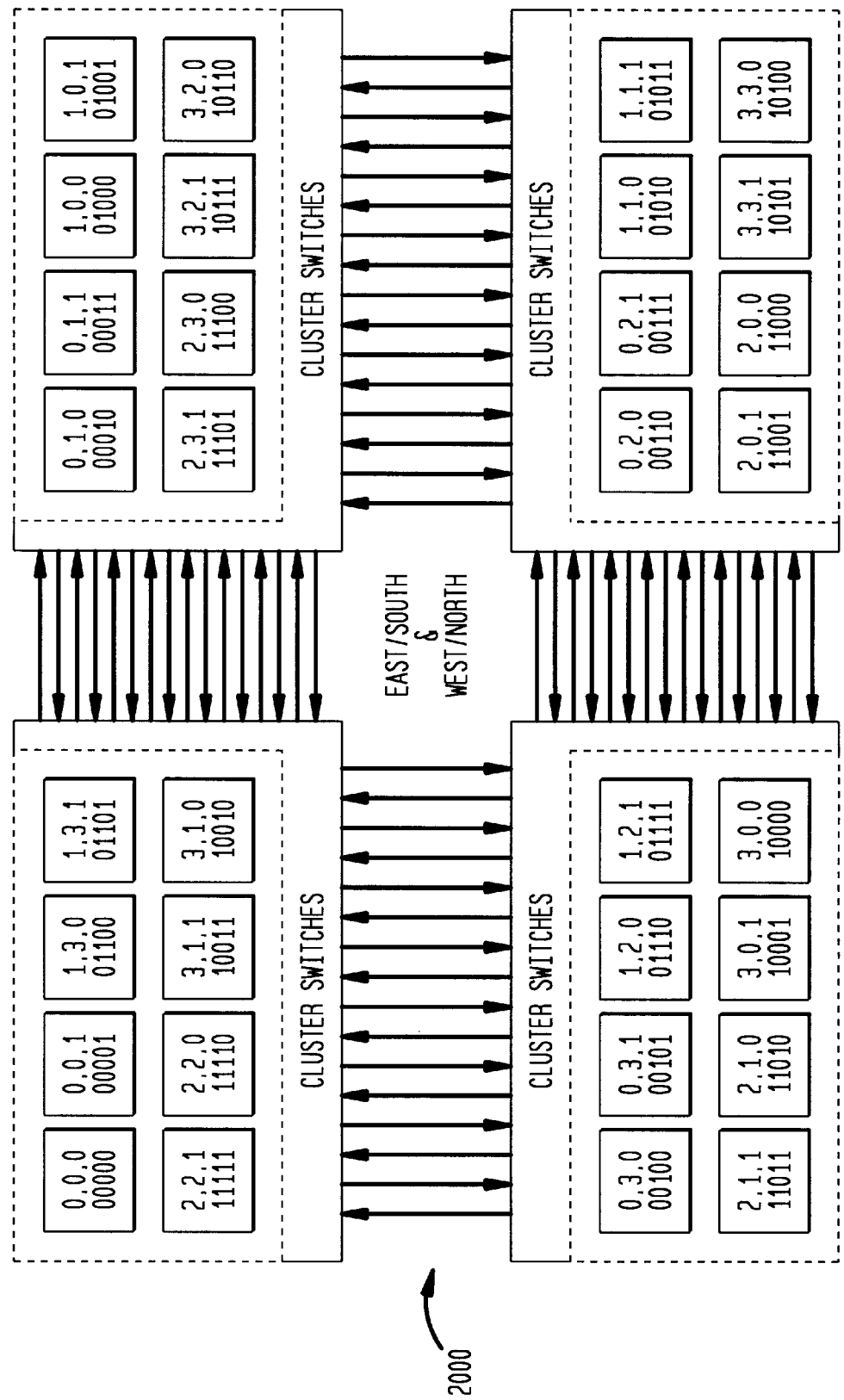
FIG. 20 is a block diagram illustrating of a 5D hypercube mapped onto a manifold array.

A 5D hypercube 1900 is shown in FIG. 19, with 4×4×2 (row, column, plane) PE numbers shown as the top label in the PEs and the 5D hypercube numbers shown as the bottom PE number. For a conventional 5D hypercube, 5-bidirectional or 10-unidirectional connection ports are required in each PE. For the illustrated manifold array 2000 implementation shown in FIG. 20 in which a 5D hypercube is mapped onto a 4×4×2 manifold array, only 1 bidirectional or 2 unidirectional ports are required in each PE. In addition, the standard hypercube requires $2^5$, or 32, PEs with a total of $5N^2$ (N=4) bidirectional buses or $10N^2$ (N=4) unidirectional buses. The 5D hypercube manifold array 2000 of FIG. 20, requires only a total of $2N^2$ (N=4) bidirectional buses or $4N^2$ (N=4) unidirectional buses between all the clusters of PEs. FIG., 20 shows the unidirectional bus case with 8 transmit and 8 receive paths between each cluster. Note that, as illustrated in FIG. 20, the hypercube PEs and their complement PEs may be advantageously located within the same cluster of PEs. Additionally, each PE and its nearest neighbor transpose PE for each plane of PEs are located within the same cluster of PEs. Further, corresponding cluster elements from each plane are grouped together. This grouping will also hold true for 16 PEs per cluster with a 6D hypercube not shown.

It will be noted that the cluster switches will be different for the 5D case than they are for the 4D case, but they are constructed in a manner similar to those of the 4D approach to provide the same level of interconnectivity. Note the manifold array formation technique can form clusters of various sizes. The cluster size is chosen upon the application and product requirements.

A 3D torus topology with North, South, East, West and Z-axis Input/Output (I/O) ports requires 6 bidirectional tri-state type links or 12 unidirectional links per PE. That means that a total of $3(N^3)$ bi-directional tri-state type links and $6(N^3)$ unidirectional type links are required for the N×N×N 3D torus. The manifold array topology for a 4×4×4 3D torus is indistinguishable from the manifold array topology for a 6D hypercube. The PEs are labeled according to the torus or hypercube requirements. In addition, the 8×8 torus can be considered a subgraph of the 4×4×4 3D torus with reduced connectivity requirements. In the manifold array implementation of a 3D cube or a 6D hypercube topology, the PEs only require 1 transmit port and 1 receive port each independent of the number of ports required by the topology. The placement of a PE into its required position in the 3D cube topology may be suitably handled by switching mechanisms external to the PE. For the manifold array 3D torus, the wiring complexity between the clusters is reduced at the switching mechanism requiring only one third of the $3(N^3)$ links or $(N^3)$ bidirectional tri-state type links and only $2(N^3)$ for unidirectional type links, instead of the $6(N^3)$ presently typically required. This represents a substantial reduction in implementation costs.

A mathematical description of various aspects of manifold arrays in accordance with the present invention follows. A hypercube is a regular torus of size 2 per dimension. For example, a 4 dimensional hypercube can be seen as a 2×2×2×2 torus. However, the discussion which follows addresses embeddings where the torus is of a smaller number of dimensions. The hypercube of 2d dimensions is equivalent to a regular torus of dimension d and of side length 4; while the 2d+1 dimensional hypercube is equivalent to a torus of dimension d+1 and side size of 4 in all dimensions but the last dimension that is of size 2. First, the 2d dimensional hypercube is equivalent to a d dimensional regular torus of size 4 per dimension, where d is a natural number.

The 2d dimensional hypercube H consists of $2^{2d}$ nodes that is equal to $4^d=(2^2)^d$, the number of nodes of the d dimensional regular torus T of size 4 per side. By definition, every node of H is adjacent to 2d other nodes, one for each dimension. Every node of T is adjacent to 2 other nodes per dimension, that is in a d dimensional regular torus, each node is adjacent to 2d other nodes. Thus, H and T have an equal number of nodes and an equal number of edges.

To define a one-to-one correspondence among them, let $(i_1, i_2, \ldots, i_d)$ be a node of T, where $i_j$ denotes the node coordinate for dimension j. Since T is a d dimensional regular torus of size 4 per side, $i_j$ takes values from 0 to 3 for all j from 1 to d. Along dimension k, this node is adjacent to nodes $(i_1, i_2, \ldots, i_k-1, \ldots, i_d)$ and $(i_1, i_2, \ldots, i_k+1, \ldots, i_d)$. We assume here that the operations $i_k-1$ and $i_k+1$ are done modulo 4, that is, 3+1=0 and 0-1=3 to cover the wrap-around edges of the torus.

Consider the one-to-one mapping between node $(i_1, i_2, \ldots, i_d)$ of T and node $(G(i_1), G(i_2), \ldots, G(i_d))$ of H. Here, G(0)=00, G(1)=01, G(2)=11 and G(3)=10 are the 2 digit Gray codes. Although torus nodes are labeled by a tuple, hypercube nodes are labeled by a binary string, so when we are writing $(G(i_1), G(i_2), \ldots, G(i_d))$, we actually mean a concatenation of the corresponding binary strings. To clarify this point and the one-to-one mapping we are proposing, consider node (3,1,0) from a 3 dimensional regular torus and the corresponding label for the 6 dimensional hypercube 100100 that is derived by concatenating (G(3), G(1), G(0)).

Since successive Gray codes differ by a single binary digit, adjacent torus nodes are also adjacent hypercube nodes and vice versa. Thus, there exists a one-to-one mapping between the nodes and edges of H and the nodes and edges of T, which means that the two graphs are identical. Therefore, a hypercube of dimension 2d can be embedded to a d dimensional regular torus of size 4 per dimension.

For further definition of Gray codes and the labeling scheme of hypercube nodes using Gray codes, see for example, F. Thomson Leighton's "Introduction to Parallel Algorithms and Architectures: Arrays, Trees, Hypercubes", Morgan Kaufmann, 1992, Ch. 3, which is hereby incorporated by reference.

The 2d+1 dimensional hypercube is equivalent to a d+1 dimensional torus of size 4 for all dimensions except the last one that is of size 2. From the Leighton reference, we know that the 2d+1 dimensional hypercube can be seen as two 2d dimensional hypercubes that have their corresponding nodes connected as discussed at page 393. But, because the 2d dimensional hypercube is equivalent to the d dimensional regular torus of size 4 per side, the union of two d dimensional tori by connecting their corresponding nodes is a d+1 dimensional torus with size 2 for the last dimension.

From the above, it will be recognized that the hypercube of 2d dimensions is equivalent to a regular torus of dimension d and of side length 4. Also, the 2d+1 dimensional hypercube is equivalent to a torus of dimension d+1 and side size of 4 in all dimensions but the last one that is of size 2.

The manifold array groupings, or clusters, preferably bring together diametrically opposite nodes, in general, as follows. The nodes of a d dimensional hypercube that are adjacent, only differ in a single binary digit, therefore nodes that differ in exactly d digits in their node addresses are furthest apart from each other, that is, they are diametrically opposite to each other. The furthest apart nodes have addresses that are binary complements of each-other. Thus, we also refer to the diametrically opposite node of a given node as its complement.

Consider by way of example, a 2 dimensional 4×4 torus and the corresponding embedded 4-dimensional hypercube written as a 4×4 table with the hypercube node labelings, see FIG. 21A. Along the rows and the columns of this table, the distance between adjacent elements is one. If columns 2, 3 and 4 are rotated one position up, then the distance of the corresponding elements between the first and the second column becomes two. Repeating the same with columns 3 and 4 and then column 4, the distance between elements of a column with the corresponding elements of the adjacent columns is two. The resulting 4D manifold array table is shown in FIG. 21B.

It is important to note that, each row of the table contains a grouping of 4 nodes, or, in other words, two pairs of diametrically opposite nodes, because four is the maximum distance on the 4 dimensional hypercube. The rows of the table define groupings where diametrically opposite hypercube nodes belong to the same groups.

In higher dimensional tori and thus hypercubes the grouping of diametrically opposite nodes is achieved by the same rotation along each new dimension except the last one.

To describe the group forming permutation mathematically, two operators are defined that take apart a tensor multidimensional array and create a vector out of its elements and vice-versa. The vec() operator takes a single argument, a tensor T, and returns a vector by stacking up the elements of T along the columns the first dimension of the tensor. For example, if T is the 2-dimensional tensor then $v=\text{vec}(T)=[11\ 21\ 31\ 12\ 22\ 32\ 13\ 23\ 33]^T$. On the other $$T = \begin{bmatrix} 11 & 12 & 13 \\ 21 & 22 & 23 \\ 31 & 32 & 33 \end{bmatrix}$$

hand, tensor T can be reconstructed from vector v by using the operator reshape() that takes as arguments the source structure and a list of dimensions. From the last example, T is rebuilt with reshape(v, 3, 3).

The Kronecker product of two matrices A and B is a block matrix consisting of copies of B scaled by the corresponding elements of A. That is $$A \otimes B = \begin{bmatrix} a_{11}B & a_{12}B & \cdots & a_{1n}B \\ a_{21}B & a_{22}B & \cdots & a_{2n}B \\ \vdots & \vdots & \ddots & \vdots \\ a_{m1}B & a_{m2}B & \cdots & a_{mn}B \end{bmatrix}$$

The manipulation of a multidimensional array T to expose the desired grouping can be defined as a matrix-vector product where the matrix is a permutation matrix, orthogonal matrix with exactly a single non-zero element per row and column and the vector is vec(T). First we need matrix S, the rotate up permutation matrix of size 4 is determined.

$$S = \begin{bmatrix} 0 & 1 & 0 & 0 \\ 0 & 0 & 1 & 0 \\ 0 & 0 & 0 & 1 \\ 1 & 0 & 0 & 0 \end{bmatrix}$$

Also matrix G, the block diagonal matrix that actually performs the grouping permutation, is determined. The diagonal blocks of G are the powers of S.

$$G = \begin{bmatrix} S^0 & 0 & 0 & 0 \\ 0 & S^1 & 0 & 0 \\ 0 & 0 & S^2 & 0 \\ 0 & 0 & 0 & S^3 \end{bmatrix}$$

If T is the 4×4 torus, then reshape(G vec(T), 4, 4) is the resulting torus with the claimed grouping property described above. Similarly, if T stands for the 4×4×4 torus, then the on that defines the claimed grouping is:

reshape $((G \otimes I_4) (I_4 \otimes G)$ vec(T), 4, 4, 4), where $I_4$ is the 4×4 identity matrix.

In general for a d-dimensional regular torus T of size 4 per dimension, the group revealing permutation is $$\text{reshape}\left(\prod_{q=1}^{d-1} (I_{4^{q-1}} \otimes G \otimes I_{4^{d-q-1}}) vec(T), \underbrace{4, 4, \ldots, 4}_{d}\right).$$

An sample of applying the grouping permutation on the 4×4×4 torus:

After the first matrix multiplication by ($I_4 \otimes G$), the 4 planes become:

| 000 | 110 | 220 | 330 |
|-----|-----|-----|-----|
| 100 | 210 | 320 | 030 |
| 200 | 310 | 020 | 130 |
| 300 | 010 | 120 | 230 |
| 001 | 111 | 221 | 331 |
| 101 | 211 | 321 | 031 |
| 201 | 311 | 021 | 131 |
| 301 | 011 | 121 | 231 |
| 002 | 112 | 222 | 332 |
| 102 | 212 | 322 | 032 |
| 202 | 312 | 022 | 132 |
| 302 | 012 | 122 | 232 |
| 003 | 113 | 223 | 333 |
| 103 | 213 | 323 | 033 |
| 203 | 313 | 023 | 133 |
| 303 | 013 | 123 | 233 |

After the second matrix multiplication by ($G \otimes I_4$), we get:

| 000 | 110 | 220 | 330 |
|-----|-----|-----|-----|
| 100 | 210 | 320 | 030 |
| 200 | 310 | 020 | 130 |
| 300 | 010 | 120 | 230 |
| 111 | 221 | 331 | 001 |
| 211 | 321 | 031 | 101 |
| 311 | 021 | 131 | 201 |
| 011 | 121 | 231 | 301 |
| 222 | 332 | 002 | 112 |
| 322 | 032 | 102 | 212 |
| 022 | 132 | 202 | 312 |
| 122 | 232 | 302 | 012 |
| 333 | 003 | 113 | 223 |
| 033 | 103 | 213 | 323 |
| 133 | 203 | 313 | 023 |
| 233 | 303 | 013 | 123 |

If instead of rotating up, we rotate down, then the same grouping property of bringing together diametrically opposite nodes holds. Moreover, the group also contains symmetric pairs of nodes where node (i,j) is grouped with its transpose pair, node (j,i). Mathematically, the rotate down permutation is the transpose of the rotate up permutation. The rotate down permutatin is also the inverse of the rotate up permutation when the permutation matrices are orthogonal. More specifically, the rotate down permutation matrix of size 4 is $$S_4^T = \begin{bmatrix} 0 & 0 & 0 & 1 \\ 1 & 0 & 0 & 0 \\ 0 & 1 & 0 & 0 \\ 0 & 0 & 1 & 0 \end{bmatrix}$$

Here, since we have no restriction to size 4, we need to refer to the size of the matrix, and we can apply the rotation to any size 2 dimensional torus or a 2 dimensional subgraph of a higher dimensional torus. Similarly, to apply the corresponding rotation to all columns we determine the transpose of matrix G, $$G_4^T = \begin{bmatrix} S^0 & 0 & 0 & 0 \\ 0 & S^1 & 0 & 0 \\ 0 & 0 & S^2 & 0 \\ 0 & 0 & 0 & S^3 \end{bmatrix}^T$$

where the diagonal blocks are the powers of $S^T$.

Figure 21C:
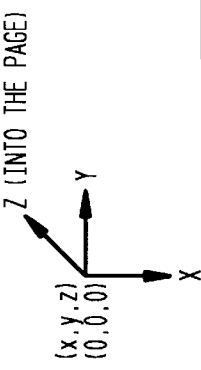
FIG. 21C is a 4×4×4 representation of an 8×8 2D torus with top PE labels (PE-x,y), a 3D cube with middle PE labels (x,y,z), and 6D hypercube with bottom PE labels $G_xG_yG_z=d_5d_4d_3d_2d_1d_0$.

Coming back to the previous example of the 3 dimensional regular torus of size 4 per side shown in FIG. 21C, the first matrix multiplication by ($I_4 \otimes G^T$), the 4 planes become:

| 000 | 310 | 220 | 130 |
|-----|-----|-----|-----|
| 100 | 010 | 320 | 230 |
| 200 | 110 | 020 | 330 |
| 300 | 210 | 120 | 030 |
| 001 | 311 | 221 | 131 |
| 101 | 011 | 321 | 231 |
| 201 | 111 | 021 | 331 |
| 301 | 211 | 121 | 031 |
| 002 | 312 | 222 | 132 |
| 102 | 012 | 322 | 232 |
| 202 | 112 | 022 | 332 |
| 302 | 212 | 122 | 032 |
| 003 | 313 | 223 | 133 |
| 103 | 013 | 323 | 233 |
| 203 | 113 | 023 | 333 |
| 303 | 213 | 123 | 033 |

Figure 22:
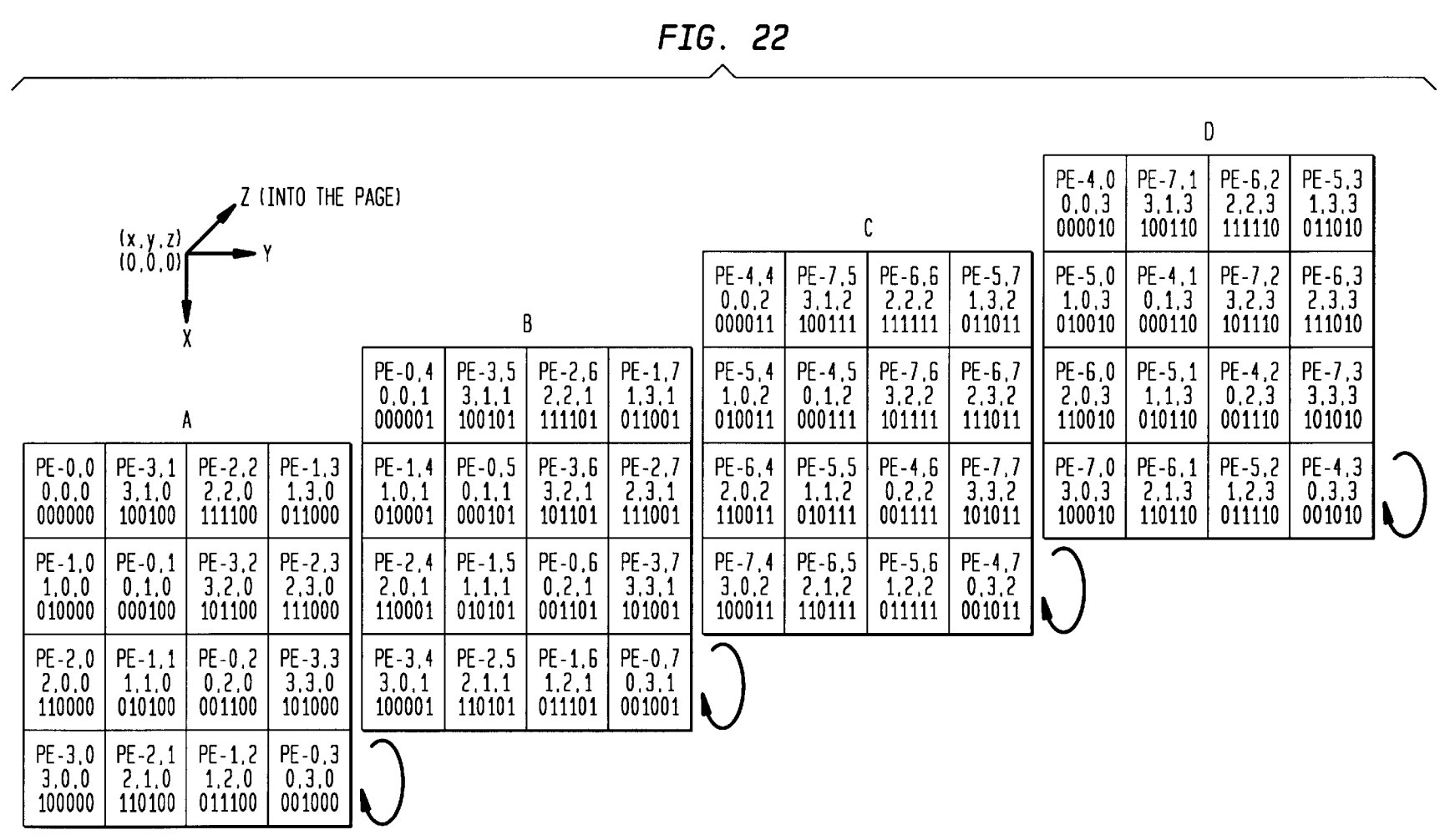
Figure 23:
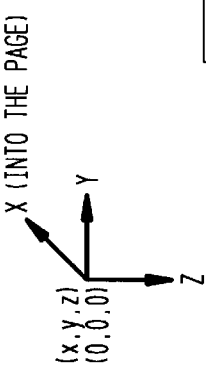
FIG. 23 is a 4×4×4 z plane representation of the nodes of FIG. 22.

The above groupings are illustrated in FIG. 22 and also in FIG. 23 from the Z-axis perspective. After the second matrix multiplication by ($G^T \otimes I_4$), we get:

| 000 | 310 | 220 | 130 |
|-----|-----|-----|-----|
| 100 | 010 | 320 | 230 |
| 200 | 110 | 020 | 330 |
| 300 | 210 | 120 | 030 |
| 131 | 001 | 311 | 221 |
| 231 | 101 | 011 | 321 |
| 331 | 201 | 111 | 021 |
| 031 | 301 | 211 | 121 |
| 222 | 132 | 002 | 312 |
| 322 | 232 | 102 | 012 |
| 022 | 332 | 202 | 112 |
| 122 | 032 | 302 | 212 |
| 313 | 223 | 133 | 003 |
| 013 | 323 | 233 | 103 |
| 113 | 023 | 333 | 203 |
| 213 | 123 | 033 | 303 |

Figure 24:
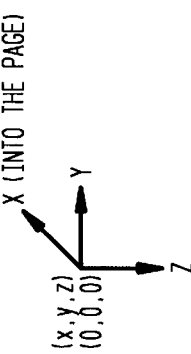
FIG. 24 is a 4×4×4 z plane representation after 1D down rotation of columns.
Figure 25:
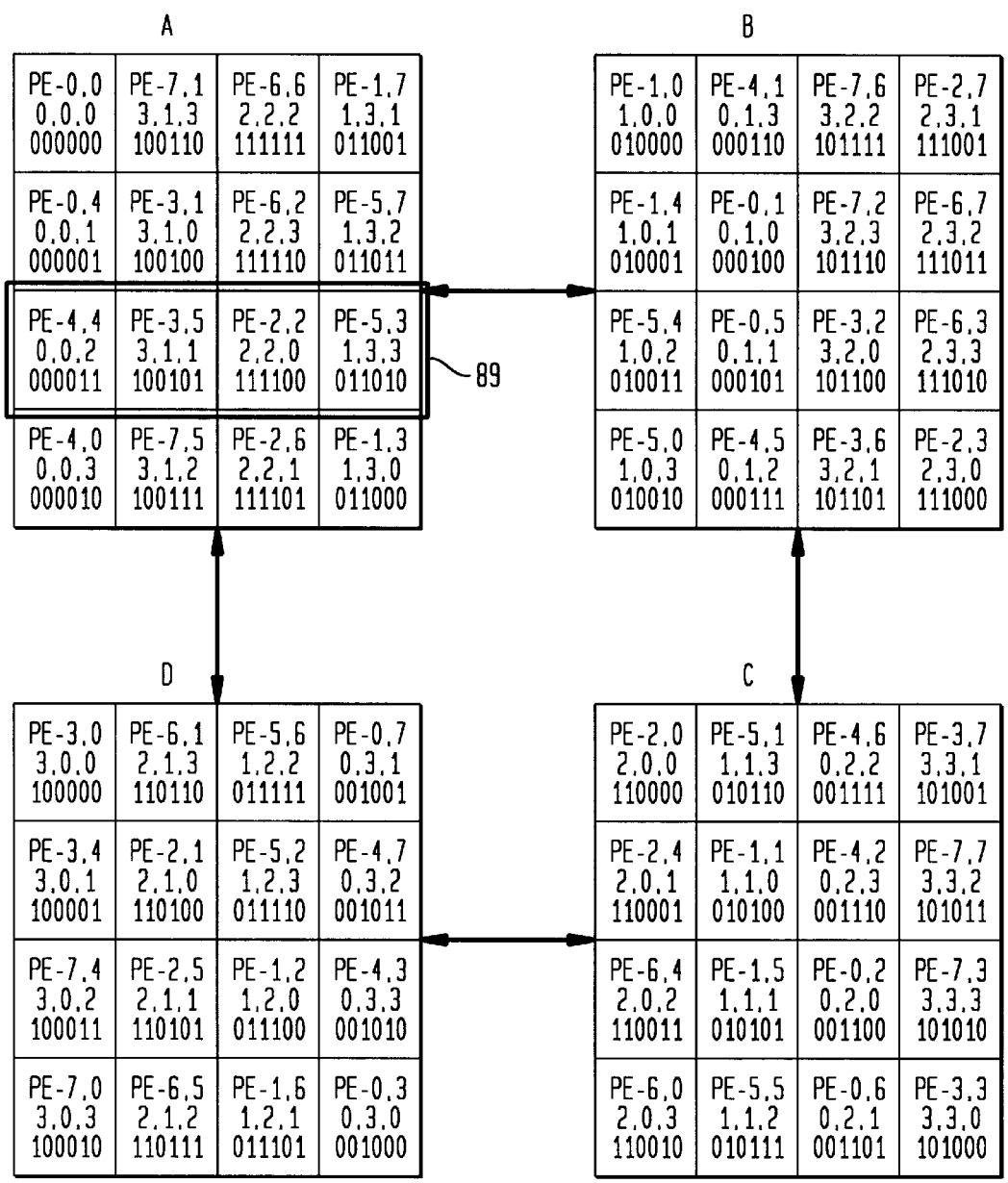
FIG. 25 is a reordering of z plane representation for layout connectivity.
Figure 26:
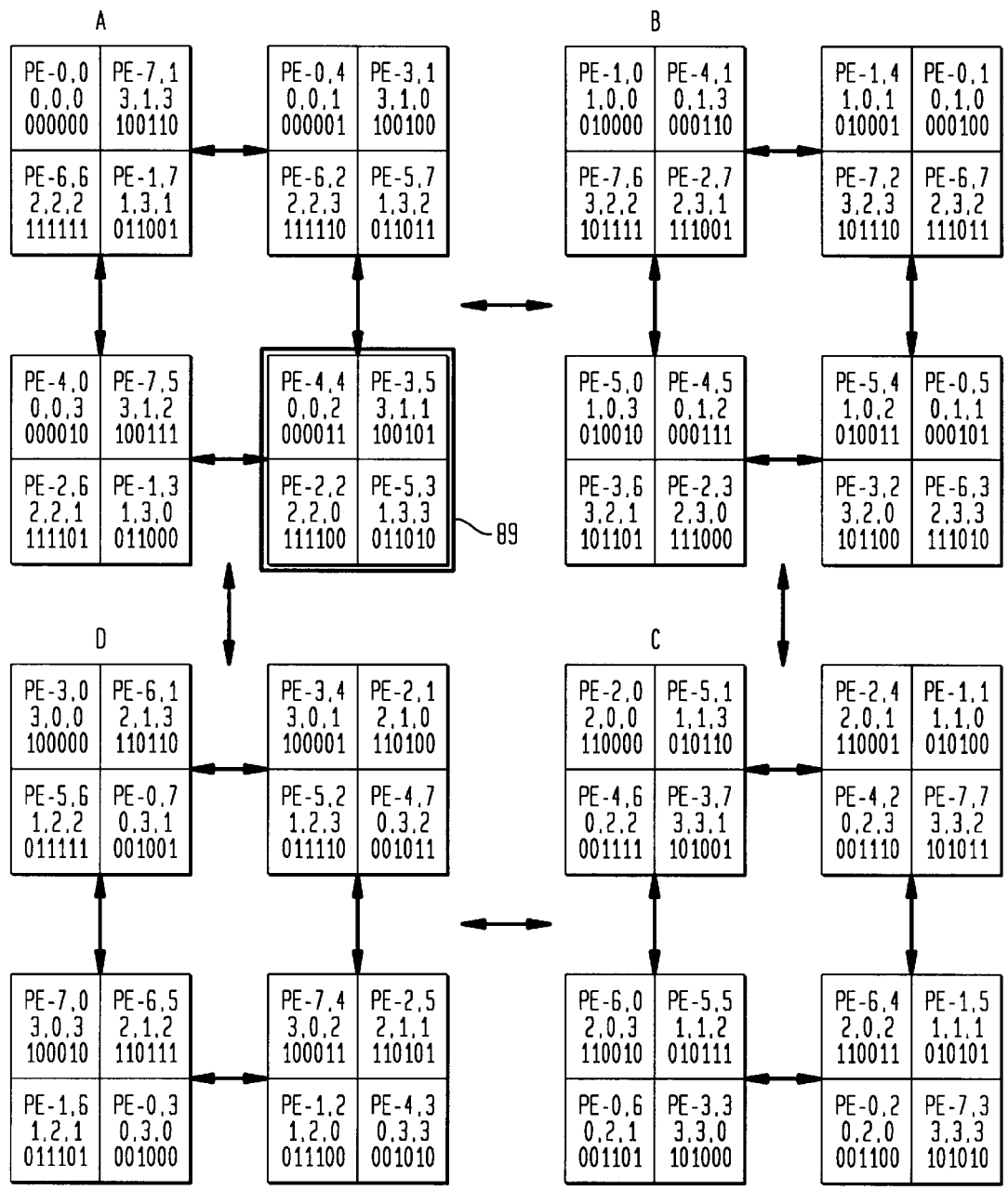
FIG. 26 illustrates the separation of the z planes into 2×2 subclusters.
Figure 27A:
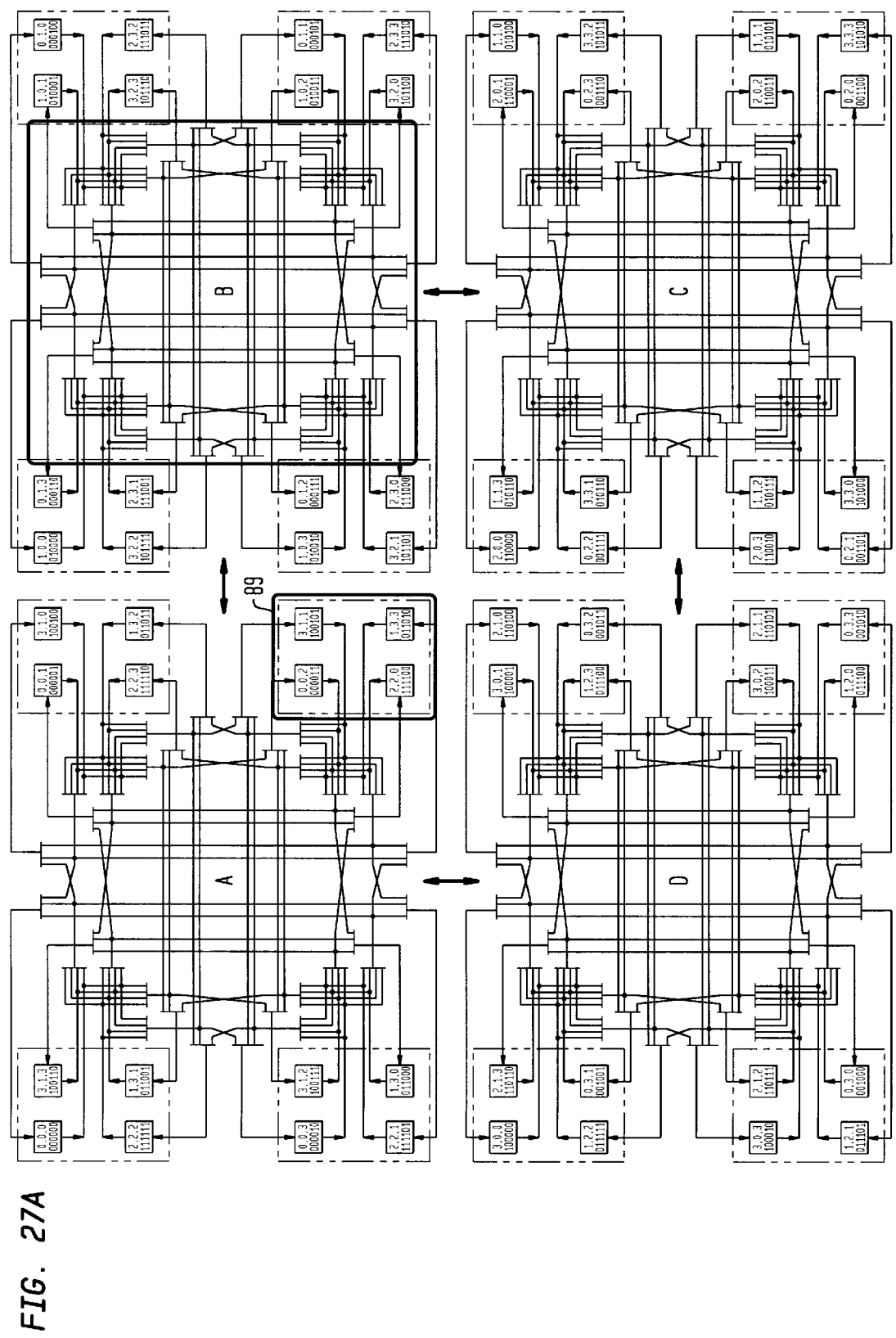
FIG. 27A shows the interconnection of the 2×2 subclusters into four 4×4 manifold arrays.
Figure 27B:
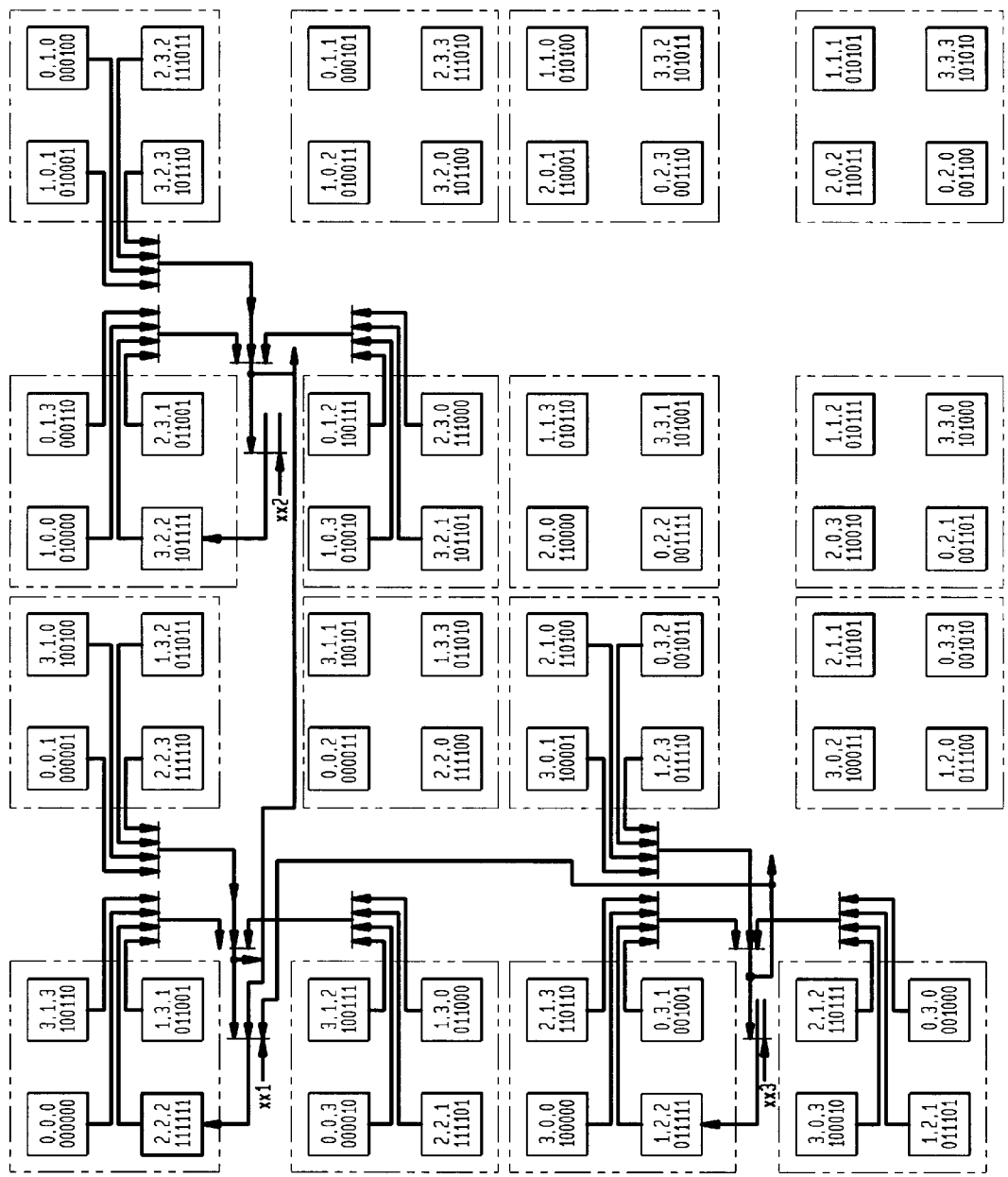
FIG. 27B shows an example o f a 4×4×4 PE node input (receive) connectivity.

This way, not only diametrically opposite nodes are grouped along the third dimension, the same position in different planes, as shown in FIG. 24, but also symmetric nodes with respect to the first two dimensions, are grouped along the second dimension or rows of the planes. In FIG. 24, one grouping 89 is highlighted. Grouping 89 is used as a reference point for the next set of figures. FIG. 25 reorders the A, B, C, and D planes based upon the connectivity they possess between the clusters. FIG. 26 separates each plane into 2×2 subclusters based upon the local connectivity between the subclusters. The group 89 is shown as a subcluster in plane A. The manifold array core architecture can now be used to directly replace each of the identified 2×2 subclusters as shown in FIG. 27A. In FIG. 27B, a 4×4×4 PE node $PE_{2,2,2}$ input (receive) connectivity is shown. Notice an additional set of multiplexers are added labeled xx1, xx2, and xx3. For each 4×4 manifold array subset of the 4×4×4, there are an additional set of 16 multiplexers of the xx# type added. These multiplexers are all connected in the same manner as shown in FIG. 27B for the highlighted PE node 2,2,2.

It is important to note that the same groupings of the nodes can be reached via a different sequence of permutations. Let P be the permutation matrix that results by multiplying together the permutations needed in the steps shown above. Any factorization of this matrix will correspond to a different sequence of steps achieving the same result. For example, suppose that $P=A_1 A_2 A_3$. Consider random permutation matrices Q, R. We can come up with a sequence of different permutations that achieve the same grouping of the nodes like the permutation P. For instance, since $P=A_1 Q^T Q A_2 R^T R A_3$, one can name $B_1=A_1 Q^T$, $B_2=Q A_2 R^T$ and $B_3=R A_3$ and get $P=B_1 B_2 B_3$. Moreover, one could permute the elements of the groups, or the relative ordering of the groups or both, reaching a grouping of nodes that is essentially the same but which looks differently.

The properties of a manifold array based network according to the present invention can also be advantageously applied to connect nodes to form a network having many advantages as discussed further below.

because of the path through s via the new edge that connects the complementary nodes. That means, for any pair of nodes v and s of H', their distance cannot be more than d/2 when d is even, or (d+1)/2 when d is odd. If the distance of v from s in H is more than (d+1)/2, then the shortest path via the complementary node t of s in H' is of length less than d/2.

The network diameter of a d dimensional hypercube is d, and with the addition of the complementary node connections it become $$\left\lceil \frac{d}{2} \right\rceil,$$

as shown above. The above results are summarized in the table below. Note that only the edges connecting complementary nodes are accounted for in the middle column. The third column labeled Manifold Array indicates the number of edges contained in the structure in accordance with this aspect of the present invention as well as the constant network diameter of 2.

|  | Hypercube (A Subgraph of Manifold Array) | Hypercube with complementary edges (A subgraph of Manifold Array) | Manifold Array (In accordance with the present invention) |
| --- | --- | --- | --- |
| Nodes | $2^d$ | $2^d$ | $2^d$ |
| Edges Edges | $d2^{d-1}$ | $(d+1)2^{d-1}$ | $2^{2k-1}((4*3^{k-1}) - 1)$; for d = 2k $2^{2k}((8*3^{k-1}) - 1)$; for d = 2k + 1 |
| Network Diameter | d | $\left\lceil \frac{d}{2} \right\rceil$ | 2 |

Network diameter is the largest distance between any pair of nodes. The network diameter captures the worst case number of steps required for node-to-node communication. The smaller the diameter, the fewer steps needed to communicate between far away nodes. Small network diameters are desirable. For a hypercube of dimension d, H' is the new graph generated by adding to H the edges connecting complementary nodes. Let s and t be two complementary nodes of H, and v any other node of H. It can be demonstrated that the sum of the distances of any hypercube node v from any pair of complementary hypercube nodes, is equal to the dimension of the hypercube. In other words, given a pair of complementary nodes s and t and a node v, there is a shortest path among s and t that passes from v.

The distance of v from s is equal to the number of digits that the binary representation of s and v differ, say k. The number of digits that the binary representation of t and v differ is equal to d−k since t is the complement of s. Therefore, the distance of v from s is k and the distance of v from t is d−k. That is, the sum of the two distances is d. Moreover, the path from s to t via v is of length d, it is a shortest path.

Further, the addition of edges that connect complementary nodes of a d-dimensional hypercube reduces the diameter of the graph in half when d is even, or (d+1)/2 when d is odd. Define v as a node of H, and k and d−k are its respective distances from two complementary nodes s and t of H. Without loss of generality, assume that k<d−k. Then, the distance of v from s in H' is k because we can use the same shortest path as in H. The distance of v from t in H' is k+1

The above table shows that the subgraph containing $2^{d-1}$ more edges than the hypercube that connects the complementary nodes of a hypercube network, causes a dramatic improvement. The network diameter is reduced to half its original size as compared to the hypercube. With the full number of manifold array edges provided as shown in the third column above, in accordance with the present invention, the network diameter is reduced to a constant diameter of 2 for all d. A hypercube and a hypercube with complementary edges are proper subgraphs of the manifold array.

Emulation of virtual nodes can be embodied as follows. Suppose we have a high-dimensional network that needs to be emulated by a smaller network. This requirement means that multiple virtual nodes must be emulated by each physical node. Several ways are presented below to map the virtual to physical network so that the emulation maintains the hypercube neighborhood as well as the hypercube complement on hypercube networks and matrix transpose on 2 dimensional torus networks. Hypercube emulation may be relatively simply achieved. Suppose we have a d-dimensional hypercube that needs to be emulated on a smaller hypercube of dimension q. Then $2^{d-q}$ virtual nodes must be emulated by each physical node. A very simple way to illustrate an approach in accordance with the present invention is to consider the binary addresses of the nodes. The d-dimensional hypercube nodes require a binary address with d digits. From those d digits, q digits define the address of the physical node that does the emulation and the remaining d−q digits define the local virtual node ID within the physical node. Indeed, for a virtual node v with a d digit address $$(\underbrace{i_0 i_1 \ldots i_{q-1}}_{physical} \underbrace{i_q \ldots i_{d-1}}_{local}),$$

the first q bits of this address denote the ID of the physical node that emulates a group of $2^{d-q}$ virtual nodes that are differentiated by the local ID section of the virtual address. Any neighboring node w of v differs from the address of v in a single digit. This digit is in either one of the first q digits of the virtual ID, thus belonging to a neighbor of the physical node, or the address of w differs in one of the d–q local digits, which means that it is emulated by the same physical node. Moreover, the complement of the virtual node v is emulated by the complement of the physical node that hosts v because the complement of the virtual address is equal to the concatenation of the complements of the physical and local addresses. Since the complementary physical nodes belong to the same cluster in the manifold array, the complementary virtual nodes belong to the same cluster too.

In general, the virtual node ID may be advantageously split into two parts, not necessarily contiguous, a physical and a local node ID. A neighbor of the virtual node will have a node ID that differs either in the physical or local part of the ID. Therefore, it is emulated by a neighbor of the physical node or by the same physical node respectively. Moreover, since the complement of a virtual ID is equal to the complements of the local and physical IDs, the complement to a virtual node is always emulated by the complement of the physical node, that is also a neighbor on the manifold array.

If instead, a smaller hypercube is emulated by a larger hypercube, everything works as expected on a subset of the manifold array because the manifold array network is defined recursively. That means, there is a subgraph of the manifold array that is of size equal to the hypercube to be emulated where the above discussion holds.

Torus emulation may also be readily addressed as the same concepts hold for the emulation of a torus. Contiguous sections of the virtual node ID (per dimension) correspond to a physical and a local ID. When the physical node ID contains the most significant bits of the virtual node ID, we have a block distribution of the virtual nodes. Otherwise, when the physical node ID contains the least significant bits of the virtual node ID, we have a cyclic distribution of the virtual nodes. In block distribution, a group of virtual nodes with successive IDs is emulated by the same physical node. The block distribution of 16 virtual nodes over 4 physical nodes has physical node 0 emulating virtual nodes 0, 1, 2 and 3, physical node 1 emulating virtual nodes 4, 5, 6 and 7 and so on. In cyclic distribution a group of nodes with successive IDs is emulated by different physical nodes. This time, the cyclic distribution of 16 virtual nodes over 4 physical nodes has physical node 0 emulating virtual nodes 0, 4, 8 and 12, physical node 1 emulating virtual nodes 1, 5, 9 and 13 and so on.

By adding or subtracting one to a virtual address, we find a neighbor of this node along the specified dimension. This addition/subtraction is equivalent to adding/subtracting one to either the local or physical part of the virtual address or both, thus ensuring that the neighboring virtual node is emulated by either the same physical node or a neighboring physical node. To guarantee that the transpose virtual node is emulated by the same physical node or neighboring physical node, the assignment of physical and local sections of the virtual address must be the same for all dimensions. In other words, block-block or cyclic-cyclic distributions of virtual nodes preserve the transpose neighborhood.

Turning to hypercube manifold array examples in parallel machines, the placement of data may be of paramount importance for high performance computations of algorithms. In an array processor, to minimize the latency caused by moving the data between processing elements, the data must be placed in the appropriate PE initially and moved between directly connected PEs during the computations. Consequently, the data movement, as an algorithm progresses through its stages of computations, needs to be optimized in order to minimize the overall communication latency for the whole algorithm. To demonstrate the manifold array's capabilities, a perfect shuffle algorithm and a communication between a PE and its hypercube complement algorithm will be examined on a 4×4 manifold array 2800 shown in FIGS. 28A–30. Tensor product algebra is used to map the perfect shuffle algorithm onto the manifold array processor.

Tensor product algebra, also called Kronecker products, represents a method for mapping mathematical equations into a matrix form suitable for algorithmic coding to a target machine architecture. See, for example, J. Granata, M. Conner, R. Tolimieri, "The Tensor Product: A Mathematical Programming Language for FFTs and other Fast DSP operations", IEEE SP magazine, pp. 40–48, January 1992 and J. R. Johnson, R. W. Johnson, D. Rodriquez, and R. Tolimieri, "A Methodology for Designing, Modifying, and Implementing Fourier Transform Algorithms on Various Architectures", Circuits Systems Signal Process Vol. 9, No. 4, pp. 449–500, 1990. for a introduction to tensor products as it applies to mapping problems onto target architectures. Both these articles are incorporated by reference herein.

Figure 28A:
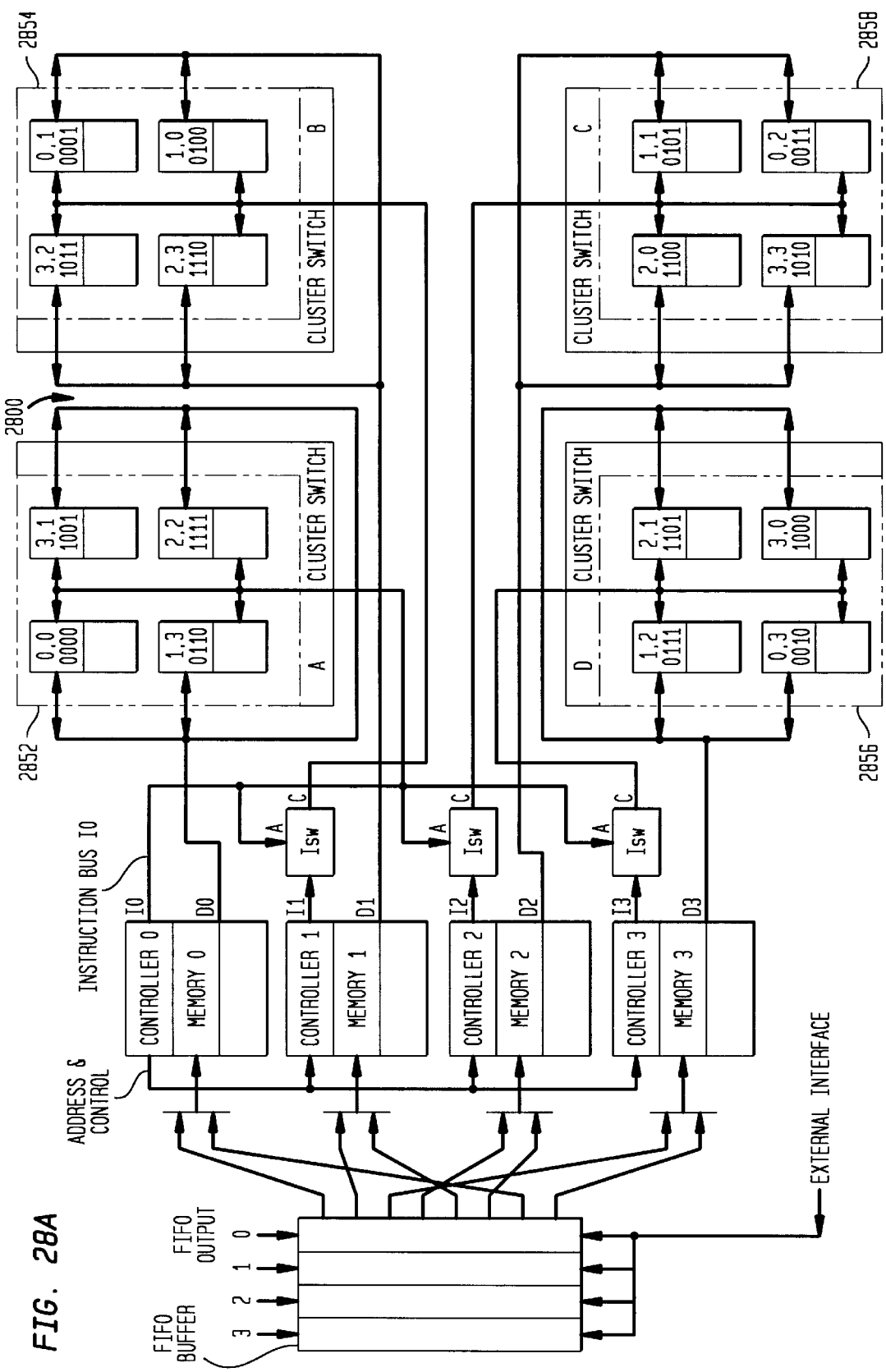
FIG. 28A is a block diagram of a 4×4 manifold array block diagram showing a single controller per cluster configuration and an exemplary interface.

In tensor notation for a manifold array perfect suffle example, a perfect shuffle is defined as a permutation matrix that is represented by $P^{2^n}{}_2 n-1$ from the J. R. Johnson et al. reference at p.472. The permutation matrix is typically interpreted as defining an addressing mechanism for accessing the data to be loaded or stored to or from a particular machine organization. In general, the permutation matrix represents the data movement required to place the data in the proper place for the next intended computational operation. Consequently, it is important to optimize the mapping of the data movement, permutation matrices, to the target architecture. For the manifold array organization, operating as a Single Instruction Multiple Data stream (SIMD) hypercube machine, the perfect shuffle can be easily implemented given the proper placement of the data in the array. A $P^{2^n}{}_2 n-1$ n=5 ($P^{32}{}_{16}$) perfect shuffle example is described using FIGS. 28–33. FIG. 28A depicts a bus structure and operational units that are used to describe the perfect shuffle algorithm. Included in FIG. 28A, are multiple controllers, memory units 0–3, and a special purpose FIFO buffer. The preferred embodiment of this organization places the memory units, controllers, and FIFO buffer on the same chip as the array of PEs. It should be realized, however, that the invention is more general and goes beyond a single chip implementation. The manifold array concepts can easily be used by an array of microprocessor-chip PEs, with cabled buses, external memories, and external controllers. For the purposes of this discussion, a single chip high performance array processor is described which allows a single architecture and machine organization to be defined that is scalable across a family of machines.

Figure 29:
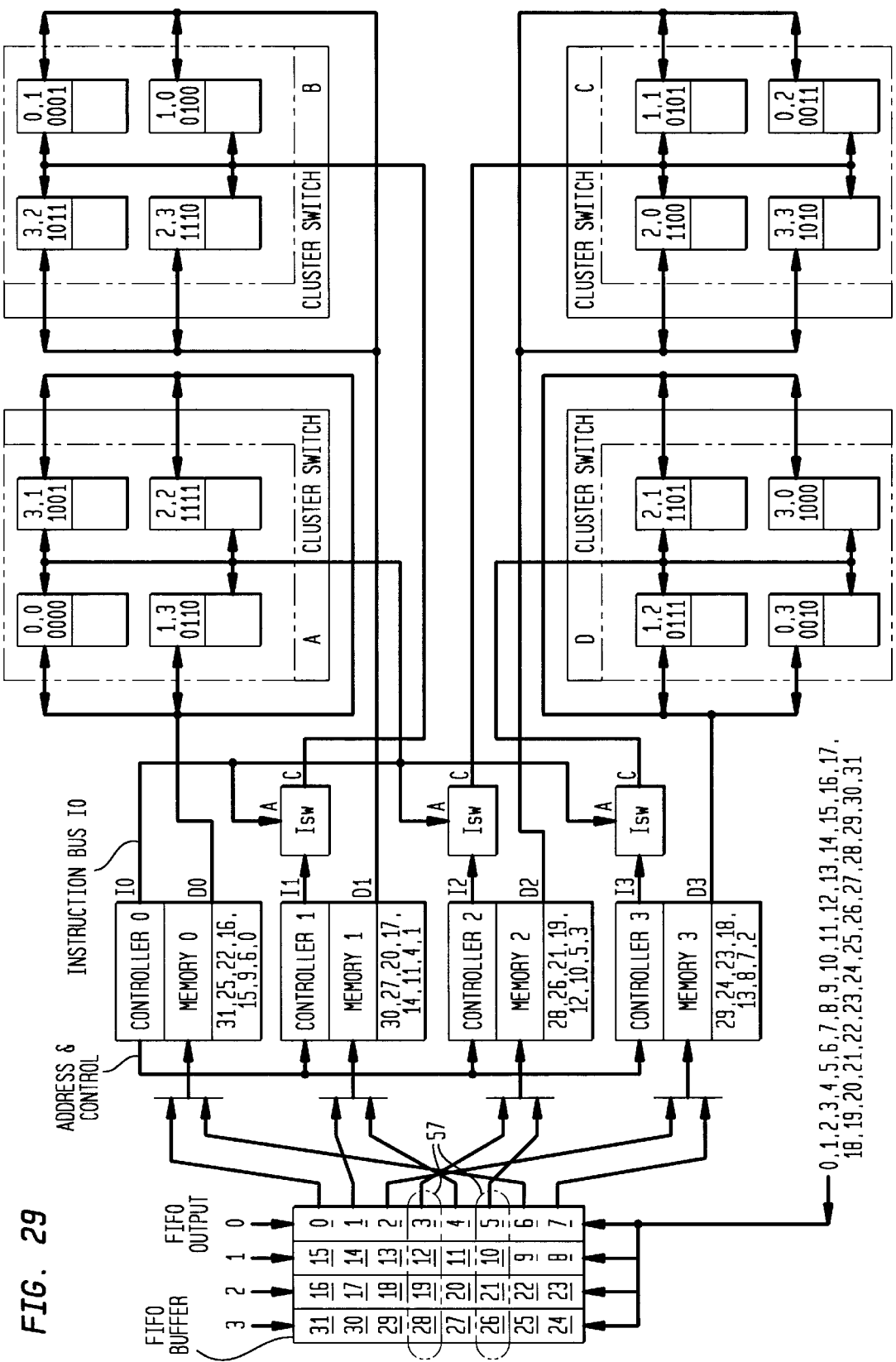
FIG. 29 shows the 4×4 multiple controller manifold array of FIG. 28A illustrating the loading of 32 data items of the example into the four memory controllers.
Figure 30:
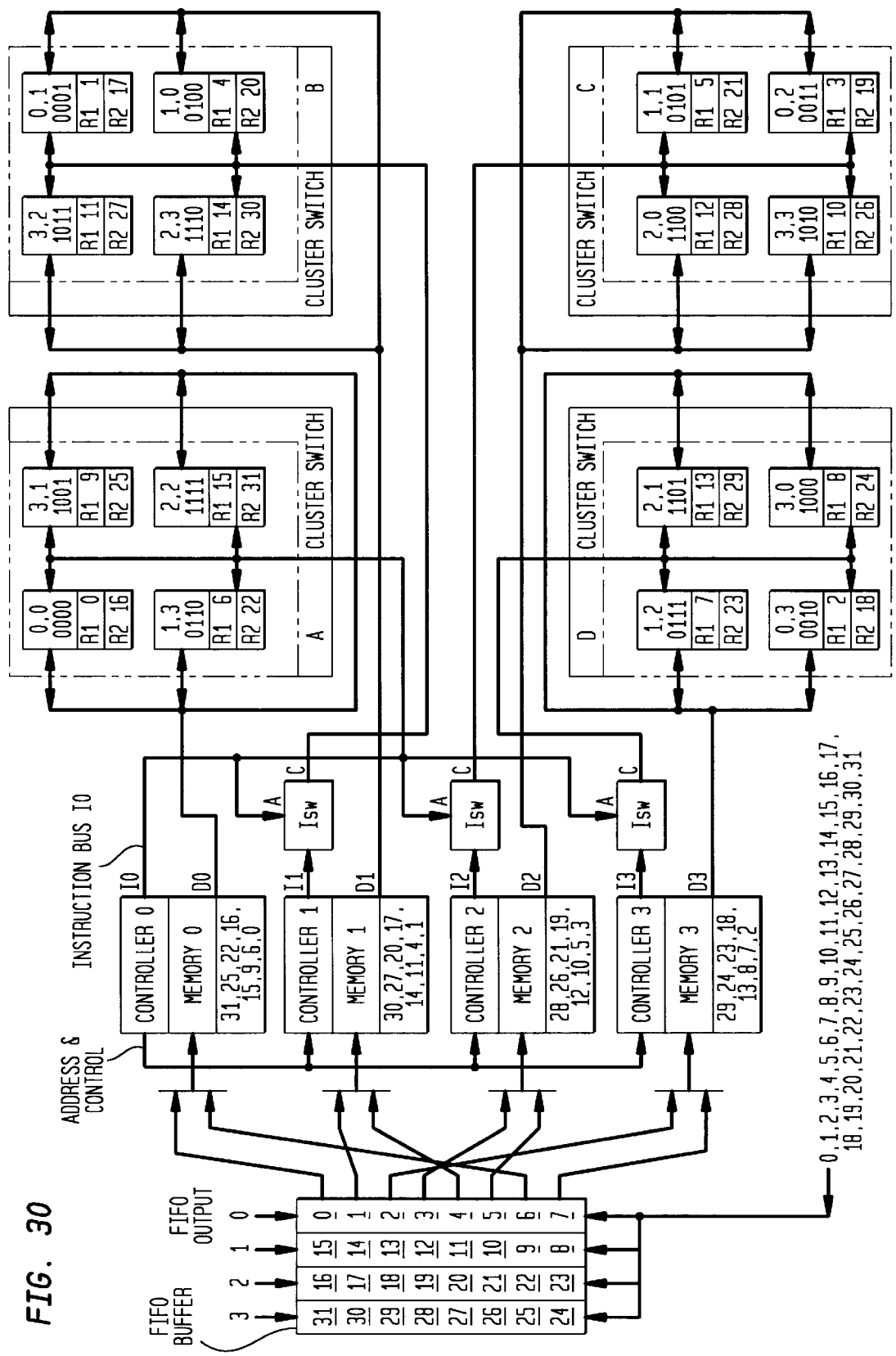
FIG. 30 shows the 4×4 multiple controller manifold array of FIG. 28A illustrating the load distribution of the 32 data items to the individual PEs in each cluster.

Consequently, for low cost, the controllers, memory units, data buffers, e.g. FIFOs, and PEs are all contained on a single chip. The controllers provide controls to their array cluster, memory, and I/O functions via control signals, for example, memory address and load/store signals, or via the dispatched instructions sent on the instruction bus, for example, to the PEs. The controllers are each a typical functional unit in SIMD machines and are described only in support of the following algorithm. A data buffer, shown as a special purpose FIFO Buffer in FIGS. 28–30, is also typically incorporated in a memory/direct memory access (DMA) interface unit, and again is described only generally herein.

FIG. 28A demonstrates how multiple controllers may be suitably implemented to support a reconfigurable topology of clustered PEs. In FIG. 28A, a controller is associated with each cluster of 4 PEs. Controller 0 is considered the master controller, though other schemes can be used. The instruction bus I0 is connected to its own cluster as well as an instruction switch (ISW) associated with each of the other controllers. Each Isw in FIG. 28A, enables a connection path for the instruction bus I0 to the output-C or from the controller's input instruction bus I1, I2, or I3 to the respective Isws' output-C. The Isws are configured using control signals provided directly or indirectly by the master controller. The master controller may also receive this information directly or indirectly from another processor included in the system organization and designated to provide such information, such as a host processor. For the purposes of this perfect shuffle example, the Isw's are set to connect I0 to all instruction bus paths. The Controller-0 thereby acts as a single controller for all four PE-clusters 2852, 2854, 2856 and 2858 shown in FIG. 28A. An external interface path is shown in FIG. 28A that connects to a source of data, for example, a memory subsystem.

Figure 28B:
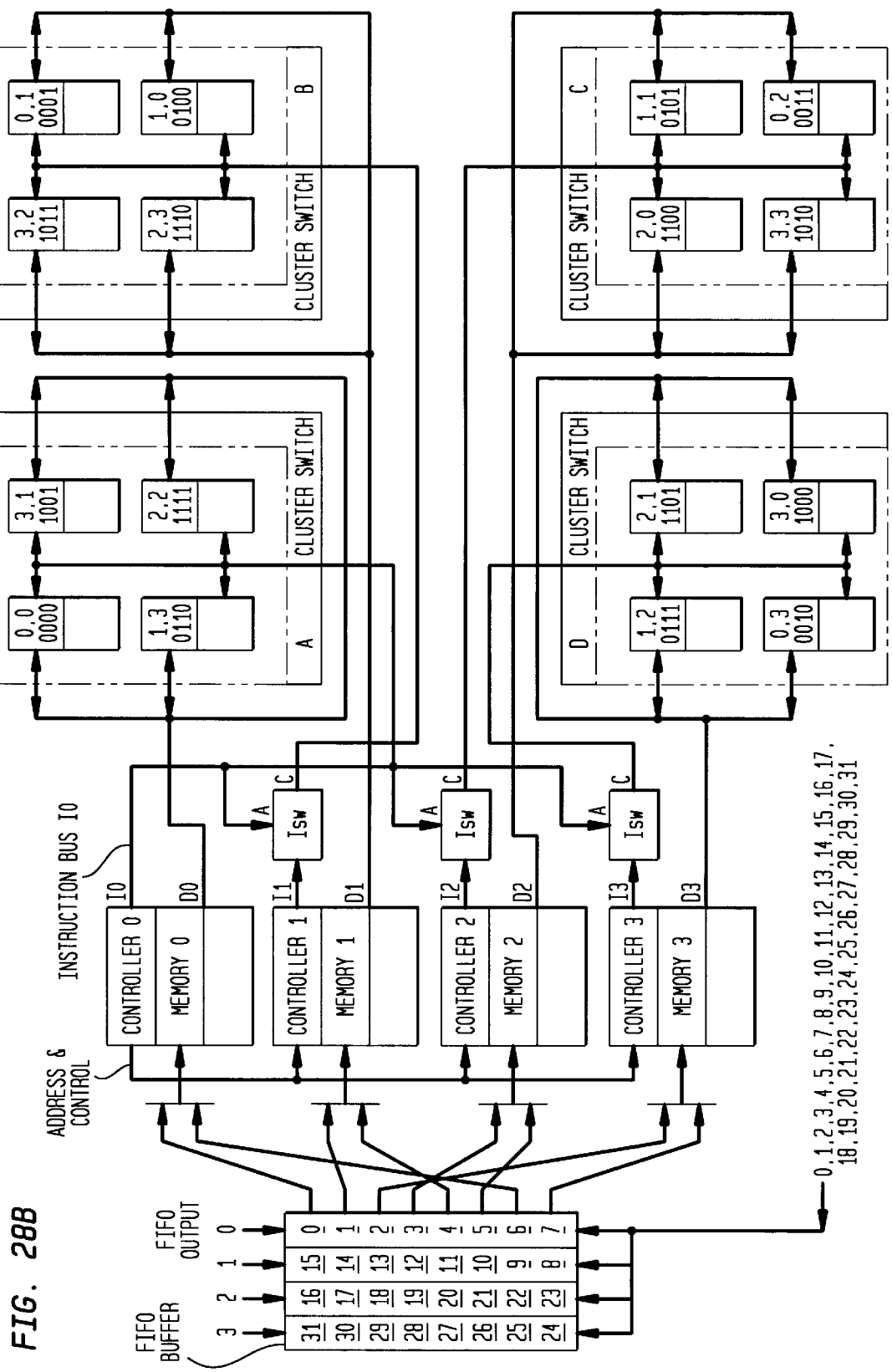
FIG. 28B shows the 4×4 multiple controller manifold array of FIG. 28A receiving 32 data items into its external interface.

Beginning at the bottom of FIG. 28B, a linear sequence of data items are shown, which for the purposes of the example, are received into the on-chip FIFO in groups of eight data items per FIFO address. This address is indicated at the top of each column in the FIFO. As shown in FIG. 28B, the first group of data items {0–7} are stored in FIFO-0, the next group {8–15} are stored in FIFO-1, and so forth. In this example, the FIFO supplies eight output paths, one for each column data item, to four multiplexers that are enabled by the controller, controller-0 in this example, or local buffer control function, to load data in the fashion to be described below in connection with FIG. 29 below. In FIG. 28B, each bus shown, D0, D1 , D2 , & D3, can be a tri-state bidirectional bus or separate load and separate store buses. The bus or buses may be any data width that matches the intended applications, typically 8-bits, 16-bits, 32-bits, or 64-bits though other widths are not precluded.

For clarity reasons, the interconnection between the clusters of PEs is not shown. The basic memory block of FIG. 3A–3C has been expanded to N=4 memory blocks, in the 4×4 manifold array 2800 of FIG. 28, to support the placement of the data in a hypercube pattern and to increase the data interface bandwidth to the clusters. The memory blocks have been labeled 0–3 and the bus paths are ordered one per cluster. For example, memory 0 with data bus D connects to cluster A 2852 PEs {(0,0), (3,1), (1,3), (2,2)}, and memory 1 with data bus D1 connects to Cluster B 2854 PEs {(3,2), (0,1), (2,3), (1,0)}, and so on. Note that other bus structures are possible and are not precluded by this exemplary description.

With the data loaded into the FIFO Buffer, the next step of the process loads the data to the internal memories 0–3 (M0, M1, M2, and M3) as shown in FIG. 29. For the purpose of this description, 32-bit data items and 32-bit data buses are assumed. Eight FIFO-to-memory load cycles are used to load four data items at a time in parallel in the following sequence, using the notation: memory unit-data item or. Mx-a. The sequence used to produce the data pattern shown loaded into the memory units in FIG. 29 is: $1^{st}$ (M0-0, M1-1, M2-3, and M3-2), $2^{nd}$ (M0-6, M1-4, M2-5, and M3-7), continuing until the $8^{th}$ (M0-31, M1-30, M2-28, and M3-29). For example, memory 2 (M2) is loaded with the data from the FIFO lines indicated by the circled items 57 in FIG. 29. The memory data must now be loaded into the PE array 2800. The memory blocks are addressed and controlled by controller-0. To load data into the PEs, the controller-0 dispatches an instruction to the PEs informing them that data is to be loaded from their data buses and where that data is to be loaded internal to the PEs. The controller-0 then in synchronism provides an address to the memory blocks, which in this case is the same address for each of the four memories 0–3. In sync with the address, the controller-0 then generates the signals necessary for the memory units to read data out from the addressed locations and place that data onto the memory unit's own data bus.

Figure 31:
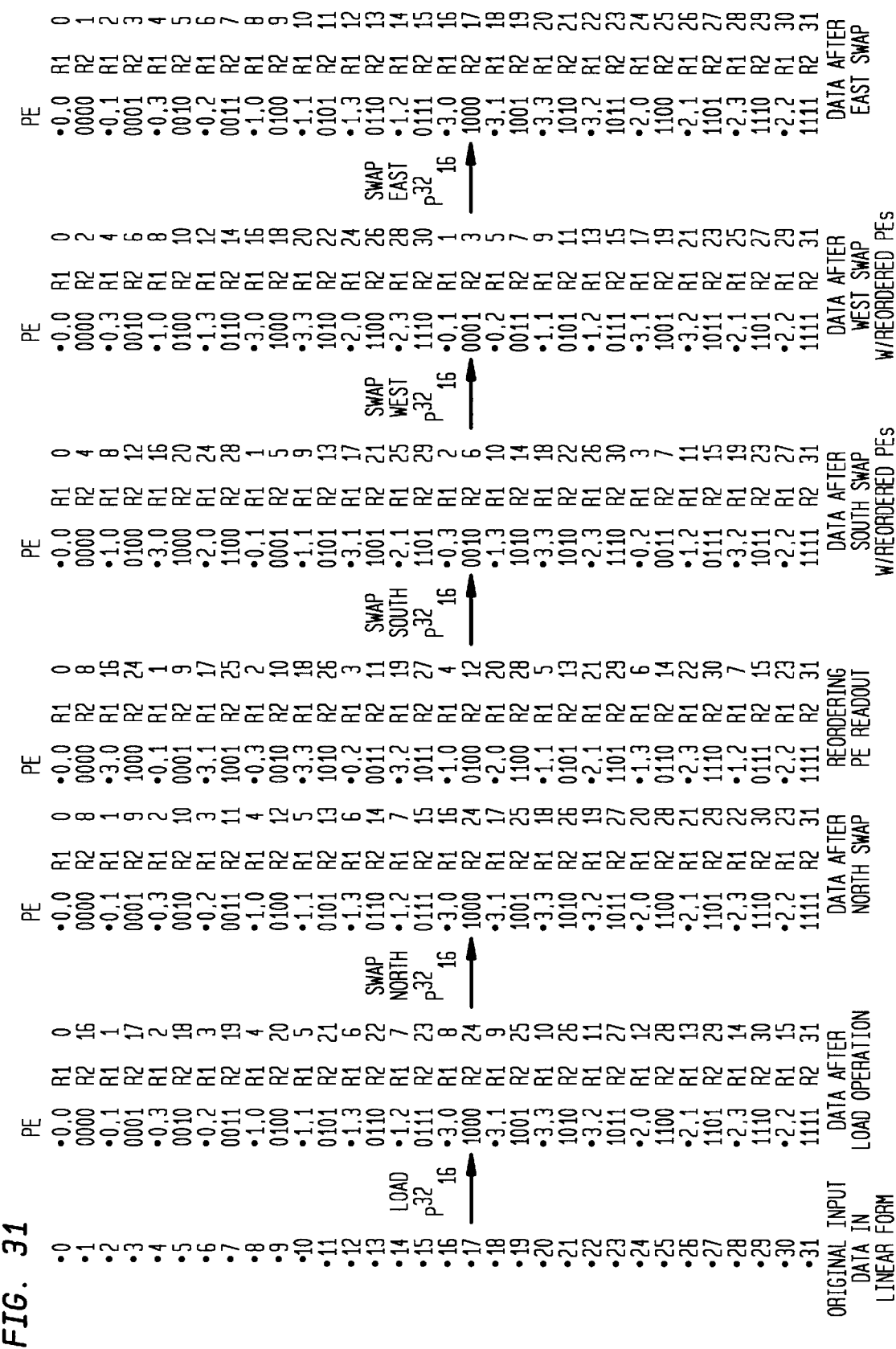
FIG. 31 lists the 32 exemplary data items after each step of the perfect shuffle example with reference to FIGS. 28A–30.

In synchronism, the appropriate PEs take the data from their data bus and load it as specified by the controller-0 's dispatched instruction. The controller-0 identifies the selection of the appropriate PEs. This selection can be done in a number of ways, through identification within the dispatched instruction, the controller sends to the PEs, or via programmable enable/disable bits located in the PEs, or the like. The controller dispatches a sequence of PE load instructions on the instruction bus to the PEs to accomplish this result. A total of eight Memory-to-PE load cycles are used to load the 32 data items, four data items per load cycle, in parallel to the PEs in the following sequence, using the notation: memory unit-data item-PE #. The sequence used to produce the data pattern shown loaded into the PEs in FIG. 30 is: $1^{st}$ (M0-0-$PE_{0,0}$, M1-1-$PE_{0,1}$, M2-3-$PE_{0,2}$, M3-2-$PE_{0,3}$), $2^{nd}$ (M0-6-$PE_{1,3}$, M1-4-$PE_{1,0}$, M2-5-$PE_{1,1}$, M3-7-$PE_{1,2}$), $3^{rd}$ (M0-9-$PE_{3,1}$, M1-11-$PE_{3,2}$, M2-10-$PE_{3,3}$, M3-8-$PE_{3,0}$), $4^{th}$ (M0-15-$PE_{2,2}$, M1-14-$PE_{2,3}$, M2-12-$PE_{2,0}$, M3-13-$PE_{2,1}$), continuing until the 32 data items are loaded into the PE array, as shown in FIG. 30. This load pattern effects a perfect shuffle if the data items are read out in the correct order. Executing a perfect shuffle operation on the 32 data list in sequence is shown in FIG. 31.

It is known that a $$X = (P^{32}_{16})(P^{32}_{16})(P^{32}_{16})(P^{32}_{16})(P^{32}_{16}) X.$$

This equation is used to demonstrate a communications example on the manifold array. The first permutation of X, a 32-element vector, is accomplished by the load operation as shown in FIG. 30. The next permutation is effected by a Swap-North operation between neighboring pairs of PEs as defined in the following list for each of the four neighborhood directions.

| | | | | |
|---|---|---|---|---|
| East Swap | {0,0 & 0,1}, | {0,2 & 0,3}, | {1,0 & 1,1}, | {1,2 & 1,3}, |
| | {2,0 & 2,1}, | {2,2 & 2,3}, | {3,0 & 3,1}, | {3,2 & 3,3} |
| South Swap | {0,0 & 1,0}, | {2,0 & 3,0}, | {0,1 & 1,1}, | {2,1 & 3,1}, |
| | 0,2 & 1,2}, | {2,2 & 3,2}, | {0,3 & 1,3}, | {2,3 & 3,3} |
| West Swap | {0,0 & 0,3}, | {0,1 & 0,2}, | {1,0 & 1,3}, | {1,1 & 1,2}, |
| | {2,0 & 2,3}, | {2,1 & 2,2}, | {3,0 & 3,3}, | {3,1 & 3,2} |
| North Swap | {0,0 & 3,0}, | {1,0 & 2,0}, | {0,1 & 3,1}, | {1,1 & 2,1}, |
| | {0,2 & 3,2}, | {1,2 & 2,2}, | {0,3 & 3,3}, | {1,3 & 2,3} |

The swap operation causes an exchange of register data values between the specified PEs. The choice of register values to exchange is defined in the dispatched instruction received in each PE. For the purposes of this example, register R1 in one PE is exchanged or swapped with register R2 in the other PE. FIG. 31, depicts the perfect shuffle sequence, listing in columnar form the PEs' hypercube number and their contained registers R1 and R2. Each column, separated by a Swap (direction) instruction, indicates the result of the swap operation. As can be seen in FIG. 31, the perfect shuffle is effected in each swap operation requiring only a single cycle of nearest neighbor data movement between the paired PEs.

Figure 32:
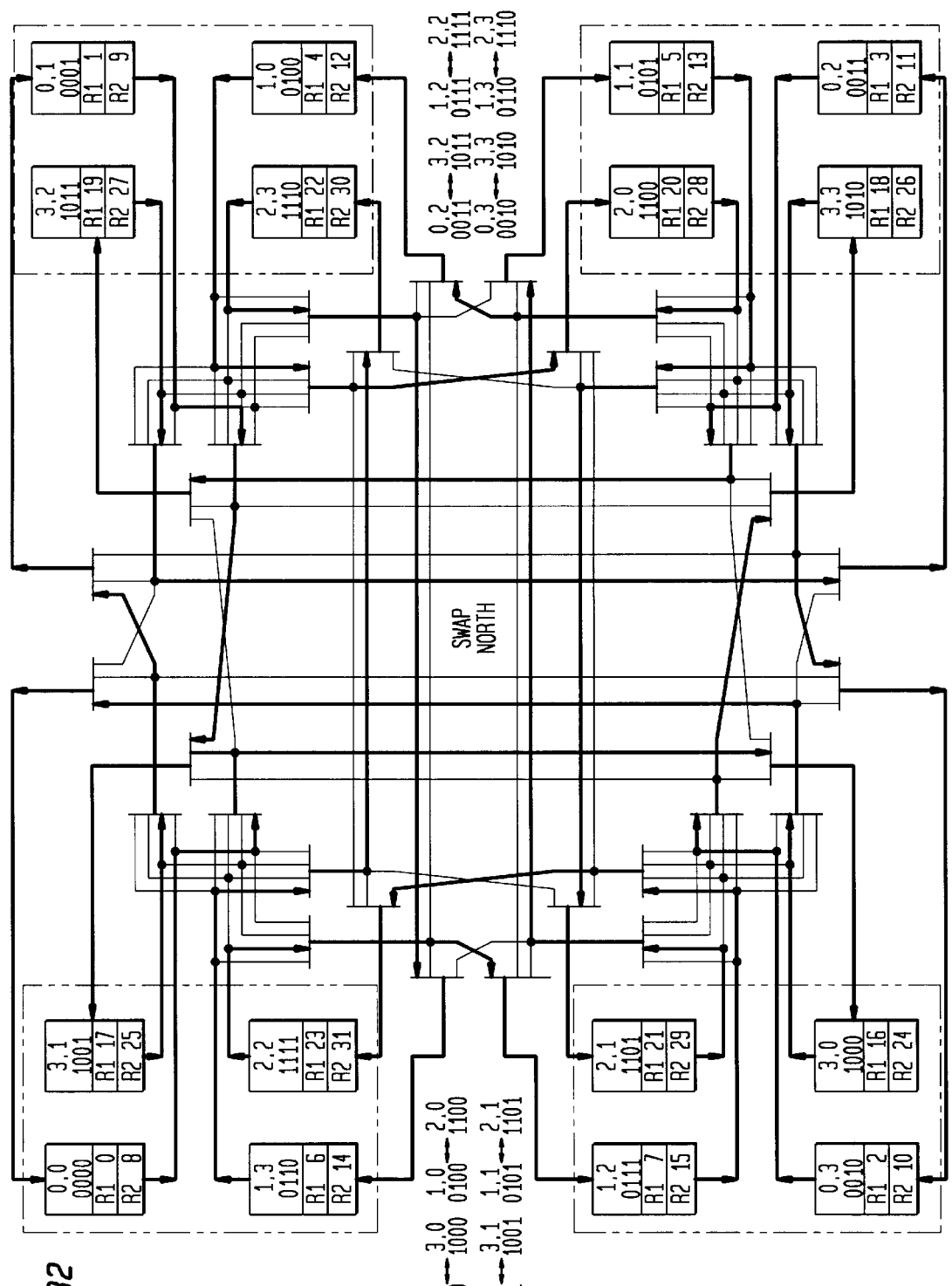
FIG. 32 shows a 4×4 manifold array illustrating the paths the data takes between PEs to execute a Swap North communication operation and the results in the PE register at completion of the communication operation of the perfect shuffle example.
Figure 33:
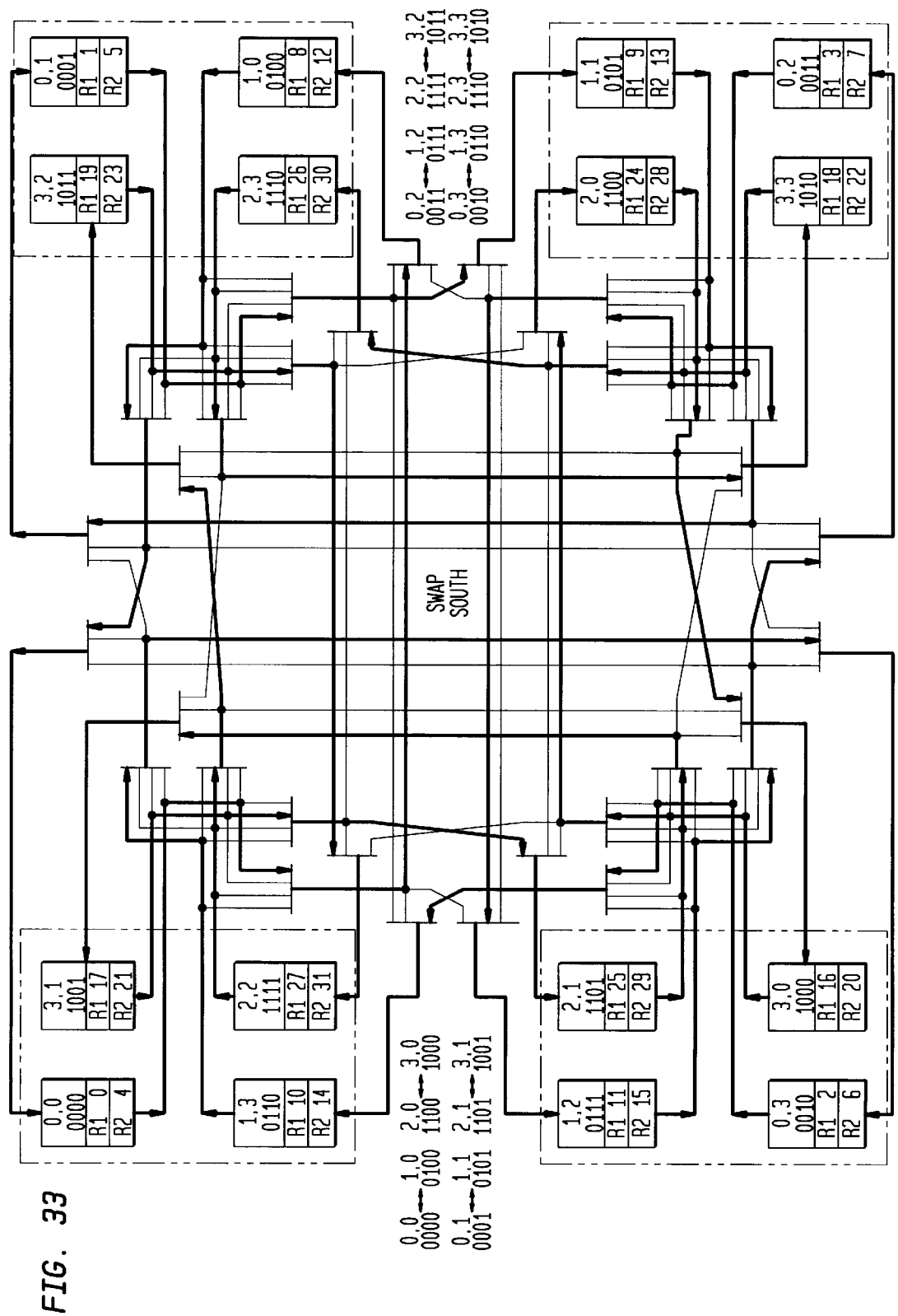
FIG. 33 shows a 4×4 manifold array illustrating the paths the data takes between PEs to execute a Swap-South communication operation and the results in the PE registers at completion of the communication operation of the perfect shuffle example.

FIGS. 32 and 33 are provided to further expand on this description. FIG. 32 depicts the register results at completion of the Swap North dispatched instruction to the PEs. FIG. 33 depicts the register results at the completion of the Swap South dispatched instruction to the PEs. The Swap West and Swap East instructions are processed in a similar manner. The importance of this described example is that for many algorithms that require a perfect shuffle of the data, if the data can be loaded in the hypercube pattern as indicated, then extremely high speed processing can be obtained on the manifold array 2000.

Finally, a manifold array hypercomplement example is described. In this example, the exchange of register values between the hypercube PEs and their complement hypercube PEs above is performed using the swap commands as indicated in the perfect shuffle example above. The hypercomplement provides an optimal reduction to a single cycle for the longest path in the hypercube machine, assuming a single PE per hypercube node. FIG. 18 depicts the paths used by the hypercomplement allowing a simple exchanged between the connected PEs to occur in a single cycle.

While the present invention has been described in the context of specific preferred embodiments and exemplary applications, it will be recognized that the invention will be applicable to a host of applications and is limited solely by the appended claims. By way of example, while the presently preferred embodiments address clusters of processing elements, clusters of nodes are also contemplated. Such nodes may be memory elements to form a tiled memory system allowing simultaneous access to multiple blocks of stored data. Additionally, the nodes might be connection ports, input/output devices or the like. Again, by way of example, the nodes might serve to connect a plurality of communication channels in a communication network.

We claim:

1. An interconnection system for a plurality of processing elements (PEs) connected in an N×M array where N and M are both greater than one, each PE having a communications port for transmitting and receiving data and commands, the PEs grouped into clusters, and the interconnection system comprising:

inter-PE connection paths, and a cluster switch connected to said PEs so as to combine mutually exclusive inter-PE connection paths between clusters and to thereby substantially reduce the number of communication paths required to provide inter-PE connectivity equivalent to that of conventional torus-connected PE arrays, said cluster switch further comprising connections to provide direct communications between transpose PEs and between hypercube complement PEs, wherein data and commands may be transmitted and received at said communications ports in one of eight selected modes:

a) transmit east/receive west mode for transmitting data to an east PE via the communications port while receiving data from a west PE via the communications port, b) transmit north/receive south mode for transmitting data to a north PE via the communications port while receiving data from a south PE via the communications port, c) transmit south/receive north mode for transmitting data to a south PE via the communications port while receiving data from a north PE via the communications port, d) transmit west/receive east mode for transmitting data to a west PE via the communications port while receiving data from an east PE via the communications port, e) transpose transmit/receive mode for transmitting and receiving between transpose PEs, and hypercube transmit/receive mode for transmitting and receiving between distance 1 hypercube PEs, f) hypercube transmit/receive modes for transmitting and receiving between select distance 2 hypercube PEs, and, g) hypercube complement transmit/receive mode for transmitting and receiving between distance d,d-dimensional hypercube complement PEs.

2. The interconnection system of claim 1 wherein said modes allow direct connection paths to be established between said PEs.

3. The interconnection system of claim 2 further comprising a controller and memory system connected to simultaneously send control information to each PE control port and to send data to each PE data port for loading into registers at each PE.

4. The interconnection system of claim 2 wherein each communication port includes B-bit wide transmission and reception paths, where B is an integer greater than or equal to one.

5. The interconnection system of claim 2 wherein each PE is connected to selectively send commands or data over a communications port while receiving data or commands via another communications port, based upon communication instructions received through a control port and decoded in the control logic residing on each of the PEs.

6. The interconnections system of claim 5 wherein the communication instruction is received by the control logic from a controller over said control port.

7. The interconnection system of claim 5 wherein the cluster switch supports an operation wherein the PEs are each simultaneously sending commands or data while receiving commands or data.

8. The interconnection system of claim 7 wherein said simultaneously operation is selectively switched such that the PEs are each simultaneously sending commands or data over the send portions of said communications port while receiving data or commands over the receive portion of said communications port.

9. A parallel processor, comprising:

N clusters of M processing elements, each processing element having a communications port through which the processing element transmits and receives data over a total of B wires, communications paths which are less than or equal to (M) (B) wires wide connected between pairs of said clusters, each cluster member in the pair containing processing elements which are torus nearest neighbors to processing elements in the other cluster of the pair, each path permitting communications between said cluster pairs in two mutually exclusive torus directions, that is, South and East or South and West or North and East or North and West,and multiplexers connected to combine 2 (M) (B)-wire wide communications between said cluster pairs into said less than or equal to (M) (B)-wires wide paths.

10. The parallel processor of claim 9 wherein the processing elements of each cluster communicate to the North and West torus directions with one cluster and to the South and East torus directions with another cluster.

11. The parallel processor of claim 9 wherein the processing elements of each cluster communicate to the North and East torus directions with one cluster and to the South and West torus directions with another cluster.

12. The parallel processor of claim 9 wherein the processing elements of each cluster communicate in two hypercube directions with one cluster and two hypercube directions with another cluster.

13. The parallel processor of claim 9 wherein at least one cluster includes a hypercube complement pair.

14. The parallel processor of claim 9 wherein a cluster switch comprises said multiplexers and said cluster switch is connected to multiplex communications received from two mutually exclusive torus directions to processing elements within a cluster.

15. The parallel processor of claim 14 wherein said cluster switch is connected to multiplex communications from the processing elements within a cluster for transmission to another cluster.

16. The parallel processor of claim 15 wherein said cluster switch is connected to multiplex communications between transpose processing elements within a cluster.

17. The parallel processor of claim 9 wherein N is greater than or equal to M.

18. The parallel processor of claim 9 wherein N is less than M.

19. A parallel processor, comprising:

N clusters of M processing elements, each processing element having a communications port through which the processing element transmits and receives data over a total of B wires and each processing element within a cluster being formed in a closer physical proximity to the other processing elements within a cluster than to processing elements outside the cluster, communications paths which are less than or equal to (M) (B)-wires wide connected between pairs of said clusters, each cluster member in the pair containing processing elements which are hypercube nearest neighbors to processing elements in the other cluster of the pair, each path permitting communications between said cluster pairs in two mutually exclusive torus directions, that is, South and East or South and West or North and East or North and West, or between two hypercube dimensions, and multiplexers connected to combine 2 (M) (B) wires wide communications between said cluster pairs into said less than or equal to (M) (B) wires wide paths.

20. The parallel processor of claim 19 wherein the processing elements of each cluster communicate to the North and West torus directions with one cluster and to the South and East torus directions with another cluster.

21. The parallel processor of claim 19 wherein the processing elements of each cluster communicate to the North and East torus directions with one other cluster.

22. The parallel processor of claim 19 wherein at least one cluster includes a hypercube complement pair.

23. The parallel processor of claim 19 wherein a cluster switch comprises said multiplexer and said cluster switch is connected to multiplex communications received from two hypercube directions to processing elements within a cluster.

24. The parallel processor of claim 23 wherein said cluster switch is connected to multiplex communications from the processing elements within a cluster for transmission to another cluster.

25. The parallel processor of claim 24 wherein said cluster switch is connected to multiplex communications between hypercube complement processing elements within a cluster.

26. The parallel processor of claim 19 wherein N is less than or equal to M.

27. The parallel processor of claim 19 wherein N is greater than M.

28. The parallel processor of claim 19 wherein communications between processing elements is bit-serial and each processing element cluster communicates with two other clusters over said communications paths.

29. The array processor of claim 19 wherein the communications path between processing elements comprise a data bus.

30. The parallel processor of claim 19 wherein said communication paths are bidirectional paths.

31. The parallel processor of claim 19 wherein said communication paths comprise unidirectional signal wires.

32. The parallel processor of claim 19 wherein P and Q are the number of rows and columns, respectively, of a torus connected array having the same number of PEs as said array, and P and Q are equal to N and M, respectively.

33. The array processor of claim 19 wherein P and Q are the number of rows and columns, respectively of a torus connected array having the same number of PEs and Q are equal to M and N, respectively.

34. A parallel processor comprising a plurality of processing elements (PEs) arranged in clusters;

inter-PE communication paths connecting said PEs such that pairs of PEs communicate in a single step on available communication paths within clusters and between a first PE in one cluster and a second PE in one of two clusters adjacent to the cluster containing said first PE, wherein all PEs in a cluster are completely connected, and wherein said PEs have separate send and receive ports and communication between any PE in a first cluster and any PE in an adjacent second cluster can be done simultaneously for all PEs in said first and second clusters.

* * * * *